(12) United States Patent
Goldberg et al.

(10) Patent No.: US 12,365,476 B2
(45) Date of Patent: Jul. 22, 2025

(54) FUEL DISTRIBUTION FOR VERTICAL TAKE-OFF DUAL-ENGINE AIRCRAFT

(71) Applicant: Anduril Industries, Inc., Costa Mesa, CA (US)

(72) Inventors: Matthew J. Goldberg, Rancho Santa Margarita, CA (US); Gregory Joseph Toland, Escondido, CA (US); Kevin Heffelfinger, Gardena, CA (US); Lane Iverson, Irvine, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 0 days.

(21) Appl. No.: 18/244,153

(22) Filed: Sep. 8, 2023

(65) Prior Publication Data

US 2025/0083830 A1 Mar. 13, 2025

(51) Int. Cl.
*B64D 37/04* (2006.01)
*B64D 37/06* (2006.01)
*B64D 45/00* (2006.01)
*B64C 29/00* (2006.01)

(52) U.S. Cl.
CPC ............ *B64D 37/04* (2013.01); *B64D 37/06* (2013.01); *B64D 45/00* (2013.01); *B64C 29/0008* (2013.01)

(58) Field of Classification Search
CPC ...... B64D 37/00; B64D 37/005; B64D 37/04; B64D 37/06; B64C 17/10; B64C 29/00
See application file for complete search history.

(56) References Cited

U.S. PATENT DOCUMENTS

| 2,969,803 | A | * | 1/1961 | Mosher | B64D 37/22 137/98 |
| 4,908,783 | A | * | 3/1990 | Maier | G01F 23/263 73/304 R |
| 5,244,167 | A | * | 9/1993 | Turk | B64C 19/00 244/23 B |
| 5,636,616 | A | * | 6/1997 | Okane | B01D 35/027 123/514 |
| 11,280,304 | B1 | * | 3/2022 | Moreno | F02M 37/0029 |
| 2009/0008499 | A1 | * | 1/2009 | Shaw | B64U 80/80 244/17.23 |
| 2010/0175666 | A1 | * | 7/2010 | Nishio | F02M 69/54 123/495 |
| 2014/0371965 | A1 | * | 12/2014 | Ideshio | B60K 6/383 701/22 |

(Continued)

OTHER PUBLICATIONS

U.S. Appl. No. 18/244,154, filed Sep. 8, 2023, Fuel Measurement for Vertical Take-Off Dual-Engine Aircraft.

(Continued)

*Primary Examiner* — Philip J Bonzell
(74) *Attorney, Agent, or Firm* — Knobbe, Martens, Olson & Bear, LLP; Andy Pho

(57) ABSTRACT

The present application discloses an aircraft configured for vertical take-off and landing and horizontal flight. The aircraft includes (i) a first nacelle fuel tank configured to hold a first fuel supply for a first engine and to selectively provide fuel to the first engine during both (a) a vertical take-off and landing, and (b) horizontal flight; (ii) a fuselage fuel tank, and (iii) a control system configured to redistribute fuel between the first nacelle fuel tank and the fuselage fuel tank.

22 Claims, 36 Drawing Sheets

(56) References Cited

U.S. PATENT DOCUMENTS

| | | | |
|---|---|---|---|
| 2016/0129782 A1* | 5/2016 | Tipton | B60K 15/077 |
| | | | 137/550 |
| 2016/0297520 A1* | 10/2016 | Sada-Salinas | B64U 20/40 |
| 2019/0002087 A1* | 1/2019 | Mills | B64D 37/04 |
| 2021/0300527 A1* | 9/2021 | Thalheimer | B64C 29/0033 |
| 2025/0083803 A1 | 3/2025 | Goldberg et al. | |
| 2025/0083808 A1 | 3/2025 | Goldberg et al. | |

OTHER PUBLICATIONS

U.S. Appl. No. 18/244,154, filed Sep. 8, 2023, Fuel Venting for Vertical Take-Off Dual-Engine Aircraft.

* cited by examiner

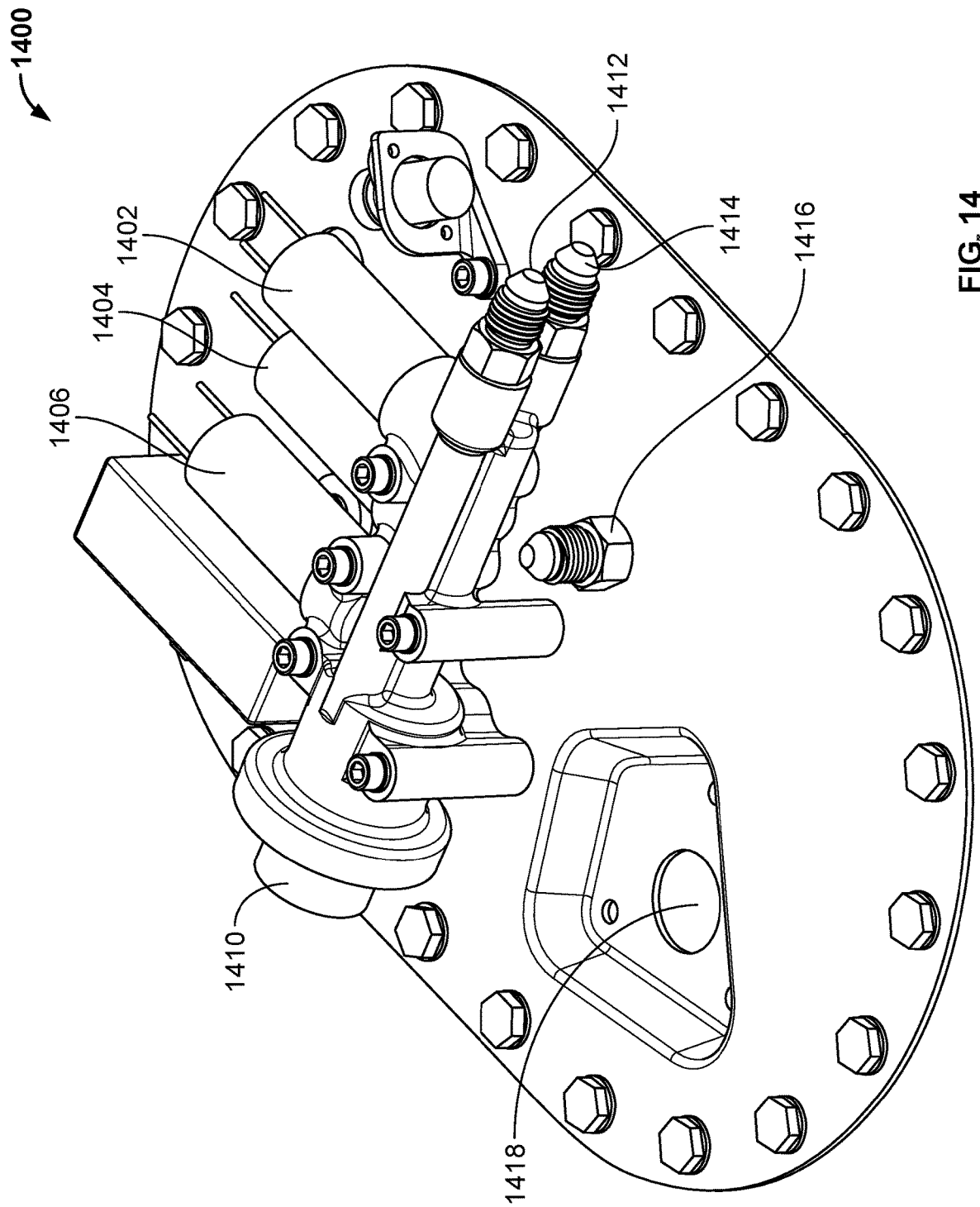

FUEL DISTRIBUTION FOR VERTICAL TAKE-OFF DUAL-ENGINE AIRCRAFT

BACKGROUND OF THE INVENTION

Fixed wing aircraft generally take flight by travelling horizontally across a runway until the wings of the aircraft are subject to sufficient lift. During take-off and flight of the fixed-wing aircraft, the on-board fuel system has substantially the same orientation, subject to pitch ranges associated with take-off and landing. Traditional fuel systems, designed primarily for conventional fixed-wing aircraft, struggle to meet the demands of a vertical take-off and land (VTOL) aircraft. Operation of a VTOL aircraft requires operation in perpendicular orientations. Accordingly, the pitch range over which the fuel system is required to provide fuel supply to the aircraft engines is substantially larger than the pitch range required by traditional fixed-wing aircraft.

BRIEF DESCRIPTION OF THE DRAWINGS

Various embodiments of the invention are disclosed in the following detailed description and the accompanying drawings.

FIG. 14 is a diagram of a manifold for a nacelle fuel system of an aircraft according to various embodiments.

DETAILED DESCRIPTION

Figure 1:
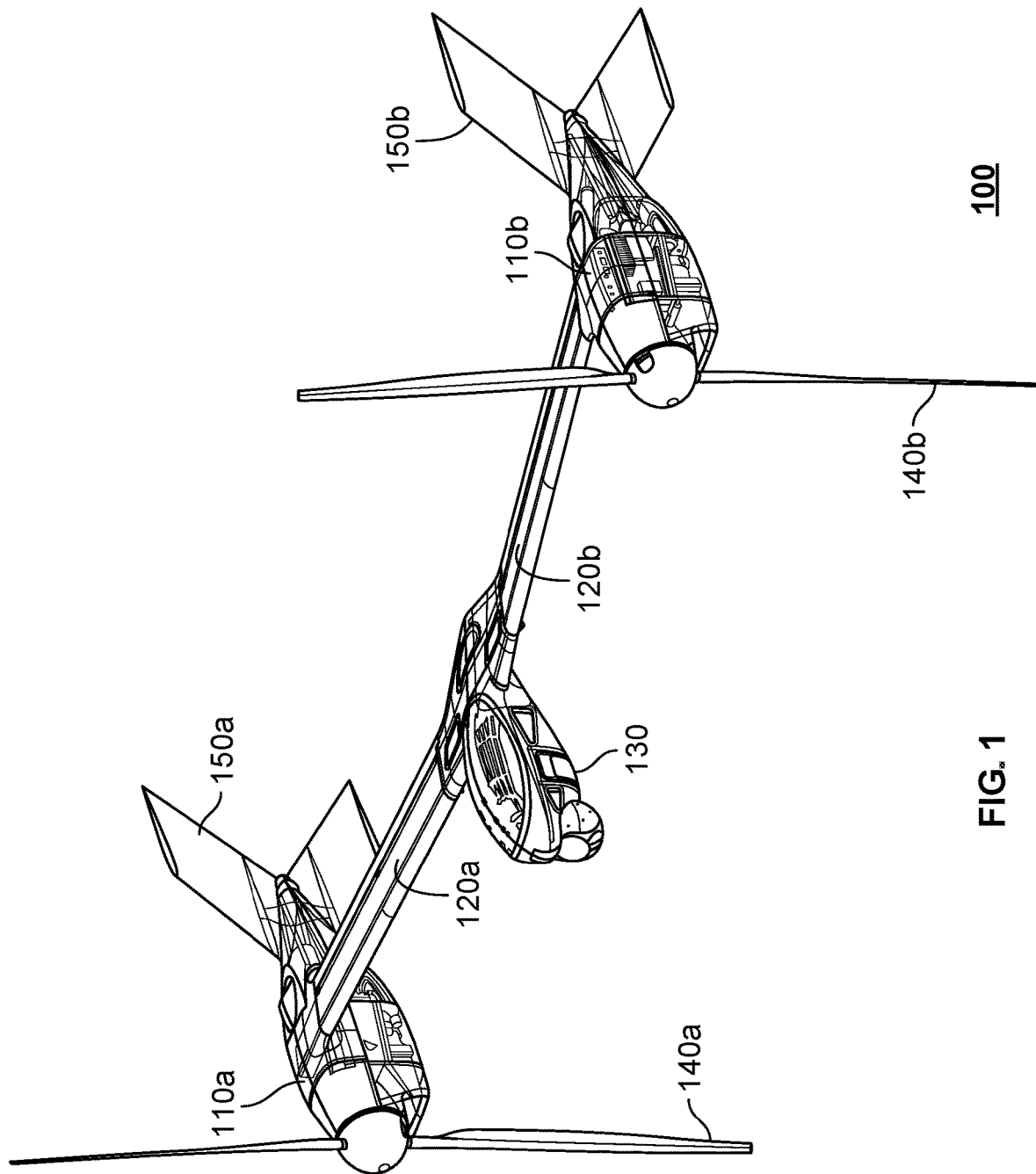
FIG. 1 is a perspective diagram of an aircraft according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Related art aircraft with a vertical take-off and landing (VTOL) capability has a single orientation that includes wings and engines that rotate according to whether the aircraft is operating in a vertical take-off or landing, or horizontal flight. Because the body of the aircraft remains substantially level throughout the VTOL. In contrast, aircraft, particularly fixed-wing aircraft, configured to have a VTOL capability and a horizontal flight capability have unique challenges pertaining to the distribution of fuel for supply to the aircraft engines and the venting of pressure build-up in fuel tanks. The aircraft generally requires supply of fuel to the aircraft engines in both orientations (e.g., across a range of at least 90 degrees as the aircraft shifts from vertical take-off to horizontal flight, and then from horizontal flight to vertical land). Supplying the fuel over the range of orientations includes distributing fuel to the engines and re-distributing fuel in the left-right and/or fore-aft direction to balance the aircraft and ensure adequate supply to the various engines. Additionally, pressure can build-up in a fuel tank as the volume of fuel in the fuel tank changes. Accordingly, the aircraft generally requires a mechanism to regulate or relieve the pressure in the fuel tanks across the range between the VTOL orientation and the horizontal flight orientation.

Various embodiments provide an aircraft, an aircraft control system, and a method for controlling the aircraft, and in particular, controlling the distribution/redistribution of fuel within the aircraft (e.g., within the set of fuel tanks). The aircraft comprises (i) a first nacelle fuel tank configured to hold a first fuel supply for a first engine and to selectively provide fuel to the first engine during both (a) a VTOL operation, and (b) horizontal flight, (ii) a fuselage fuel tank, and (iii) a control system configured to redistribute fuel between the first nacelle fuel tank and the fuselage fuel tank. In some embodiments, the system uses the first engine and the second engine for both VTOL operation and horizontal flight.

Various embodiments provide an aircraft, an aircraft control system, and a method for controlling the aircraft, and in particular, controlling the distribution/redistribution of fuel within the aircraft (e.g., within the set of fuel tanks). The method includes (i) obtaining a first fuel level for a first nacelle fuel tank, (ii) obtaining a third fuel level for a fuselage fuel tank, (iii) determining an orientation of the aircraft, and (iv) causing fuel to be distributed between the first nacelle fuel tank and the fuselage fuel tank based at least in part on (a) the first fuel level, (b) the third fuel level, and (c) the orientation.

Various embodiments provide an aircraft that is configured to perform 1) a vertical take-off and landing and 2) a horizontal flight. The aircraft (e.g., the aircraft control system) comprises one or more processors, and a memory coupled to the processor and configured to provide the processor with instructions. The one or more processors are configured to: (a) determine a first fuel level in a first nacelle fuel tank, wherein the first nacelle fuel tank is configured to provide a supply of fuel to a first engine during both (i) a VTOL operation, and (ii) a horizontal flight operation, (b) determine a fuselage fuel level in a fuselage fuel tank, and (c) determine whether to redistribute fuel across at least the first nacelle fuel tank and the fuselage fuel tank based at least in part on the first fuel level and the fuselage fuel level.

In some embodiments, the aircraft further comprises the first nacelle fuel tank configured to hold a first fuel supply for a first engine, a second nacelle fuel tank configured to hold a second fuel supply for a second engine, a fuselage fuel tank, a first set of valves between the first nacelle fuel tank and the fuselage fuel tank, a second set of valves between the second nacelle fuel tank and the fuselage fuel tank, and a bypass valve configured to control a flow of feedback fuel to the fuselage fuel tank from the first nacelle fuel tank or the second nacelle fuel tank. The one or more processors are further configured to control the first set of valves, the second set of valves, and the bypass valve to be oriented in an open position to redistribute fuel to the fuselage fuel tank from the first nacelle fuel tank or the second nacelle fuel tank. One or more valves are controlled to return fuel to the nacelle, and one or more valves are controlled to shunt off fuel to the other nacelle fuel system or fuselage fuel system.

In some embodiments, the aircraft further comprises the first nacelle fuel tank configured to hold a first fuel supply for a first engine, a second nacelle fuel tank configured to hold a second fuel supply for a second engine, and a fuselage fuel tank. The one or more processors are further configured to burn down fuel in the first nacelle fuel tank, the second nacelle fuel tank, and the fuselage tank at the same rate.

Various embodiments provide an aircraft that is configured to perform 1) a vertical take-off and landing and 2) a horizontal flight. The aircraft comprises a first nacelle fuel tank configured to hold a first fuel supply for a first engine. The first nacelle fuel tank comprises at least a first venting module and a second venting module. The first venting module and the second venting module are configured to provide venting from a top of the first nacelle tank when the aircraft is in one of (i) a VTOL orientation or (ii) a horizontal flight orientation. In some embodiments, the aircraft further comprises a second nacelle fuel tank configured to hold a second fuel supply for a second engine, and a fuselage fuel tank configured to hold a third fuel supply for the first nacelle fuel tank and the second nacelle fuel tank to power the first engine and the second engine, respectively. The second nacelle fuel tank comprises at least a third venting module and a fourth venting module. The third venting module and the fourth venting module are configured to provide venting from a top of the second nacelle tank when the aircraft is in one of (i) the VTOL orientation or (ii) the horizontal flight orientation. The fuselage fuel tank comprises at least a fifth venting module and a sixth venting module. The fifth venting module and the sixth venting module are configured to provide venting from a top of the fuselage tank when the aircraft is in one of (i) the vertical take-off or land orientation or (ii) the horizontal flight orientation.

Various embodiments provide an aircraft that is configured to perform 1) a vertical take-off and landing and 2) a horizontal flight. The aircraft has a venting mechanism to enable control or reduction of pressure build-up in one or more fuel tanks. The aircraft comprises (a) a left nacelle fuel tank to hold a first fuel supply for a left engine, the left nacelle fuel tank comprising a left venting mechanism, (b) a right nacelle fuel tank to hold a second fuel supply for a right engine, the right nacelle fuel tank comprising a right venting mechanism, and (c) a fuselage fuel tank to hold a supply of fuel for the first nacelle fuel tank and the second nacelle fuel tank to power the left engine and the right engine, the fuselage fuel tank comprising a fuselage venting mechanism. The left venting mechanism, the right venting mechanism, and the fuselage venting mechanism are configured to provide venting from a top of the corresponding fuel tank when the aircraft is a VTOL orientation and when the aircraft is in a horizontal flight orientation.

In some embodiments, the aircraft comprises a fuel system comprising a plurality of fuel tanks and a plurality of pathways that are configured to allow fuel to flow from one tank to another tank (e.g., for fuel to be redistributed among the fuel tanks). The plurality of fuel tanks includes two or more of a first nacelle fuel tank, a second nacelle fuel tank, and a fuselage fuel tank. For example, the aircraft includes a left nacelle fuel tank configured to supply fuel to a left engine, and/or a right nacelle fuel tank configured to supply fuel to a right engine. In some embodiments, the aircraft includes a fuselage fuel tank, a first nacelle fuel tank (e.g., a left nacelle fuel tank), and a second nacelle fuel tank. The plurality of pathways includes a fuel pathway(s) from the fuselage fuel tank to one or both of the first nacelle fuel tank and the second nacelle fuel tank. A single pathway between the fuselage fuel tank and a nacelle fuel tank may carry fuel in one direction (e.g., in which case the fuel system may have another pathway to carry fuel in the other direction) or both directions, such as both from the fuselage fuel tank to a nacelle fuel tank and/or from the nacelle fuel tank to the fuselage fuel tank. The plurality of pathways may include a pathway to carry fuel from one nacelle fuel tank to another nacelle fuel tank.

In some embodiments, the fuel system comprises a set of valves that are configured to control the pathways for fuel. Examples of the pathways for fuel include a pathway(s) for providing fuel to the engine(s), a pathway(s) for providing fuel from a nacelle fuel tank to a fuselage fuel tank, a pathway(s) for providing from a first nacelle fuel tank to another nacelle fuel tank, etc. The valves (or subsets of valves) can be controlled independently to configure the valve in an open configuration or closed configuration. One or more of the set of valves may be a solenoid valve. However, various other types of valves may be implemented. The set of valves is controlled to direct fuel throughout the aircraft, such as to control redistribution of fuel or provide the fuel to the engine(s).

The aircraft (e.g., the fuel system) comprises one or more sensors that are respectively configured to measure a fuel level in one or more fuel tanks. In some embodiments, each fuel tank (e.g., the fuselage fuel tank and/or the left and/or right nacelle fuel tanks) comprises at least two sensors. The two sensors comprised in a fuel tank are configured in different orientations, for example, a first sensor is configured in a vertical direction (e.g., when the aircraft is in a horizontal orientation), and a second sensor is configured in a horizontal direction. The at least two sensors are used to measure fuel within the corresponding tank across the ranges of orientation in which the aircraft may be configured, such as from a VTOL orientation to a horizontal flight orientation. The control system obtains sensor data from the one or more sensors and determines the fuel level in one or more tanks based at least in part on the sensor data. As an example, the control system obtains sensor data from a first sensor (e.g., a vertical sensor) in the fuel tank and sensor data from a second sensor (e.g., a horizontal sensor). The control system determines the fuel level for the tank based on a mapping (or lookup table) of sensor readings for the first sensor and second sensor (e.g., the sensor data) to fuel levels. For example, the system uses the sensor data from the vertical and horizontal sensors to query the mapping of sensor readings to fuel levels in connection with determining the fuel level for the tank. Each tank may have an associated predefined mapping of sensor readings to fuel levels. For example, the fuel level for the fuselage fuel tank is determined based on querying a fuselage mapping of fuselage sensor data to fuel levels. As another example, the fuel level for a nacelle fuel tank is determined based on querying a nacelle mapping of nacelle sensor data to fuel levels. In some embodiments, the one or more sensors comprise a capacitive sensor to detect the fuel level (e.g., in the vertical and horizontal directions). However, various other types of sensors may be implemented, such as optical sensors, ultrasonic sensors, conductivity level sensors, a float level sensor, etc.

In some embodiments, the control system determines whether to redistribute fuel across various fuel tanks. For example, the control system determines whether to redistribute fuel from the fuselage fuel tank to a nacelle fuel tank(s), from a nacelle fuel tank(s) to the fuselage fuel tank, and/or from a first nacelle fuel tank to a second nacelle fuel tank. The control system determines to redistribute the fuel and/or an extent to which the fuel is to be redistributed in order to re-balance the aircraft (e.g., re-balance the aircraft center of gravity in a fore-aft direction and/or a left-right direction) and/or to provide fuel to the nacelle fuel tank(s) for supply to the corresponding engine. The control system determines whether to redistribute the fuel and/or the redistribution to be performed based at least in part one or more of (a) a current fuel level in one or more of the aircraft fuel tanks, and (b) an aircraft center of gravity.

The current fuel level in the fuel tank(s) can be determined based on sensor data and a lookup of a mapping of sensor readings to fuel levels.

The aircraft center of gravity may be determined based at least in part on the fuel levels in the fuel tank(s) and/or based on sensor data, such as sensor readings from one or more sensors disposed in different locations of the aircraft (e.g., at the left and right nacelles, at the fuselage, etc.). In some embodiments, the aircraft center of gravity is based at least in part on aircraft attitude. In some embodiments, the aircraft center of gravity is based at least in part on a lookup table using fuel levels in a first nacelle fuel tank, a second nacelle fuel tank, and a fuselage fuel tank. In some embodiments, the aircraft center of gravity is based at least in part on a horizontal flight lookup table using fuel levels in a first nacelle fuel tank, a second nacelle fuel tank, and a fuselage fuel tank. In some embodiments, the aircraft center of gravity is based at least in part on a vertical flight lookup table using fuel levels in a first nacelle fuel tank, a second nacelle fuel tank, and a fuselage fuel tank. In some embodiments, an aircraft attitude is used to determine whether a vertical flight lookup table or a horizontal flight lookup table is used for determining a location of the center of gravity for the aircraft. According to various embodiments, the center of gravity is computed by (a) determining weights and arms for all mass within the aircraft, (b) multiplying the weights by arms for all mass to calculate moments, (c) adding all moments together, (d) adding all weights together, and (e) dividing total moment by total weight to give overall arm.

The aircraft has limits of center of gravity under which the aircraft may operate. For example, the aircraft has a predefined acceptable center of gravity range. In some embodiments, the aircraft has a set of predefined acceptable center of gravity ranges. For example, the aircraft has different acceptable center of gravity ranges for different aircraft orientations (e.g., orientations between a VTOL orientation and a horizontal flight orientation). Different pitches, or ranges of pitches, may have different corresponding acceptable center of gravity ranges. Thus, the acceptable center of gravity range is dynamic based at least in part on the aircraft orientation.

In some embodiments, the control system determines the aircraft center of gravity based at least in part on a pitch of the aircraft and/or the fuel levels for the fuel tanks. The control system determines the applicable center of gravity range based at least in part on the aircraft pitch. The control system may store a predefined mapping of pitches to acceptable center of gravity ranges. For example, the control system uses the current aircraft pitch to query a mapping (or lookup table) of aircraft pitches to acceptable center of gravity ranges, and receives the applicable center of gravity range for the aircraft.

The control system determines whether to redistribute fuel (and how to redistribute fuel) in response to obtaining the applicable center of gravity range and comparing the current aircraft center of gravity with the applicable center of gravity range. The control system may redistribute the fuel to re-balance the aircraft to have a center of gravity within the acceptable center of gravity range. In some embodiments, a control loop is performed including 1) measuring fuel levels in a first nacelle fuel tank, a second nacelle fuel tank, and a fuselage; 2) obtaining an orientation of the aircraft; 3) determining an aircraft center of gravity based at least in part on the fuel levels and the orientation of the aircraft; 4) determining whether the aircraft center of gravity is within an acceptable center of gravity range; 5) in response to determining that the aircraft center of gravity is not within the acceptable center of gravity range, determining to redistribute fuel amount the first nacelle fuel tank, the second nacelle fuel tank, and the fuselage tank; and 6) causing the fuel to be redistributed. In some embodiments, the control loop includes using a set of sensors measuring fuel levels in a fuel tanks (e.g., a first nacelle fuel tank, a second nacelle fuel tank, and a fuselage fuel tank) where the results from the set of sensor measurements are used to look up a center of gravity in a table. In some embodiments, the table used to look up the center of gravity depends on the attitude of the aircraft. In some embodiments, the attitude of the aircraft is measured using an inertial measurement unit. In some embodiments, the inertial measurement unit indicates an aircraft attitude of horizontal or vertical. In some embodiments, a vertical attitude of the aircraft is associated with using a vertical flight look up table to determine a location of a center of gravity. In some embodiments, a vertical attitude of the aircraft is associated with using a vertical flight look up table to determine a location of a center of gravity. In some embodiments, a horizontal attitude of the aircraft is associated with using a horizontal flight look up table to determine a location of a center of gravity. In some embodiments, the fuel level measurements are filtered to smooth out fast changes (e.g., fuel sloshing, etc.) and the filtered values are used to look up a center of gravity location in a look up table.

In some embodiments, the control system determines a plan to redistribute fuel to attain a center of gravity that is in the middle of the applicable center of gravity range. The plan may include an indication of an amount of fuel to be pumped into one or more tanks, and a control for one or more valves in the fuel system to provide a fuel pathway for the fuel redistribution.

Fuel tanks generally need to breathe. In order to breathe, the fuel tank needs a mechanism to relieve both a vacuum and pressure build-up. The internal pressure in a fuel tank may fluctuate based on an amount of fuel in the tank and a temperature of the surrounding environment. For example, gasoline expands in volume as it warms up and shrinks in volume as it cools down. The aircraft for various embodiments is configured to be able to operate in a VTOL orientation and a horizontal flight orientation. In some embodiments, the fuel tank(s) is oriented differently in the different orientations (and across the ranges of orientations substantially therebetween). For example, the left and right nacelle fuel tanks and the fuselage fuel tank are configured to be static relative to the aircraft body. Gas generally moves towards the top-most region of a fuel tank in the different orientations. As an example, in a VTOL orientation, the top region corresponds to the fore portion of the fuel tank (e.g., when the fuel tank is viewed from a horizontal flight orientation). Conversely, in a horizontal flight orientation, the top region of the fuel tank is at the top side of the fuel tank (e.g., when the fuel tank is viewed from the horizontal flight orientation).

Various embodiments include a venting mechanism that promotes venting across both the VTOL orientation and the horizontal flight orientation. For example, the venting mechanism(s) is configured to allow gas to flow from the top region of the fuel tank in the different VTOL and horizontal flight orientations to a pressure valve. The venting mechanism may also include a module (e.g., a rollover valve) that restricts the flow of fluid from other regions in the fuel tank (e.g., the top of the fuel tank when the fore of the fuel tank serves as the top region, such as in a VTOL orientation). For example, when the aircraft is operating in the VTOL orientation, the venting mechanism is configured to enable gas from a top region of the fuel tank corresponding to the fore of the fuel tank to flow to the pressure valve, and to restrict gas or other fluid, such as fuel, from the bottom region of the fuel tank (e.g., the top, bottom, or aft sections of the fuel tank) according to the VTOL orientation Various configurations of venting mechanisms may be implemented. Additionally, the configuration for the venting mechanism(s) for a nacelle fuel tank may be the same as, or different from, the configuration for the venting mechanism for a fuselage fuel tank.

In some embodiments, a fuel tank system comprises a venting mechanism. The fuselage venting mechanism comprises (a) a top port comprised on a top surface of a corresponding fuel tank, (b) a fore port comprised on a fore surface of the corresponding fuel tank, (c) a pressure valve connected to the top port and the fore port, and configured to open or close to control pressure in the corresponding tank, (d) a first fluid pathway to carry, via the top port, a gas from a top of the corresponding fuel tank when the aircraft is in a horizontal flight orientation, and (e) a second fluid pathway to carry, via the fore port, the gas from a fore of the corresponding fuel tank when the aircraft is in a vertical take-off and landing orientation. The venting mechanism may comprise a set of valves that are respectively configured in an open orientation or a closed orientation to control the corresponding flow of the gas to the pressure valve. Each valve in the set of valves can be independently controlled. For example, the one or more valves in the set of valves is actively controlled by an aircraft control system. As another example, one or more valves in the set of valves is passively controlled.

In some embodiments, the venting mechanism includes a port (e.g., a single port) at the top of the fuel tank when viewed from the horizontal orientation. For example, the venting mechanism does not include a port on the fore-side of the fuel tank. The port permits gas/fluids to flow from the fuel tank to a pressure valve, such as via a pressure relief pathway (e.g., a fluid pathway such as tubing, etc.). The venting mechanism includes a first fluid pathway from the top of the fuel tank (e.g., corresponding to the top region of the fuel tank when operating in horizontal flight orientation)

to the port, and a second fluid pathway from the fore of the fuel tank (e.g., corresponding to the top region of the fuel tank when the aircraft is operating in the VTOL orientation). The fluid from the first fluid pathway and the second fluid pathway may share a same pressure relief pathway (e.g., a supply line) from the output of the port to the pressure valve. To ensure that fluid only flows through the pathway to the port when the fluid pathway is connected to the top region of the fuel tank according to aircraft orientation and to restrict the flow through the fluid pathway to the pressure valve, the venting mechanism includes a valve, such as a rollover valve. The configuration of the valve is based at least in part on the aircraft orientation. The configuration of the valve may be either actively controlled or passively controlled. For example, in the case of a rollover valve, the rollover valve is passively configured based on the aircraft orientation.

In some embodiments, the venting mechanism includes at least two ports configured on different sides of the fuel tank that permit gas/fluid to flow through to a pressure valve. Both ports may have fluid pathways (e.g., tubing) that carry the gas/fluid from the fuel tank to a same pressure valve. Alternatively, the venting mechanism may comprise a plurality of pressure valves with each pressure valve being respectively associated with a particular port. As an example, the fuel tank comprises a first port (e.g., a top port) at the top of the fuel tank (when the fuel tank is viewed in the horizontal orientation) and a second port (e.g., a fore port) at the fore of the fuel tank. The first port is configured to provide venting of the top region of the fuel tank when the aircraft is operating in horizontal flight. The second port is configured to provide venting of the top region of the fuel tank when the aircraft is operating in the VTOL operation/orientation. The venting mechanism may include a plurality of valves respectively configured/disposed to control, based on the orientation of the aircraft and/or the level of fuel in the fuel tank, the flow of gas/fluid from the fuel tank, through the corresponding port, and to the respective pressure valve. For example, the venting mechanism comprises a first valve that controls the flow of gas/fluid through the first port (e.g., the top port) to permit the flow of the gas/fluid to the pressure valve when the aircraft is operating in the horizontal flight orientation and to restrict the flow of the gas/fluid when the aircraft is operating in the VTOL orientation. Conversely, the venting mechanism may comprise a second valve that controls the flow of gas/fluid through the second port (e.g., the fore port) to permit the flow of gas/fluid when the aircraft is operating in the VTOL orientation, and to restrict the flow of gas/fluid to the pressure valve when the aircraft is operating in the horizontal flight orientation. The configuration of the valves that control the flow of gas/fluid through the respective first or second port to the pressure valve(s) is based at least in part on the aircraft orientation. The configuration of the valves may be either actively controlled or passively controlled. For example, in the case of a rollover valve, the rollover valve is passively configured based on the aircraft orientation (e.g., to ensure that only fluid from the top region of the fuel tank is permitted to travel through the port to the pressure valve. In addition, the valves may be controlled as a set of valves or independent from one another).

Figure 2:
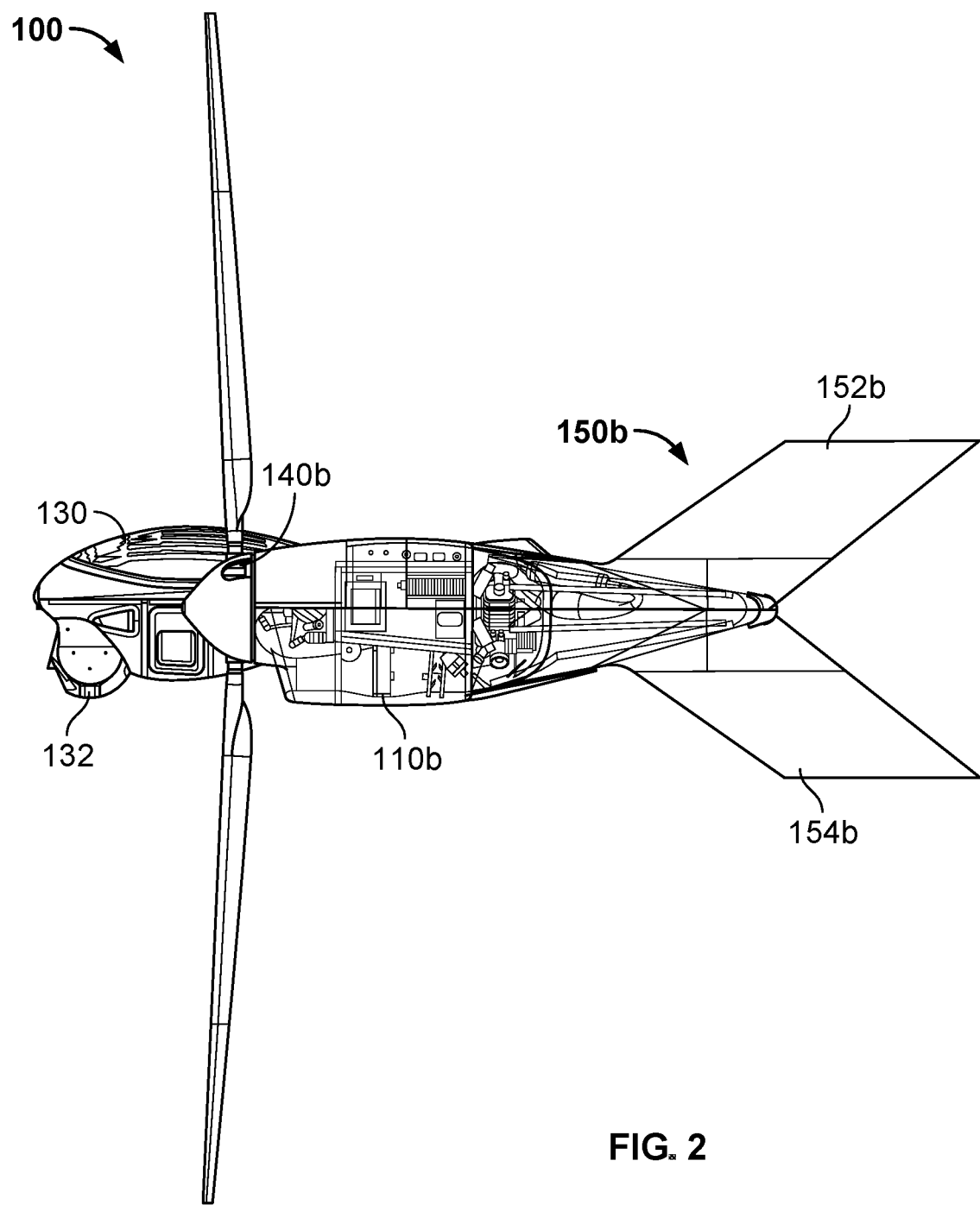
FIG. 2 is a side view diagram of an aircraft according to various embodiments.
Figure 3:
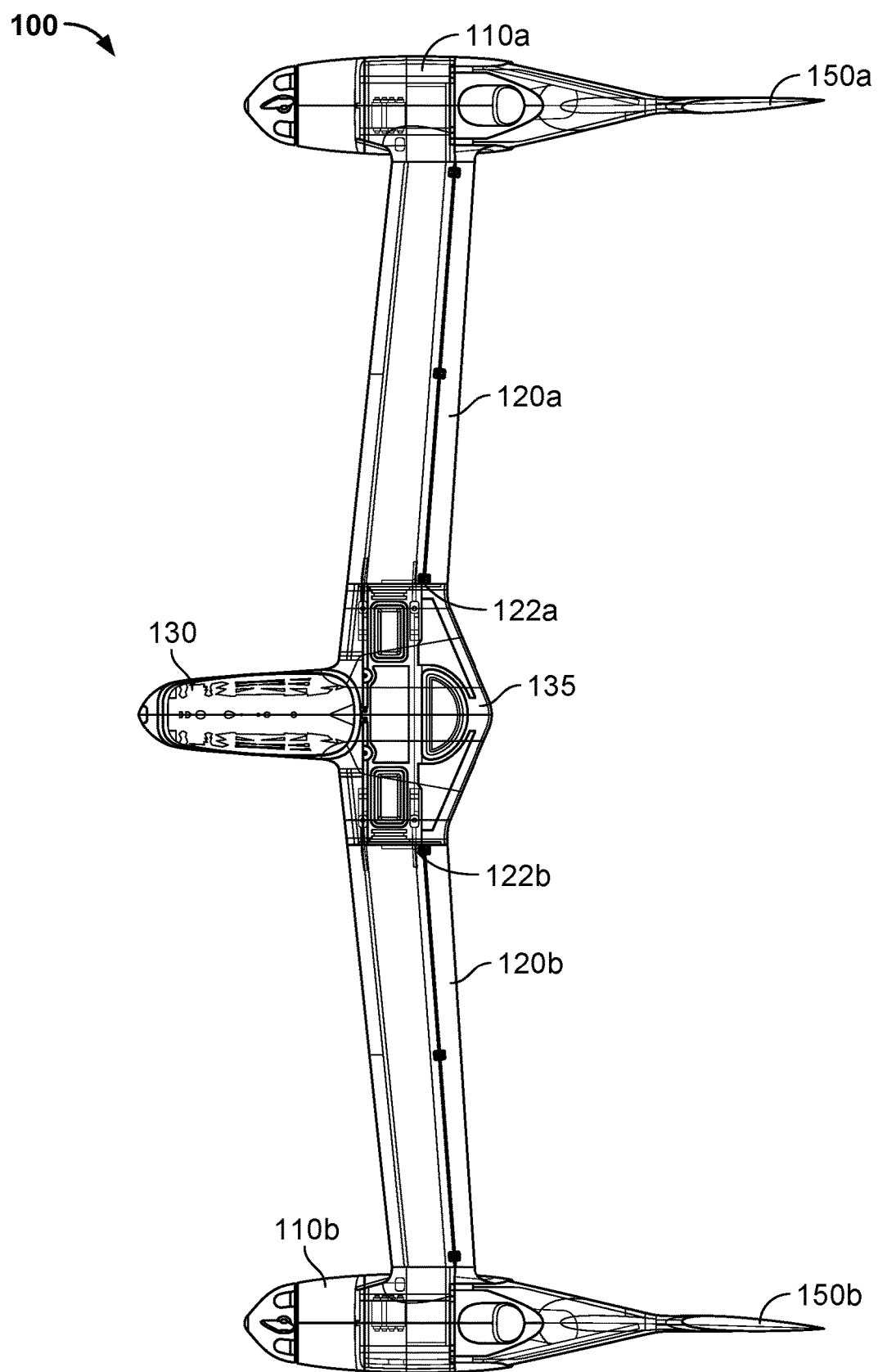
FIG. 3 is a top view diagram of an aircraft according to various embodiments.

FIGS. 1-3 are respectively a perspective, side-view, and top-view diagrams of an aircraft according to various embodiments. As shown in FIG. 1, aircraft 100 comprises fixed wings, first wing 120a and second wing 120b. First wing 120a and second wing 120b are mounted (e.g., fixedly mounted) to fuselage 130. Aircraft 100 further comprises first nacelle 110a and second nacelle 110b comprising propulsion systems that operate to take-off, land, or fly aircraft 100. In some embodiments, aircraft 100 comprises winglets, such as first winglet 150a and second winglet 150b.

In some embodiments, aircraft 100 is configured to vertically take-off and/or landing. First nacelle 110a and/or second nacelle 110b may include landing module(s). For example, aircraft 100 rests on a first landing module comprised in first nacelle 110a and a second landing module comprised in second nacelle 110b with the length of fuselage 130 extending vertically. The first landing module and the second landing module may fold into first nacelle 110a and second nacelle 110b, respectively, which allows the landing gear to cause low drag during flight operation. For example, the landing module folds into winglets (e.g., first winglet 150a, second winglet 150b) of first nacelle 110a and second nacelle 110b. As another example, propulsion systems (e.g., first proprotor 140a and second proprotor 140b) are positioned at one end of a nacelle (e.g., first nacelle 110a and second nacelle 110b) and the landing gear is positioned within the tail assembly that includes the winglets (e.g., first winglet 150a and second winglet 150b) at the other end of the tail assembly. In some embodiments, aircraft 100 is enabled to rest on the ground with the proprotors at the top and the landing gear positioned at the bottom/on the ground.

The lengths of first nacelle 110a and second nacelle 110b are constrained by the distance between the end of the nacelle and the ground when the aircraft is facing upwards for take-off/landing. The landing module folds out of first nacelle 110a and second nacelle 110b (e.g., first winglet 150a, second winglet 150b). Accordingly, if the nacelles are too short, the landing modules (e.g., landing gear). may not have sufficient track and thus lead to instability when the vehicle is resting on the landing modules. For example, the track of the landing module should be sufficiently long to ensure that aircraft 100 does not fall over when resting on the landing module. In addition, the nacelles and/or landing module are configured to have a length to provide sufficient clearance for all payloads that are carried by (e.g., mounted to) aircraft 100.

In some embodiments, the airframe design (e.g., shape of first wing 120a, second wing 120b, first nacelle 110a, and/or second nacelle 110b) is configured to balance performance during vertical take-off/landing and performance during horizontal cruise. For example, the airframe is designed to provide a good (e.g., a stable) transition from vertical take-off mode to horizontal cruise mode (or from horizontal cruise mode to vertical landing mode). Certain components of aircraft 100 may be selected based on stiffness and/or strength required to withstand the forces during vertical take-off and horizontal cruise. For example, the wings or nacelles may comprise composite materials (e.g., fiberglass, Hexply® M77 prepreg, etc.). The airframe further includes clean/mechanical joints between components (e.g., the wing-nacelle interface or wing-fuselage interface), which are also low drag. According to various embodiments, the joints/interfaces between components are designed to optimize (e.g., minimize) drag. Aircraft 100 may comprise a control system that is used to control the distribution/redistribution of fuel to provide appropriate balance of aircraft 100 during operation in different pitches/orientations.

In some embodiments, the joints between components in aircraft 100 are optimized to balance performance during take-off/flight and support for a quick assembly. For example, various embodiments include wings (e.g., first wing 120*a*, second wing 120*b*) that are hinged with respect to the center wing and/or fuselage 130. In a disassembled state, the wings are folded inwards to form a horseshoe shape with the center wing of fuselage 130. Thus, rapid deployment of aircraft 100 includes unfolding the wings and fixedly mounting the wings to fuselage 130 (e.g., to the center wing of fuselage 130). Although use of folding wings does not optimize aircraft 100 for weight, the folding wings facilitate use of a relatively stiffer/stronger joint for the wings.

First winglet 150*a* and second winglet 150*b* may comprise flight-control (e.g., the control system) or communication components. For example, first winglet 150*a* and/or second winglet 150*b* may be configured to comprise (e.g., mounted on) an antenna such as a vertically polarized antennae.

The propulsion system of aircraft 100 may be a jet engine, a piston engine, a gas turbine, a propeller, or a motor, such as an electric motor. Various other types of propulsion systems may be implemented. In some embodiments, the propulsion system comprises one or more proprotors. In the example shown, aircraft 100 comprises first proprotor 140*a* and second proprotor 140*b*.

In some embodiments, the proprotor (e.g., first proprotor 140*a*, second proprotor 140*b*, etc.) includes one or more blades that are removable. The length of the proprotors (e.g., the proprotor blades) is constrained by the length of the wing. For example, the length of the proprotor blade is less than the length of the wing to provide clearance between fuselage 130 and the proprotor. The one or more proprotors may respectively have at least two blades having a length of at least 5 feet. For example, first proprotor 140*a* comprises two blades having a length of 10 feet. The relatively large blades allow aircraft 100 to have a higher cruise speed than aircraft propelled by smaller blades. As an example, the blades are driven by an internal combustion engine (e.g., a heavy fuel internal combustion engine). As another example, the blades are driven by an electric motor. The use of blades for propulsion balances the need to be resilient while taking off vertically and cross winds that may occur during vertical take-off. For example, the proprotors include a two-motor swashplate on each rotor, which facilitates improved stability and resilience to cross winds. In some embodiments, the proprotor blades are mounted to the proprotor in a tool-less integration.

In some embodiments, aircraft 100 is configured to carry a payload. The payload may be mounted to fuselage 130 or the wings (e.g., first wing 120*a* and second wing 120*b*). Examples of payloads include cameras (e.g., electro-optical/infra-red (EO/IR) systems), weapons, packages, etc. Various other payloads may be implemented. Aircraft 100 may comprise one or more sensor mounts or payload mounts to which sensors or payloads are mounted. In the example shown in FIG. 2, aircraft 100 comprises EO/IR system 132 mounted to the chin of fuselage 130.

In some embodiments, aircraft 100 comprises an internal combustion engine. For example, aircraft 100 comprises a first internal combustion engine within first nacelle 110*a* and a second internal combustion engine within second nacelle 110*b*. First nacelle 110*a* and second nacelle 110*b* are detachably mounted to the wings (e.g., first wing 120*a* and second wing 120*b*). During assembly, the nacelles are respectively connected to the wing. The connection between the nacelles and the wings comprises a connection for one or more of fuel lines, communication lines (e.g., signals received via antennae in the winglet), and/or control systems (e.g., wiring for a system computer to control the various operations of aircraft 100, such as driving the engines or actuating the landing modules). In some embodiments, aircraft 100 comprises a fuel reservoir (e.g., a third fuel tank) in fuselage 130. Accordingly, fuel is transferred from fuselage 130 to the engines in the nacelles via fuel connections between the applicable nacelle and fuselage 130 that couple the fuel reservoir to the fuel lines or reservoirs in the wings. In some embodiments, aircraft 100 is able to balance the fuel weight by shifting fuel volume between fuselage 130, first nacelle 110*a*, and second nacelle 110*b*. In some embodiments, aircraft 100 is able to balance the fuel weight by shifting fuel volume between fuselage 130, first wing 120*a*, second wing 120*b*, first nacelle 110*a*, and second nacelle 110*b*.

In some embodiments, the connections between the nacelles and the wings are designed for optimization in assembly/disassembly. For example, aircraft 100 includes a secure and quick connection between the nacelles and the wings. As an example, the one or more connections between the nacelles and the wings (e.g., between first nacelle 110*a* and first wing 120*a*, etc.) comprise a blind mate connection. The connections between the nacelles and the wings may include dry connections for connecting the fuel lines/pathways from the wing to the nacelles (e.g., to the nacelle fuel tanks).

In some embodiments, aircraft 100 comprises fuel reservoirs in the wings and/or nacelles. For example, a first fuel tank is located in first wing 120*a* and a second fuel tank is located in second wing 120*b*. Aircraft 100 may also comprise a fuel reservoir (e.g., the third fuel tank) in fuselage 130. Aircraft 100 comprises a control system (e.g., a computer) that manages delivery of fuel to the engines. The control system controls a use of fuel from the third fuel tank based at least in part on fuel consumption of fuel in the first fuel tank and the second fuel tank. The control system may control the use of fuel from the third fuel tank based on consumption of fuel in the first fuel tank relative to consumption of fuel in the second fuel tank. For example, the control system controls delivery of fuel to ensure that the first fuel tank and the second fuel tank comprise substantially the same amount of fuel (e.g., an amount of fuel within a threshold range). Delivery of the fuel from the third fuel tank to the first fuel tank and the second fuel tank can be used to ensure that aircraft 100 is balanced during flight.

In some embodiments, aircraft 100 comprises fuel tanks in first nacelle 110*a* and second nacelle 110*b*. For example, aircraft 100 comprises a first nacelle fuel tank that holds fuel to be supplied to the first internal combustion engine within first nacelle 110*a*, and a second nacelle fuel tank that holds fuel to be supplied to the second internal combustion engine within second nacelle 110*b*. Aircraft 100 may additionally comprise a fuselage fuel tank to supplement the supply of fuel held in the first nacelle fuel tank and the second nacelle fuel tank. Aircraft 100 comprises a plurality of pathways that (a) carry fuel from the fuselage fuel tank to/from the first nacelle fuel tank and/or the second nacelle fuel tank, (b) carry fuel between the first nacelle fuel tank and the second nacelle fuel tank, (c) carry fuel from the first nacelle fuel tank at least to the first internal combustion engine, and/or (d) carry fuel from the second nacelle fuel tank at least to the second internal combustion engine.

Aircraft 100 comprises avionics (e.g., a control system) that controls operation of aircraft 100 during fight or take-off/landing. The avionics may be located in fuselage 130 and the mounting/connections for the nacelles to the wings and the wings to the fuselage or central wing (e.g., the fuselage mount) include connections for the avionics to control systems in the wings (e.g., antennae, engines, landing modules, delivery/release of payloads, etc.).

In the example shown in FIGS. 1 and 2, aircraft 100 comprises second winglet 150b comprised in, or connected to, second nacelle 110b or second wing 120b. Second winglet 150b comprises a second top winglet 152b and a second bottom winglet 154b. The winglets may comprise landing modules that are retracted (e.g., folded) into the winglets during flight, and extended during take-off or landing. Fuselage 130 includes EO/IR system 132 and is shown behind second nacelle 110b and is coupled to second wing 120b. Second nacelle 110b has at its front second proprotor 140b.

In the example shown in FIG. 3, fuselage 130 is mounted to center wing 135. Center wing 135 serves as the nucleus of aircraft 100. For example, first wing 120a and second wing 120b are mounted (e.g., hingedly mounted) to center wing 135 via first wing hinge mount 122a and second wing hinge mount 122b. First wing 120a and second wing 120b may be folded relative to center wing 135 to create a horseshoe shape. During assembly, first wing 120a and second wing 120b are unfolded and rigidly mounted/connected to center wing 135. In some embodiments, fuselage 130 is hingedly mounted to center wing 135. For example, fuselage 130 may be folded into the space defined by (e.g., within) the horseshoe shape created by the folding of first wing 120a and second wing 120b relative to center wing 135. First nacelle 110a with first winglet 150a is coupled to first wing 120a at the end opposite being coupled to center wing 135. Second nacelle 110b with second winglet 150b is coupled to second wing 120b at the end opposite being coupled to center wing 135.

In some embodiments, aircraft 100 is configured to have a one-way range of 1000+ nautical miles. Aircraft 100 has an endurance of at least 10 hours. Aircraft 100 is configured to carry a payload of at least 50 lbs. In some embodiments, aircraft 100 has a maximum speed of at least 147 knots.

In various embodiments, aircraft 100 has a wingspan of at least 15 feet, of at least 19 feet, of 18 feet, of 19 feet, or any other appropriate minimum length, length, or maximum length.

FIG. 2 is a perspective view and a side view diagram of an aircraft in a take-off state according to various embodiments. In some embodiments, aircraft 100 comprises a low-drag and lightweight landing module that may be extended during take-off or landing, as illustrated in FIG. 2.

Figure 4:
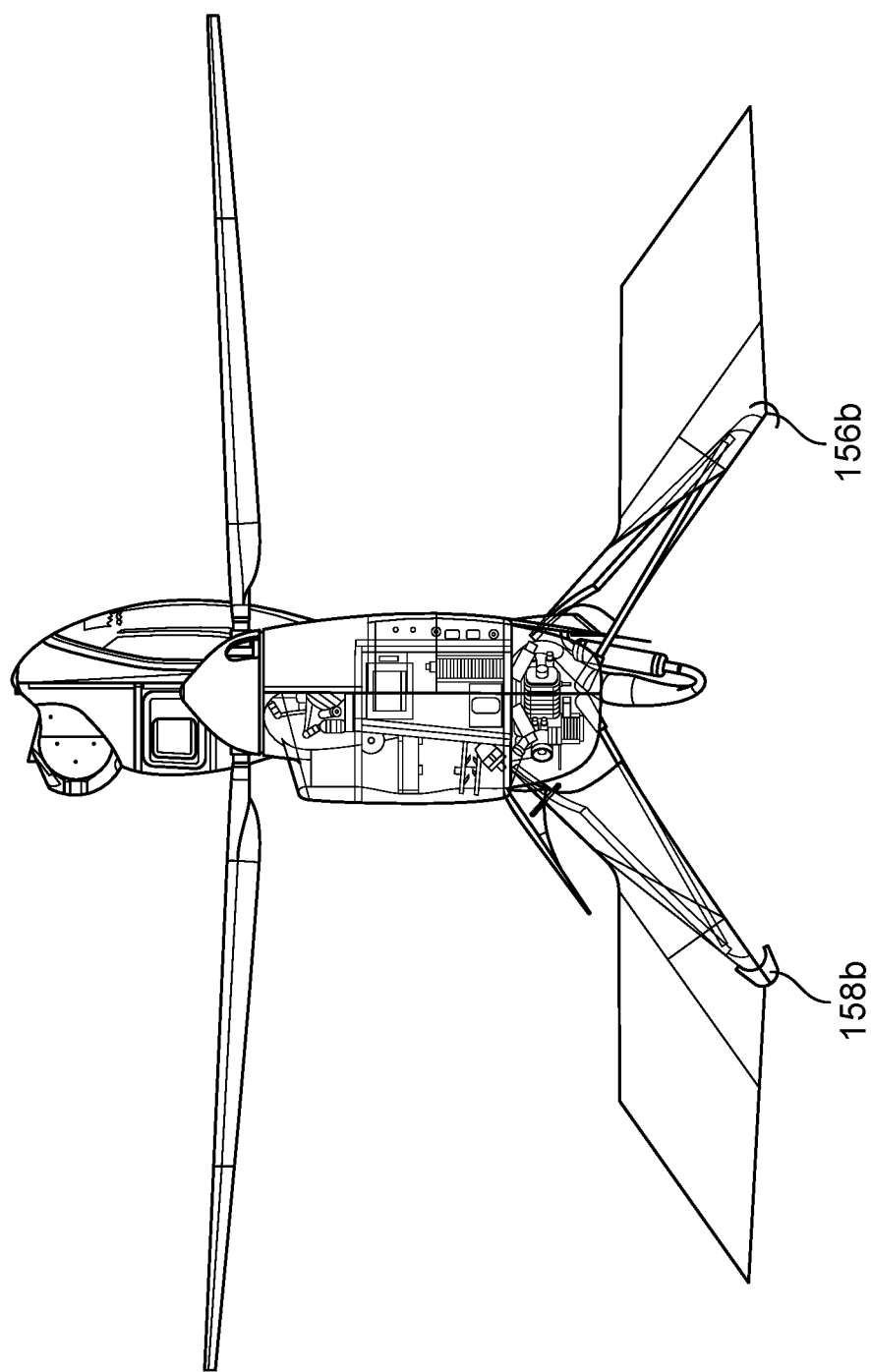
FIG. 4 is a perspective view diagram of an aircraft in a take-off state according to various embodiments.

In the example shown in FIGS. 2 and 4, the landing module of first wing 120a (e.g., connected to first nacelle 110a or first top winglet 152a or first bottom winglet 154a) comprises first landing support member (not shown) and second landing support member (not shown). Similarly, the landing module of second wing 120b (e.g., connected to second nacelle 110b or second top winglet 152b or second bottom winglet 154b) comprises third landing support member 156b and fourth landing support member 158b. As illustrated, the first landing support member and the second landing support member provide a wide stance when aircraft 100 is landed. For example, the first landing support member and the second landing support member comprise a panel design. The panels may be retracted during flight to ensure efficient drag management (e.g., first landing support member 156a and second landing support member 158a when in the retracted position—for example, a closed clam shell configuration—contribute low drag to aircraft 100). As illustrated, third landing support member 156b and fourth landing support member 158b provide a wide stance when aircraft 100 is landed. For example, third landing support member 156b and fourth landing support member 158b comprise a panel design. The panels may be retracted during flight to ensure efficient drag management (e.g., third landing support member 156b and fourth landing support member 158b when in the retracted position—for example, a closed clam shell configuration—contribute low drag to aircraft 100).

In some embodiments, the landing module is configured to be relatively expeditionary, such as to provide aircraft 100 with the ability to land/take-off on uneven terrain, odd ground surfaces, or otherwise challenging terrain. For example, first landing support member 156a and second landing support member 158a and/or third landing support member 156b and fourth landing support member 158b may be shaped to provide support on uneven or inclined ground surfaces.

FIG. 4 is a perspective view diagram of an aircraft in a take-off state according to various embodiments. In some embodiments, aircraft 100 comprises a low-drag and lightweight landing module that may be extended during take-off or landing, as illustrated in FIG. 4.

The landing module of first wing 120a (e.g., connected to first nacelle 110a or first top winglet or first bottom winglet) comprises a first landing support member and a second landing support member. Similarly, in the example shown in FIG. 4, the landing module of second wing 120b (e.g., connected to second nacelle 110b or second top winglet 152b or second bottom winglet 154b) comprises third landing support member 156b and fourth landing support member 158b. As illustrated, third landing support member 156b and fourth landing support member 158b provide a wide stance when aircraft 100 is landed. For example, third landing support member 156b and fourth landing support member 158b comprise a panel design. The panels may be retracted during flight to ensure efficient drag management (e.g., third landing support member 156b and fourth landing support member 158b when in the retracted position—for example, a closed clam shell configuration—contribute low drag to aircraft 100).

In some embodiments, the landing module is configured to be relatively expeditionary, such as to provide aircraft 100 with the ability to land/take-off on uneven terrain, odd ground surfaces, or otherwise challenging terrain. For example, the first landing support member and the second landing support member and/or third landing support member 156b and fourth landing support member 158b may be shaped to provide support on uneven or inclined ground surfaces.

Figure 5A:
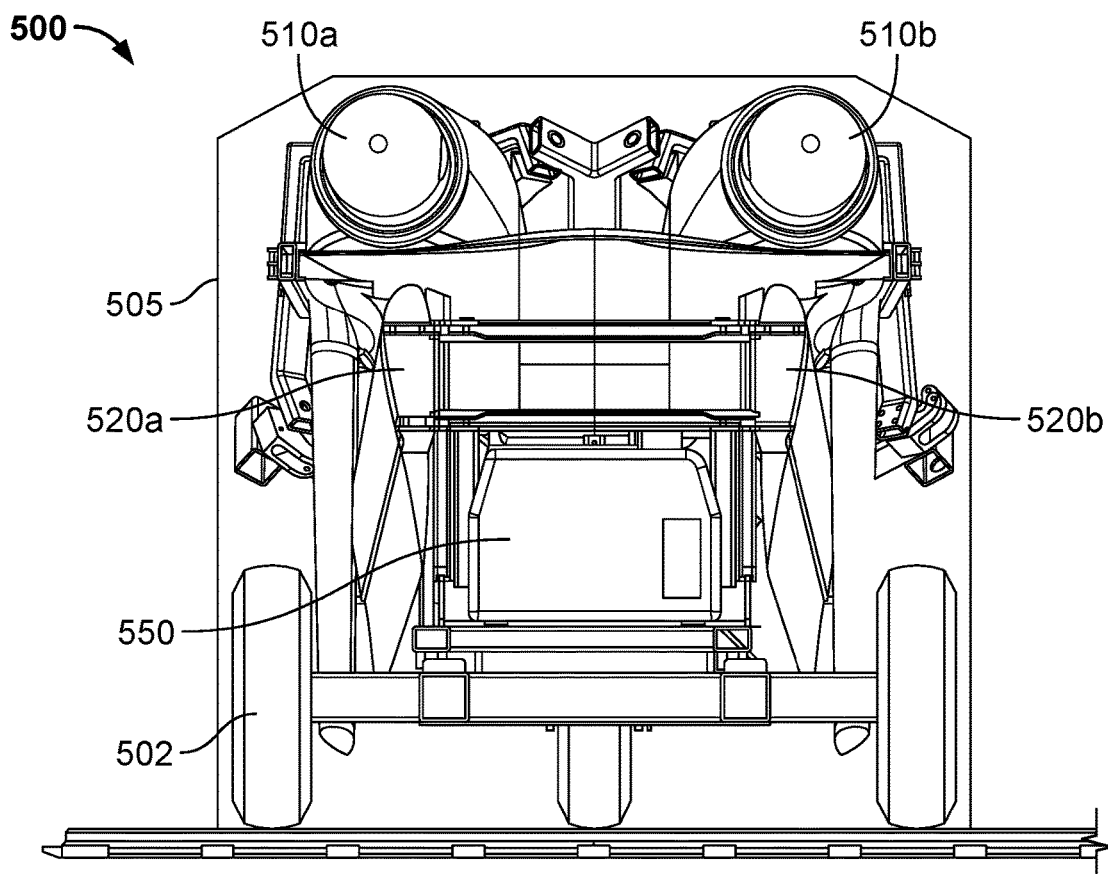
FIG. 5A is a front view of an aircraft in a disassembled state according to various embodiments.
Figure 5B:
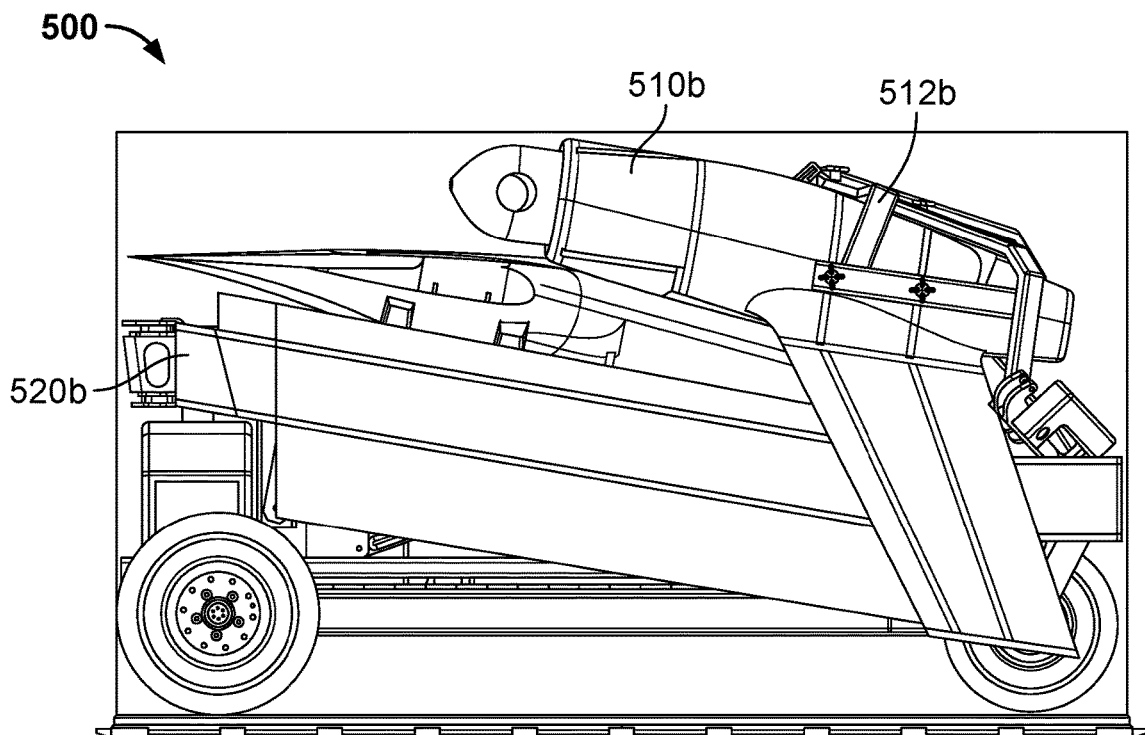
FIG. 5B is a side view of an aircraft in a disassembled state according to various embodiments.

FIGS. 5A and 5B are front view and side view diagrams of an aircraft in a disassembled state according to various embodiments. In the example shown, aircraft 500 is configured in a disassembled state. The components for aircraft 500 are carried on cart 502. In some embodiments, the components collectively fit within envelope 505. As an example, dimensions of envelope 505 may be determined based on, or constrained by, dimensions of a cargo hold of a vessel in which aircraft 500 is to be transported.

As illustrated in FIGS. 5A and 5B, first nacelle 510a and second nacelle 510b are respectively detached from first wing 520a and second wing 520b and are placed/mounted on a nacelle support member (e.g., second nacelle support member 512b) of cart 502. In the disassembled state, first wing 520a and second wing 520b are folded around the center wing. First wing 520a, second wing 520b, and center wing may be respectively mounted/supported by support members of cart 502. The fuselage is folded from the center wing such that the fuselage occupies the space between the folded first wing 520a and the second wing 520b. During assembly, first nacelle 510a is connected to first wing 520a via a first nacelle support member on first wing 520a. Similarly, second nacelle 510b is connected to second wing 520b via a second nacelle support member on second wing 520b. As an example, the nacelle support members on the wings are inserted into the corresponding nacelles and the nacelles are mounted (e.g., bolted) to the wings.

In some embodiments, cart 502 comprises (e.g., supports) generator 550 for supplying electrical power. In some embodiments, a separate fuel tank (not shown in FIG. 5A or FIG. 5B) is used to supply aircraft 500 with fuel during assembly. In some embodiments, the fuel is pumped from the separate fuel tank to the fuselage fuel tank, to a first nacelle fuel tank, and/or to a second nacelle fuel tank. In some embodiments, cart 502 includes a fuel pump and a hose with connector/valve for interfacing with a fuel inlet for the fuselage, the first nacelle, and/or the second nacelle.

In some embodiments, cart 502 comprises support members that are controlled via motor or hydraulic piston to lift heavy components during assembly/disassembly. The hydraulic/motor support ensures that aircraft 500 is quickly assembled/disassembled and with less resources (e.g., human operators or other support equipment, such as a portable crane, etc.). In some embodiments, the time from drop shipment to take-off is within 30 minutes. Aircraft 500 can be assembled in about 10 minutes.

As illustrated in FIGS. 5A and 5B, aircraft 500 in a disassembled state is relatively compact relative to dimensions of the expanded aircraft 500 (e.g., in an assembled state).

According to various embodiments, the aircraft is designed to include interfaces between components that balance minimizing drag (e.g., having drag contributions less than a predefined draft threshold) and facilitating quick and easy assembly/disassembly. In some embodiments, certain components are mounted via a hinge so that assembly/disassembly includes merely manipulating an interface bolt and rotating the component to transition between a disassembled state and an assembled state.

Figure 6A:
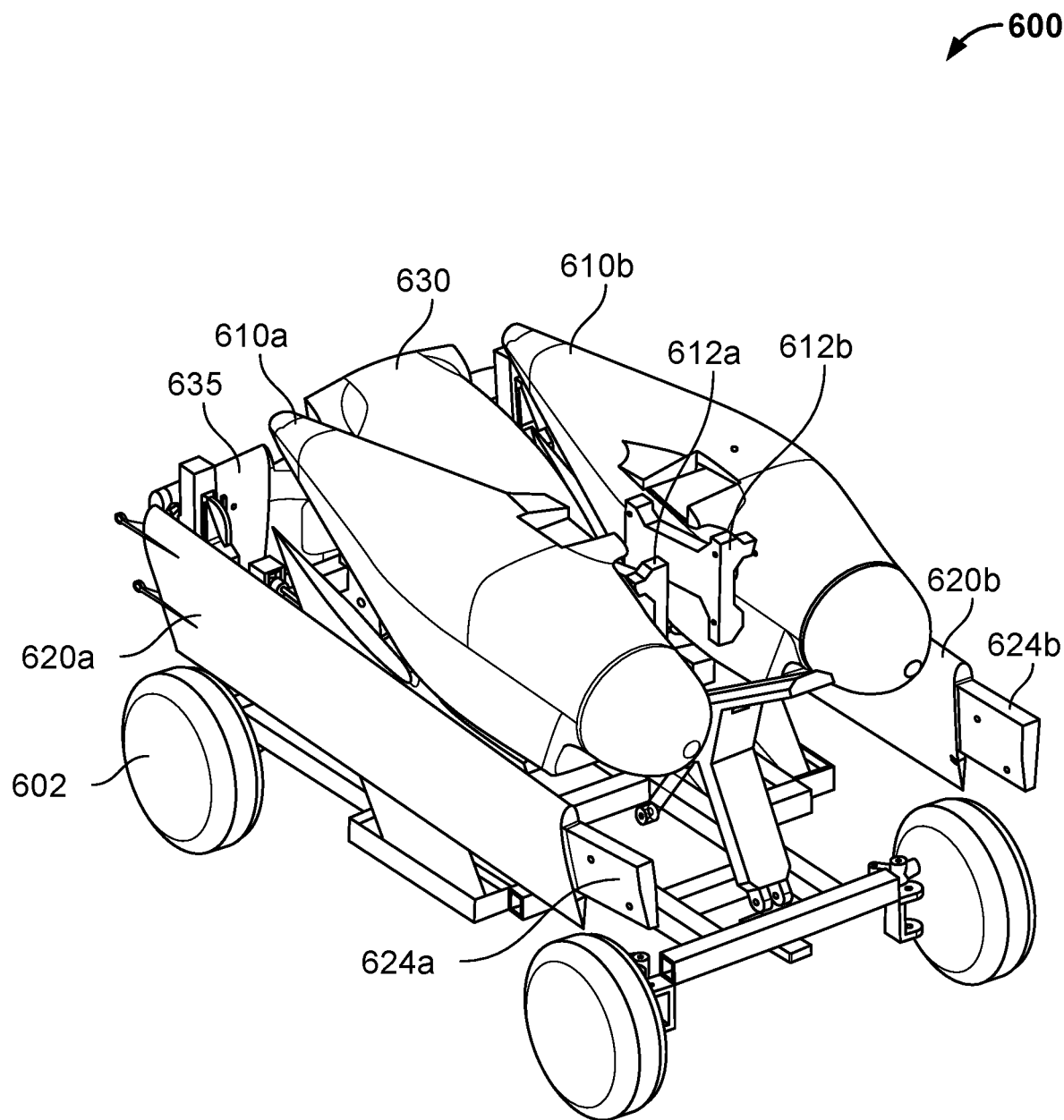
FIG. 6A is a perspective view of an aircraft in a disassembled state according to various embodiments.

FIG. 6A is a diagram of an embodiment of an aircraft in a disassembled state. In the example shown, first nacelle 610a and second nacelle 610b are respectively detached from first wing 620a and second wing 620b and are placed/mounted on a nacelle support member (e.g., first nacelle support member 612a and second nacelle support member 612b) of cart 602. In the disassembled state, first wing 620a and second wing 620b are folded around center wing 635. First wing 620a, second wing 620b, and center wing 635 may be respectively mounted/supported by support members of cart 602. Fuselage 630 is folded from center wing 635 such that the fuselage occupies the space between the folded first wing 620a and the second wing 620b. During assembly, first nacelle 610a is connected to first wing 620a via first nacelle support member 624a on first wing 620a. Similarly, second nacelle 610b is connected to second wing 620b via second nacelle support member 624b on second wing 620b. As an example, the nacelle support members on the wings are inserted into the corresponding nacelles and the nacelles are mounted (e.g., bolted) to the wings.

In some embodiments, cart 602 comprises support members that are controlled via motor or hydraulic piston to lift heavy components during assembly/disassembly. The hydraulic/motor support ensures that aircraft 600 is quickly assembled/disassembled and with less resources (e.g., human operators or other support equipment, such as a portable crane, etc.). In some embodiments, the time from drop shipment to take-off is within 30 minutes. Aircraft 600 can be assembled in about 10 minutes.

As illustrated in FIG. 6A, aircraft 600 in a disassembled state is relatively compact relative to dimensions of the expanded aircraft 600 (e.g., in an assembled state).

According to various embodiments, the aircraft is designed to include interfaces between components that balance minimizing drag (e.g., have drag contributions less than a predefined draft threshold) and facilitating quick and easy assembly/disassembly. In some embodiments, certain components are mounted via a hinge so that assembly/disassembly includes merely manipulating an interface bolt and rotating the component to transition between a disassembled state and an assembled state.

In some embodiments, the fuel system includes connections (e.g., dry break connections that allow flow when connected and do not allow flow when not connected) that do not allow fuel to drain from the fuselage fuel tank, the first nacelle fuel tank, and/or the second nacelle fuel tank in the event that the aircraft is in a dissembled state with the fuel connections between the fuselage fuel tank, the first nacelle fuel tank, and/or the second nacelle fuel tank being not connected.

Figure 6B:
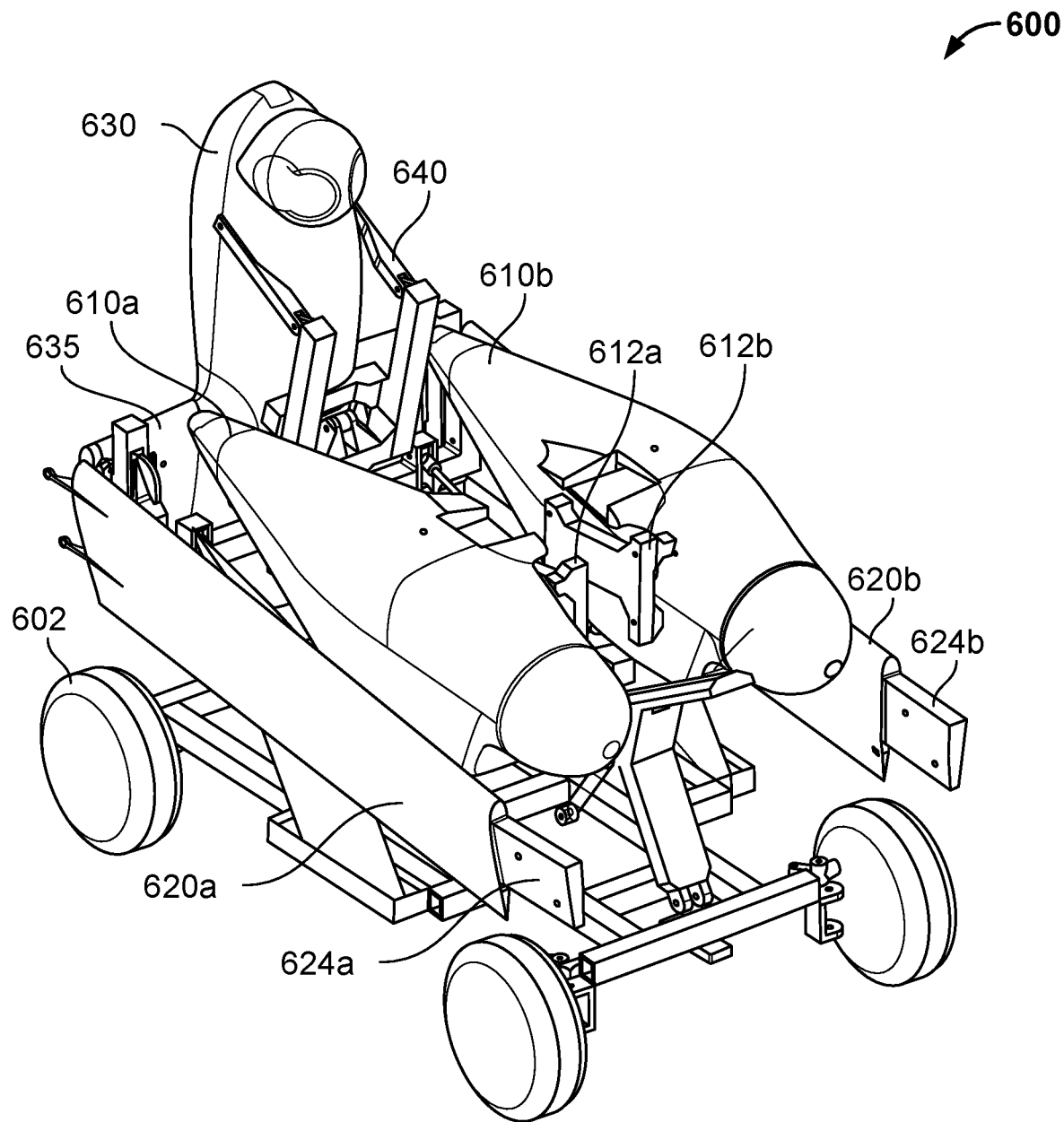
FIG. 6B is a perspective view of an aircraft in a disassembled state according to various embodiments.

FIG. 6B is a perspective view of an aircraft in a disassembled state according to various embodiments. In the example shown in FIG. 6B of a state of aircraft 600, fuselage 630 is shown rotated upwards (e.g., using a hinge to pivot fuselage 630 to a fuselage assembled state where fuselage 630 is coupled to center wing 635). Fuselage 630 is transitioned from a disassembled state in which fuselage 630 rests in the space defined by folded first wing 620a and second wing 620b to an assembled state in which fuselage 630 engages with center wing 635 and extends substantially vertically from the ground. In some embodiments, assembly of fuselage 630 includes rotating fuselage around an axis defined by a hinge mount that connects fuselage 630 and center wing 635. In response to fuselage 630 being rotated upwards and transitioned to an assembled state, fuselage 630 is fixedly mounted to center wing 635, such as by inserting/tightening interface bolts.

Figure 6C:
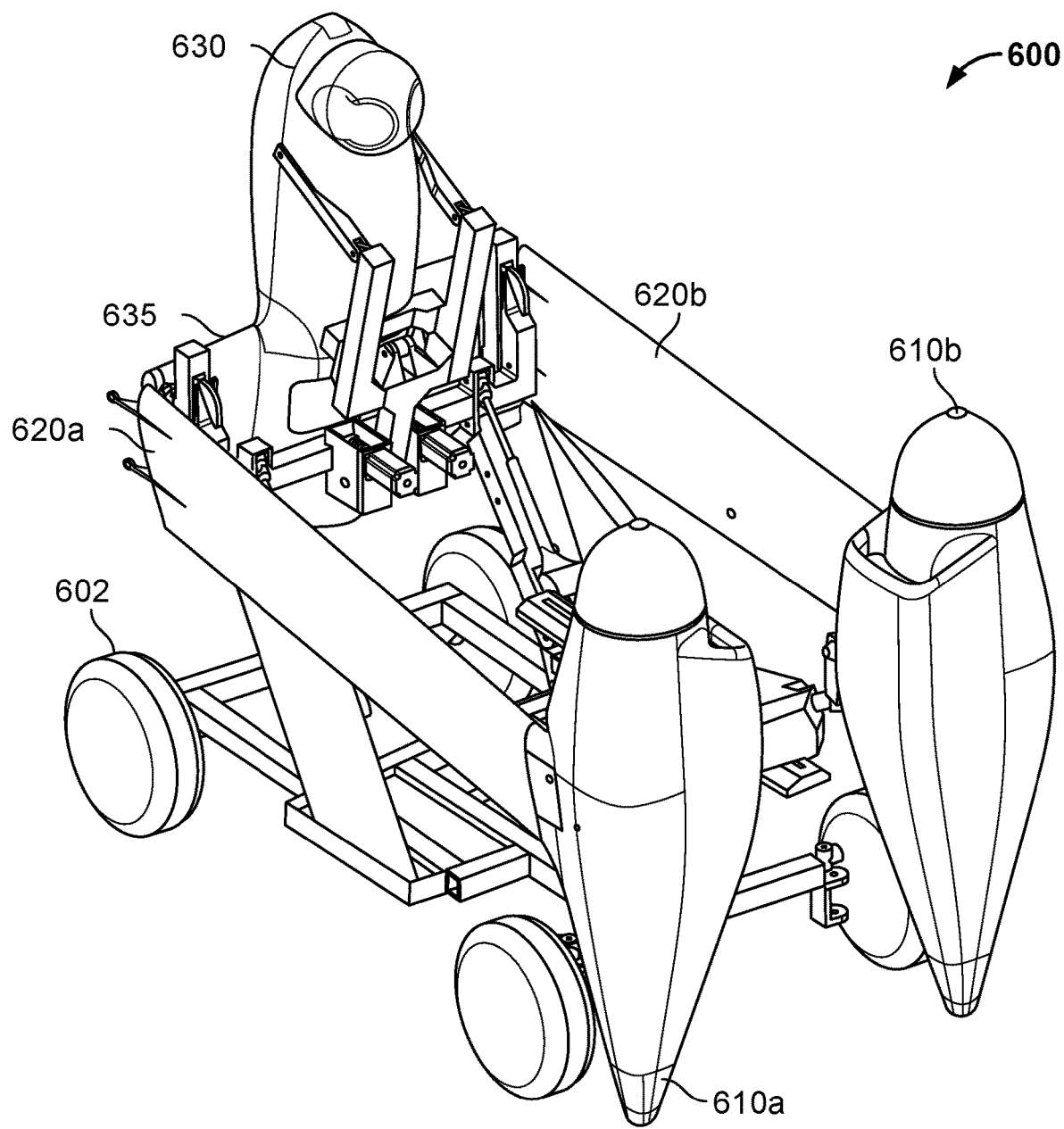
FIG. 6C is a perspective view of an aircraft in a partially assembled state according to various embodiments.

FIG. 6C is a perspective view of an aircraft in a partially assembled state according to various embodiments. In the example shown in FIG. 6C of a state of aircraft 600, the wings are positioned for mounting to the nacelles. In the example shown, first wing 620a and second wing 620b are moved (e.g., raised) to align nacelle support members 624a, 624b with first nacelle 610a and second nacelle 610b, respectively. In some embodiments, moving first wing 620a and second wing 620b for alignment includes raising fuselage 630 and/or center wing 635, such as by actuating movement of support member 640. As fuselage 630 and center wing 635 are moved, first wing 620a and second wing 620b are moved in turn.

Figure 6D:
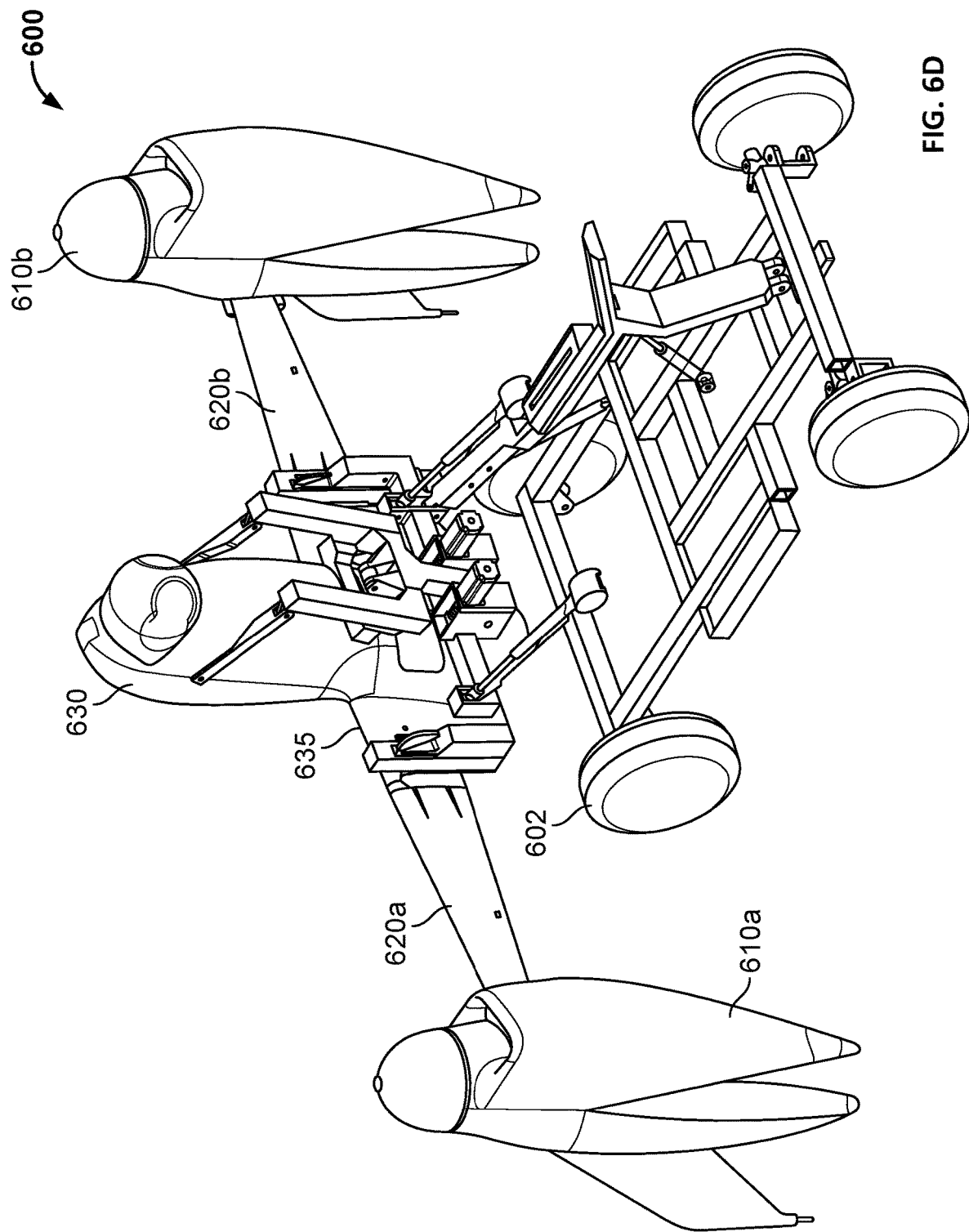
FIG. 6D is a perspective view of an aircraft in a partially assembled state according to various embodiments.

FIG. 6D is a perspective view of an aircraft in a partially assembled state according to various embodiments. In the example shown in FIG. 6D of a state of aircraft 600, the wings are extended for fixedly mounting the wings to the center wing. In response to the nacelles being fixedly mounted to the wings, the wings are moved to the position at which the wings are to be fixed to the center wing. In some embodiments, the wings are respectively connected to the center wing via a hinge. Accordingly, the wings are rotated around the axes respectively defined by the hinges until the wings are level (or substantially level) with the center wing. Mounting the wings to the center wing may include configuring an attachment mechanism, such as an interface bolt, to fixedly mount the wings to the center wing. In some embodiments, the winglets are attached using a ball spring pin and/or a spring loaded locking pin.

Figure 7A:
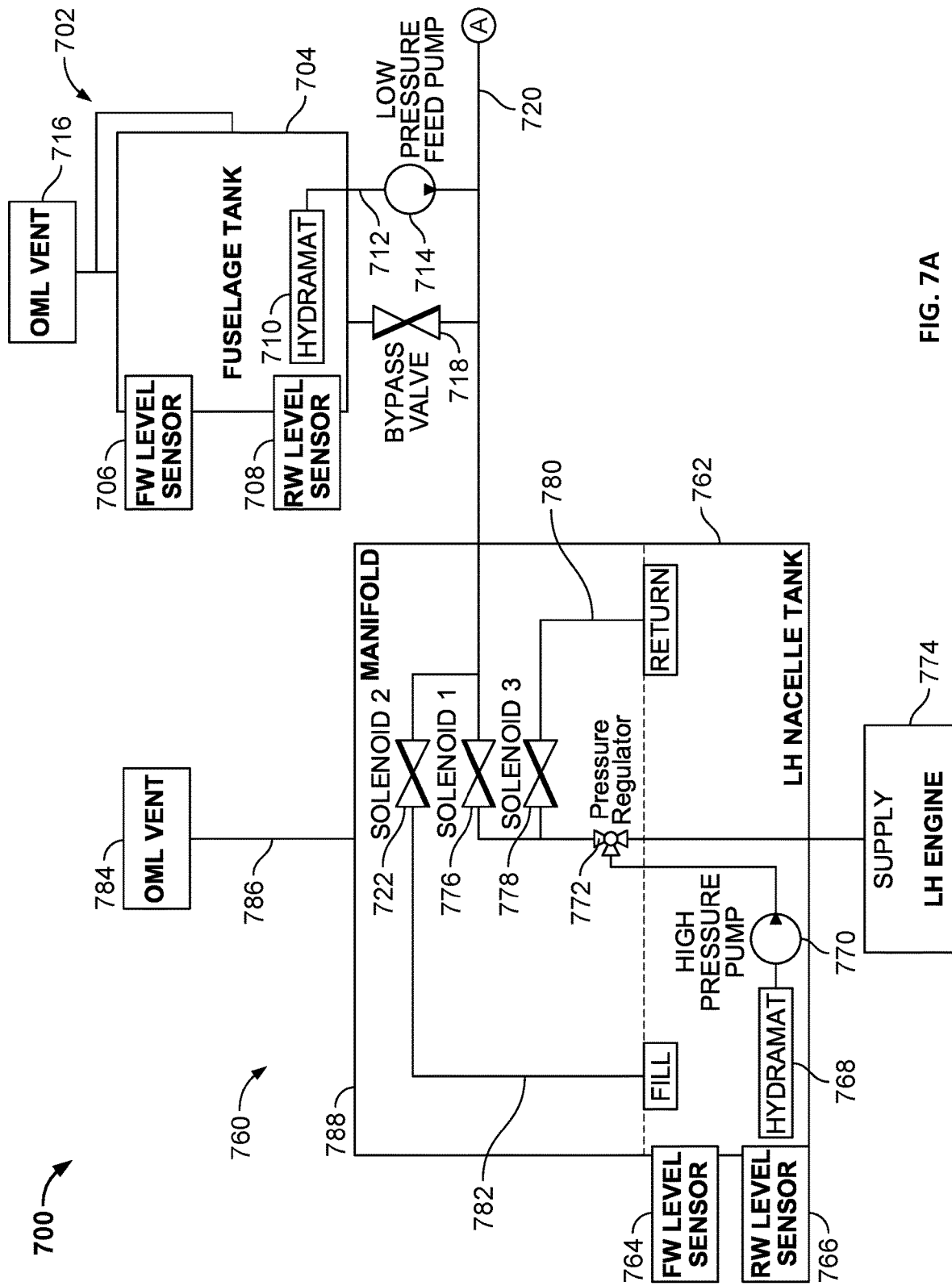
FIGS. 7A and 7B are diagrams of a fuel system for an aircraft according to various embodiments.
Figure 7B:
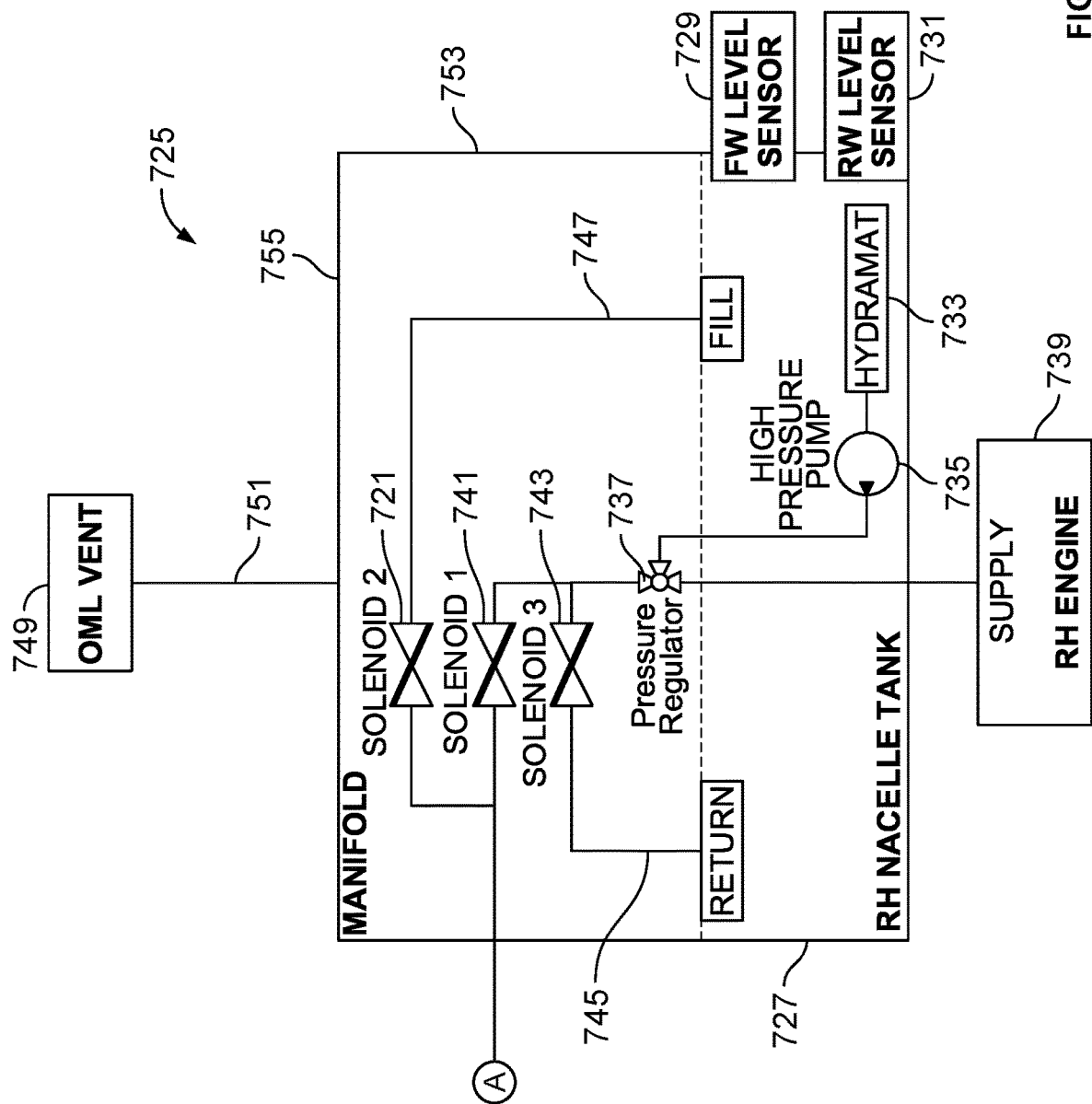

FIGS. 7A and 7B are diagrams of a fuel system for an aircraft according to various embodiments. In the example shown, aircraft 700 comprises one or more fuel tanks. As illustrated, aircraft 700 can comprise a fuselage fuel system 702 (e.g., including fuselage fuel tank 704), right nacelle fuel system 725 (e.g., including right nacelle fuel tank 727), and/or left nacelle fuel system 760 (e.g., including left nacelle fuel tank 762). Aircraft 700 further comprises a control system (not shown) that controls the fuel system(s), such as to determine distribution/re-distribution of fuel and/or manage the distribution of fuel across the various fuel tanks (e.g., controlling the valves to open/close fuel pathways according to the plan for distributing fuel).

Fuselage fuel system 702 comprises a plurality of sensors that obtain sensor data from which the fuel level in fuselage fuel tank 704 is determined. For example, fuselage fuel system 702 comprises first fuselage fuel sensor 706 and second fuselage fuel sensor 708. First fuselage fuel sensor 706 and second fuselage fuel sensor 708 are disposed in different orientations/locations of fuselage fuel tank 704 to obtain sensor readings along different directions to account for the change in aircraft orientation between the VTOL orientation and the horizontal flight orientation. As an example, first fuselage fuel sensor 706 is disposed in a vertical direction of fuselage fuel tank 704 when aircraft is viewed in a horizontal flight orientation, and second fuselage fuel sensor 708 is disposed in a horizontal direction of fuselage fuel tank 704. First fuselage fuel sensor 706 and second fuselage fuel sensor 708 may be configured to measure fuel levels/heights in substantially perpendicular directions. In some embodiments, first fuselage fuel sensor 706 and second fuselage fuel sensor 708 are capacitive sensors.

The aircraft control system determines a fuel level in fuselage fuel tank 704 based at least in part the sensor data for the plurality of sensors in fuselage fuel tank 704 (e.g., sensor readings for first fuselage fuel sensor 706 and second fuselage fuel sensor 708). For example, the control system stores a predetermined mapping (or lookup table) of sensor readings for first fuselage fuel sensor 706 and second fuselage fuel sensor 708 (e.g., the sensor data) to fuel levels. In response to obtaining the sensor data from first fuselage fuel sensor 706 and second fuselage fuel sensor 708, the control system queries the predetermined mapping to determine the fuel level in fuselage fuel tank 704.

Fuselage fuel system 702 further comprises fuel line 712 via which fuel is redistributed from fuselage fuel tank 704 to elsewhere in the aircraft such as to right nacelle fuel tank 727 and/or left nacelle fuel system 760. Fuel is provided to the nacelle fuel tanks based on control of low-pressure pump 714. Low-pressure pump 714 pulls fuel from fuselage fuel tank 704 via fuel line 712. In some embodiments, low-pressure pump 714 comprises a custom designed fuel pump to transfer fuel from the fuselage tank to the nacelle tanks at a higher flow rate that a high-pressure pump used to supply the engines and not at necessarily a constant pressure like the high-pressure pump. In some embodiments, low-pressure pump 714 comprises a gear pump which operates between 1-12 psig. In some embodiments, low-pressure pump 714 is designed to be a high-volume pump (e.g., a design to maximize flow rate). In some embodiments, the high-pressure pump is designed for low volume (e.g., a design for low flow rate) but very high pressure (45-120 psig).

Fuel line 712 obtains the fuel from a wicking system 710. Wicking system 710 pulls fuel from the low point of fuselage fuel tank 704 (e.g., the bottom of the fuselage fuel tank) and provides the fuel to fuel line 712, which can then be pumped out of fuselage fuel tank 704 via control of low-pressure pump 714. As an example, wicking system 710 comprises a wicking material, such as a HydraMat® material. Wicking system 710 comprises a first portion of wicking material and a second portion of wicking material. The first portion of wicking material is disposed on a first side (e.g., disposed on or at a first inner wall) of fuselage fuel tank 704 that corresponds to a low point of fuselage fuel tank 704 when the aircraft is oriented in a VTOL orientation. The second portion of wicking material is disposed on a second side (e.g., disposed on or at a second inner wall) of fuselage fuel tank 704 that corresponds to the low-point of fuselage fuel tank 704 when aircraft 700 is oriented in a horizontal flight orientation. The configuration of portions of wicking material on a plurality of inner walls or at regions corresponding to the low point of fuselage fuel tank 704 allows wicking system 710 to provide a supply of fuel to fuel line 712 across a range of aircraft pitches even when the fuel level in fuselage fuel tank 704 is low. For example, fuel line 712 pulls fuel from the low point of fuselage fuel tank 704 via the wicking system regardless of whether aircraft 700 is in the VTOL orientation or horizontal flight orientation (or at a pitch between those two orientations).

In some embodiments, the low point of the fuel tank includes a bottom third of the fuel tank for the particular orientation the aircraft is currently disposed (e.g., the VTOL, or horizontal flight orientation). In some embodiments, the low point of the fuel tank includes a bottom quarter of the fuel tank according to the current aircraft orientation. In some embodiments, the low point of the fuel tank includes a bottom fifth of the fuel tank according to the current aircraft orientation.

In some embodiments, the low point of the fuel tank includes a region comprising the bottom two percent the fuel tank according to the current aircraft orientation. In other implementations, the low point of the fuel tank includes a region comprising one or more of the bottom five percent, ten percent, or fifteen percent of the fuel tank.

In some embodiments, the fuselage fuel system comprises a fuselage venting mechanism. The fuselage venting mechanism comprises (a) a top port comprised on a top surface of a corresponding fuel tank, (b) a fore port comprised on a fore surface of the corresponding fuel tank, (c) a pressure valve connected to the top port and the fore port, and configured to open or close to control pressure in the corresponding tank, (d) a first fluid pathway to carry, via the top port, a gas from a top of the corresponding fuel tank when the aircraft is in a horizontal flight orientation, and (e) a second fluid pathway to carry, via the fore port, the gas from a fore of the corresponding fuel tank when the aircraft is in a vertical take-off and landing orientation.

Fuselage fuel system 702 further comprises a fuselage venting mechanism 716. Venting mechanism 716 enables control or reduction of pressure build-up in fuselage fuel tank 704. In some embodiments, venting mechanism 716 is configured to permit gas/fluid to flow to/from fuselage fuel tank 704. Venting mechanism 716 permits the gas/fluid from a top region of fuselage fuel tank 704 when aircraft 700 is in the VTOL orientation or a top region of fuselage fuel tank 704 when aircraft 700 is in the horizontal flight orientation. As an example, venting mechanism 716 comprises a first venting module and a second venting module. The first venting module and the second venting module are configured to provide venting from a top of fuselage fuel tank 704 when the aircraft is in one of (i) a VTOL orientation, or (ii) a horizontal flight orientation.

Fuel is returned to fuselage fuel tank 704 from right nacelle fuel tank 727 and/or left nacelle fuel system 760 via bypass valve 718. The aircraft control system controls the configuration of bypass valve 718 to open bypass valve 718 when fuel is to be redistributed to fuselage fuel tank 704, and to close bypass valve 718 when fuel is not to be redistributed to fuselage fuel tank 704.

In some embodiments, the fuel system of aircraft 700 comprises a set of valves that may be controlled (e.g., by the aircraft control system) to permit/restrict the flow of fuel to different regions or fuel pathways. As an example, the set of valves may comprise one or more solenoid valves, which can be controlled via a control signal from the aircraft control system. Various other types of valves may be implemented.

As illustrated in FIGS. 7A and 7B, aircraft 700 includes fuel line 720 that is configured to distribute fuel across fuselage fuel tank 704, right nacelle fuel tank 727, and/or left nacelle fuel tank 762. For example, fuel output from low-pressure pump 714 is provided to fuel line 720 when fuel is to be pumped to a right nacelle fuel tank 727 and/or left nacelle fuel tank 762. The aircraft control system controls right nacelle fuel system 725 and left nacelle fuel system 760 based on whether fuel is to be redistributed to right nacelle fuel tank 727 and/or left nacelle fuel tank 762. For example, the aircraft control system controls to open valves (e.g., valve 721 or valve 722) connected to fuel line 720 that respectively permit to flow into the corresponding nacelle fuel tank. Aircraft control system sends a control signal to valve 721 to open/close valve 721 to control the flow from fuel line 720 through in-flow fuel line 747 to right nacelle fuel tank 727. Similarly, the aircraft control system sends a control signal to valve 722 to open/close valve 722 to control the flow from fuel line 720 through in-flow fuel line 782 to left nacelle fuel tank 762.

The nacelle fuel systems comprise a set of sensors to measure fuel within the nacelle fuel tanks. For example, right nacelle fuel system 725 comprises a set of sensors (e.g., sensors 729, 731) to obtain sensor data to be used to measure the fuel level in right nacelle fuel tank 727. Similarly, left nacelle fuel tank 762 comprises a set of sensors (e.g., first fuel sensor sensors 764, 766) to obtain sensor data to be used to measure the fuel level in left nacelle fuel tank 762. The set of sensors in the nacelle fuel systems are configured to measure fuel levels in different directions (e.g., substantially orthogonal directions), such as the fuel level/heights in a vertical direction and a horizontal direction (e.g., from the perspective of aircraft viewed in the horizontal flight orientation). Different subsets of one or more sensors may be disposed in different orientations/locations of the nacelle fuel tanks (e.g., right nacelle fuel tank 727 and left nacelle fuel tank 762). In some embodiments, sensors 729, 731, and sensors 764, 766 are respectively the same, or similar to, sensors 706, 708 (e.g., disposed in fuselage fuel system 702) or the configuration(s) thereof.

In some embodiments, the system determines a fuel redistribution based at least in part on sensor data from one or more of a first set of fuel sensors comprised in the first nacelle fuel tank, a second set of fuel sensors comprised in the second nacelle fuel tank, and a third set of fuel sensors comprised in the fuselage fuel tank. The aircraft control system uses the sensor data obtained from the respective set of sensors in the nacelle fuel tanks to determine the fuel level/heights in the nacelle fuel tanks. For example, the control system queries a predetermined mapping of sensor readings from the sensors in the set of sensors to fuel levels to determine the fuel level in the corresponding nacelle fuel tank.

In response to determining the fuel level/height in the right and left nacelle fuel tanks 727, 762 and/or fuselage fuel tank 704, the control system determines whether to redistribute fuel across fuselage fuel tank 704, right nacelle fuel tank 727, and/or left nacelle fuel tank 762 based on the fuel levels. Further, in response to determining that fuel is to be redistributed, the control system determines a plan for redistributing the fuel, including an extent of the fuel redistribution and a strategy for controlling the various fuel pathways to enable fuel to flow in accordance with the intended fuel redistribution (e.g., to control the valves within the fuel system).

Aircraft 700 comprises a set of engines to propel aircraft 700, such as right engine 739 and left engine 774. Aircraft 700 uses fuel within right nacelle fuel tank 727 to provide a fuel supply to right engine 739 and fuel within left nacelle fuel tank 762 to provide a fuel supply to left engine 774. In connection with driving the engines, the control system drives a high-pressure pump(s) for the nacelle fuel systems (e.g., high pressure pumps 735, 770) to pump fuel from the corresponding nacelle fuel tanks to the engines. In some embodiments, high pressure pumps 735, 770 are meant to supply fuel to an engine at a constant pressure to ensure the engine maintains a constant fuel source. In some embodiments, high pressure pumps 735, 770 are different than a low-pressure pump (e.g., low-pressure pump 714) in the aspect that they have a much smaller form factor, have a submersible design (lives in the fuel tank), and are lightweight. In some embodiments, high pressure pumps 735, 770 are designed for low volume (e.g., a design for low flow rate) but very high pressure (45-120 psig). Similar to fuselage fuel system 702, right nacelle fuel system 725 and/or left nacelle fuel system 760 comprises wicking systems 733, 768 to pull fuel from the bottom region of the corresponding nacelle fuel tank when aircraft 700 is in both the VTOL orientation and the horizontal flight orientation. Wicking systems 733, 768 can be the same as, or similar to, wicking system 710, such as including a first portion of a wicking material disposed in the region of one inner side of the nacelle fuel tank (e.g., corresponding to the bottom of the nacelle fuel tank when aircraft 700 is in the VTOL orientation) and a second portion of wicking material disposed in the region of another inner side of the nacelle fuel tank (e.g., corresponding to the bottom of the nacelle fuel tank when aircraft 700 is in the horizontal flight orientation). In the example shown, wicking system 733 provides a fuel supply that is input to high pressure pump 735 to provide the fuel to right engine 739 and/or redistribute fuel to fuselage fuel tank 704 or left nacelle fuel tank 762. Similarly, wicking system 768 provides a fuel supply that is input to high pressure pump 770 to provide the fuel to left engine 774 and/or redistribute fuel to fuselage fuel tank 704 or right nacelle fuel tank 727.

In some embodiments, aircraft 700 comprises a pressure regulator disposed in a fuel path between a high-pressure fuel pump and a first engine, such as pressure regulator 737 that provides fuel to right engine 739. The pressure regulator is configured to maintain a constant pressure of fuel being pumped to the first engine.

The aircraft control system controls high pressure pumps 735, 770 to pump fuel from right nacelle fuel tank 727 and left nacelle fuel tank 762, respectively. In the example shown, the fuel output from high pressure pumps 735, 770 is respectively input to a pressure regulator, such as pressure regulators 737, 772, that respectively regulate the pressure of fuel provided to the corresponding engine. For example, pressure regulator 737 receives fuel from high pressure pump 735 and provides (e.g., via a first output port) fuel to right engine 739 at a substantially constant pressure. Pressure regulator 737 may comprise a second output port via which excess fuel (e.g., fuel that is not to be directed to right engine 739) is re-directed or diverted to another flow pathway, such as a return pathway to return the fuel to right nacelle fuel tank 727 or a redistribution pathway to redistribute the fuel to fuselage fuel tank 704 or left nacelle fuel tank 762.

In some embodiments, the aircraft control system selectively controls a configuration of the fuel pathways to control the manner in which to re-direct or divert fuel (e.g., excess fuel from driving the engine at a constant pressure). For example, the control system controls one or more valves that restrict/permit the flow of fuel along a pathway. In the example shown, the control system controls the configuration of valve 741 and/or 743 to redirect or divert excess fuel flowing from pressure regulator 737. Valve 741 can be controlled to permit/restrict the excess fuel redirected or diverted by pressure regulator 737 to flow to fuel line 720 (e.g., for redistribution to fuselage fuel tank 704 and/or left nacelle fuel tank 762). Valve 743 can be controlled to permit/restrict fuel to flow from pressure regulator 737 to return to right nacelle fuel tank 727 (e.g., via return fuel line 745). The control system similarly controls valve 776 to permit/restrict fuel to flow to fuel line 720 for redistribution within aircraft 700, and controls valve 778 to permit/restrict the flow of fuel redirected or diverted from pressure regulator 772 to return to left nacelle fuel tank 762 (e.g., via a return line, such as fuel line 780).

In some embodiments, the nacelle fuel systems (e.g., right nacelle fuel system 725 and left nacelle fuel system 760) respectively comprise venting systems. The configuration for the venting mechanism(s) for a nacelle fuel tank may be the same as, or different from, the configuration for venting mechanism 716 for fuselage fuel tank 704. In the example shown, right nacelle fuel system 725 comprises venting mechanism 749 and left nacelle fuel system 760 comprises venting mechanism 784. Venting mechanisms 749, 784 are configured to regulate pressure within the corresponding nacelle fuel tanks, such as by permitting/restricting the flow of gas/fluid from the nacelle fuel tanks to a pressure valve via pressure relief pathways 751, 786, respectively. The pressure relief pathways/lines are supply lines that carry the gas/fluid to the pressure valve for pressure regulation.

In some embodiments, the venting mechanism (e.g., a venting module) comprises a pressure relief line connected to the port and configured to have a distal end at a fore of the first nacelle fuel tank to allow gas to enter the port when the aircraft is in the vertical take-off or land orientation. The port may comprise a first rollover valve and a second rollover valve that are respectively configured to provide passive control of permitting or restricting gas to flow from the first venting module or the second venting module to the pressure valve based on an aircraft orientation.

The venting mechanisms 749, 784 may also include a module (e.g., a rollover valve) that restricts the flow of fluid from other regions in the fuel tank (e.g., the top of the fuel tank when the fore of the fuel tank serves as the top region, such as in a VTOL orientation). For example, when the aircraft is operating in the VTOL orientation, venting mechanisms 749, 784 are configured to enable gas from a top region of the fuel tank corresponding to the fore of the fuel tank to flow to the pressure valve, and to restrict gas or other fluid, such as fuel, from the bottom region of the fuel tank (e.g., the top, bottom, or aft sections of the fuel tank) according to the VTOL orientation. Conversely, when the aircraft is operating in the horizontal flight orientation, venting mechanisms 749, 784 are configured to enable gas from a top region of the fuel tank corresponding to a top of the fuel tank (e.g., when viewed from the perspective of horizontal flight) to flow to the pressure valve, and to restrict gas or other fluid, such as fuel, from the bottom region of the fuel tank.

The nacelle fuel systems may further comprise manifolds that encapsulate the valves of the nacelle fuel systems and/or the nacelle fuel tank. In the example shown, right nacelle fuel system 725 comprises manifold 753 that defines a cavity 755 in which the set of valves, fluid pathways (e.g., fuel pathways) and pressure regulator 737 are disposed. Similarly, left nacelle fuel system 760 comprises manifold 788.

Figure 8:
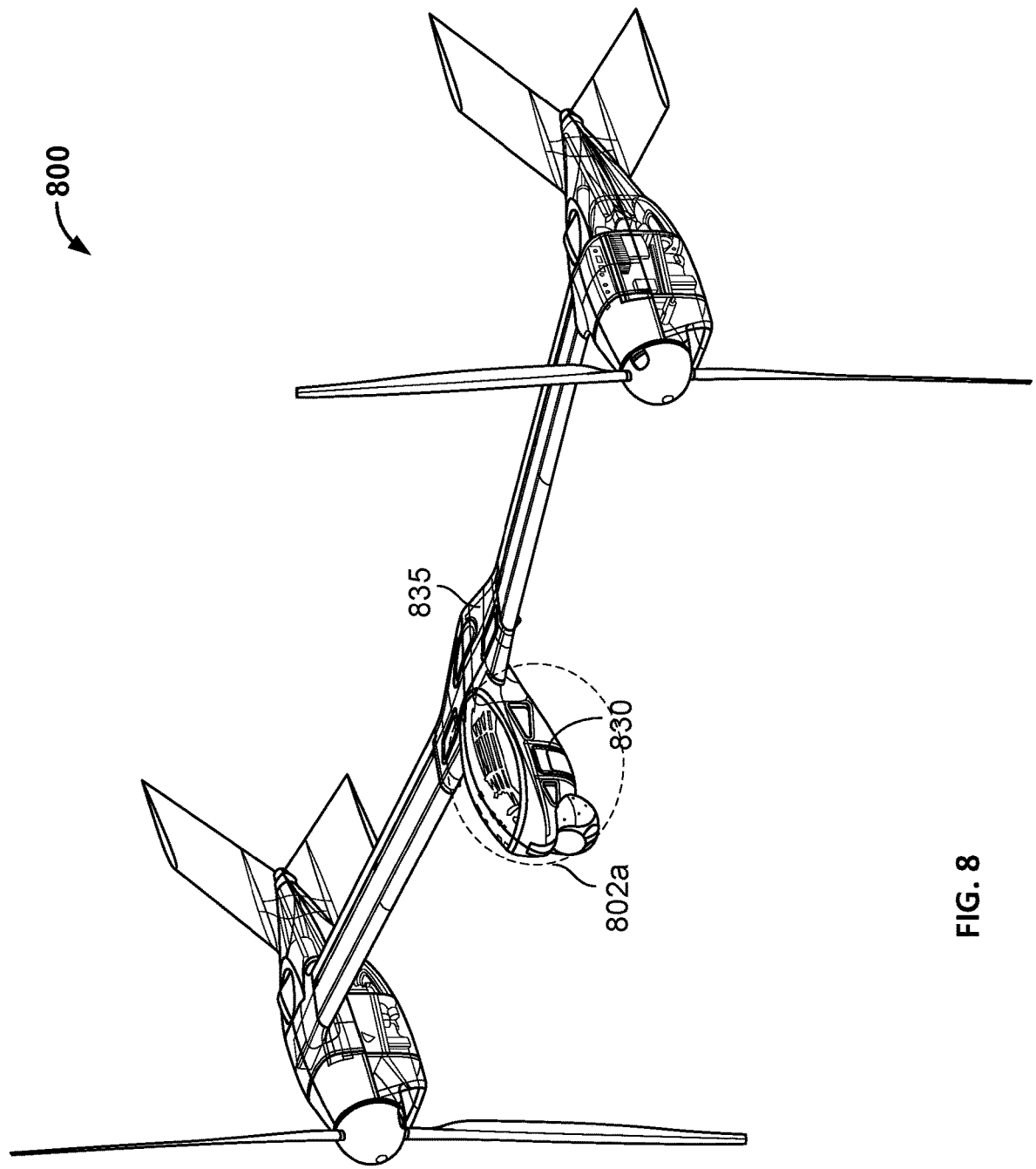
FIG. 8 is a diagram of an aircraft according to various embodiments.

FIG. 8 is a diagram of an aircraft according to various embodiments. In the example shown, fuselage-center wing mount 802a comprises a connection joint between fuselage 830 and center wing 835 for aircraft 800.

Figure 9A:
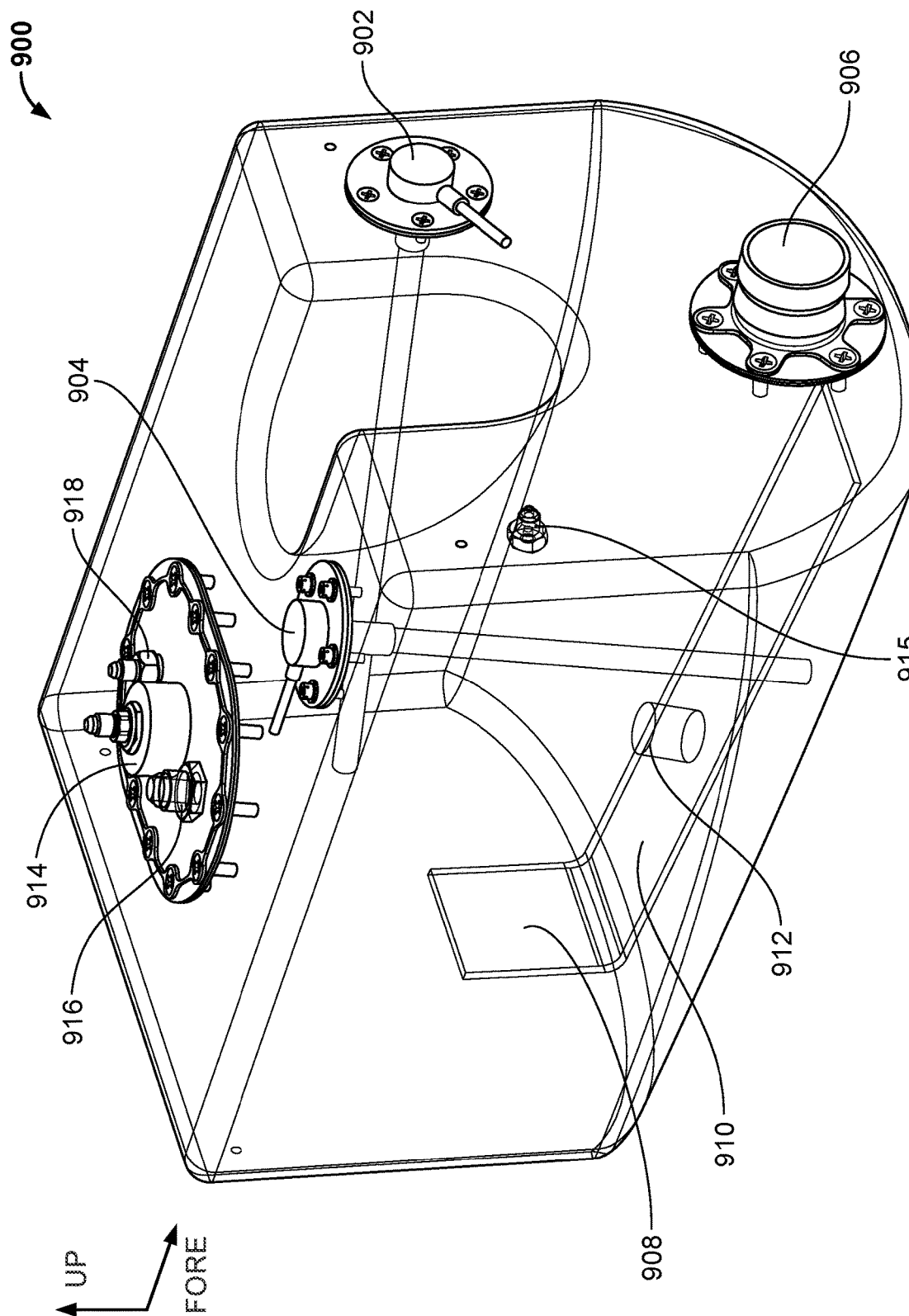
FIG. 9A is a diagram of a fuselage fuel tank for an aircraft according to various embodiments.
Figure 9B:
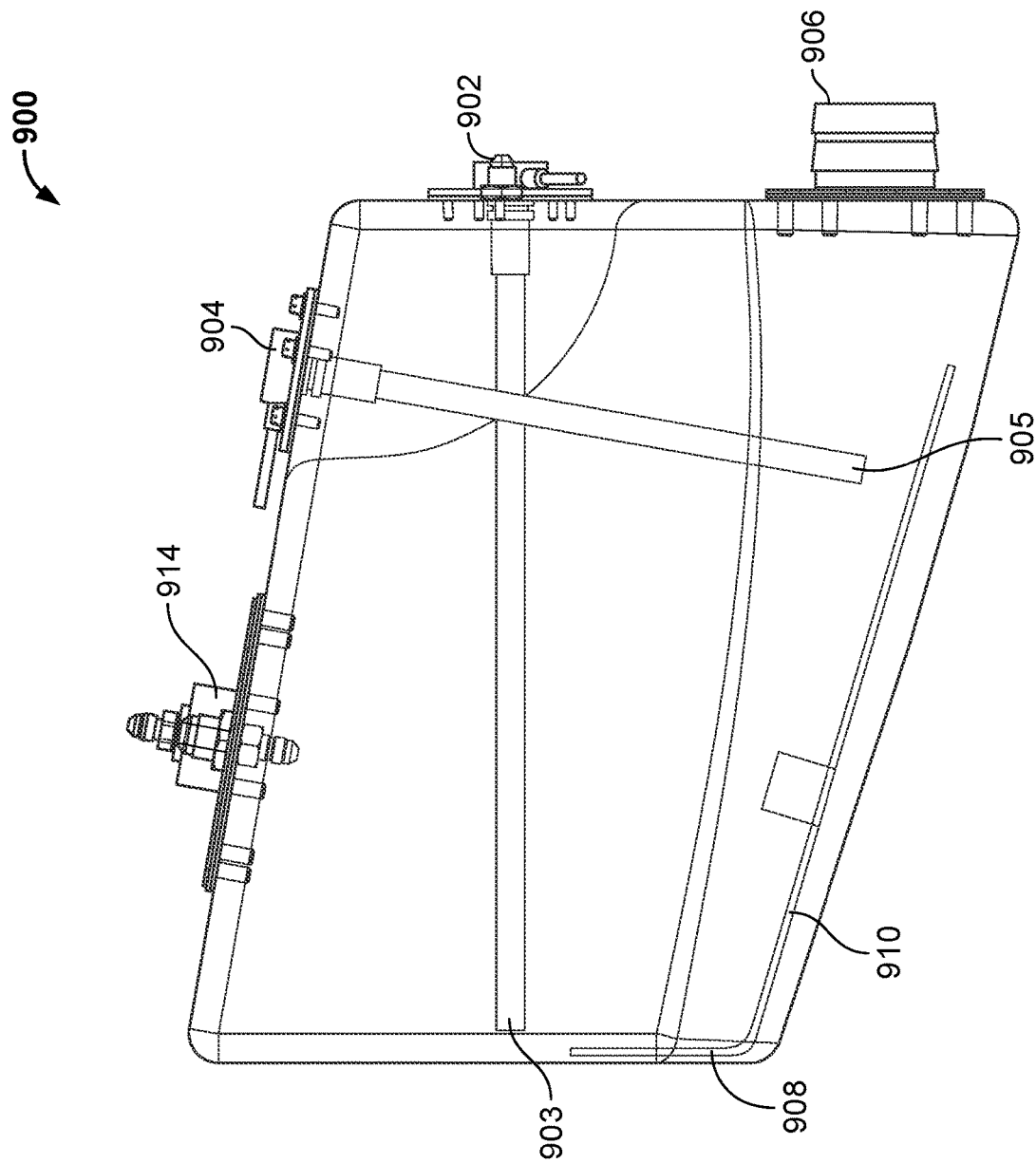
FIG. 9B is a diagram of a fuselage fuel tank for an aircraft according to various embodiments.
Figure 9C:
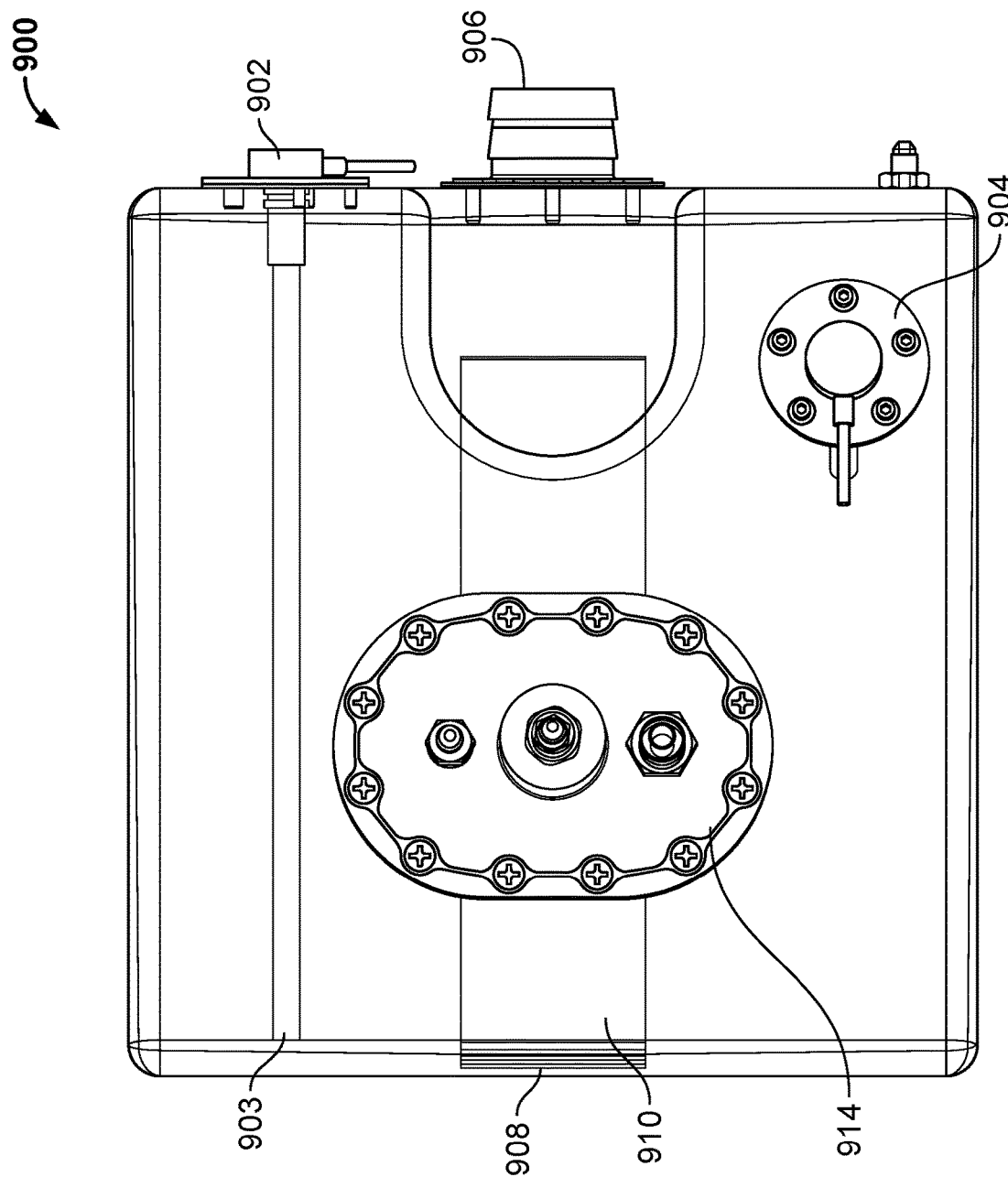
FIG. 9C is a diagram of a fuselage fuel tank for an aircraft according to various embodiments.

FIGS. 9A-9C are perspective, side, and top diagrams of a fuselage fuel tank for an aircraft according to various embodiments. In the example shown, fuselage fuel tank 900 comprises first sensor 902, second sensor 904, fill port 906, a wicking system (e.g., first portion 908 of wicking material and second portion 910 of wicking material), fuel line 912 configured to pull fuel from the wicking system for supplying fuel for redistribution, a venting mechanism that regulates pressure in fuselage fuel tank 900, a fuel supply mechanism comprising supply port 916 to provide a fuel supply for redistribution to one or more nacelle fuel tanks, and a bypass return mechanism comprising bypass return port 918 through which fuel flows into fuselage fuel tank 900 (e.g., fuel redirected or diverted from a nacelle fuel tank).

As illustrated, first sensor 902 comprises fuel level reading element 903 (e.g., a capacitive element for a capacitive sensor) that measures the fuel level when the aircraft is in a VTOL orientation or otherwise an extent to which fuel is filled in the fore-aft direction. Similarly, second sensor 904 comprises fuel level reading element 905 (e.g., a capacitive element for a capacitive sensor) that measures the fuel level when the aircraft is in a horizontal flight orientation or otherwise an extent to which fuel is filled in the up-down direction.

Fill port 906 is used to fill the fuel tank, such as from an external fuel source before operation of the aircraft.

The wicking mechanism comprises first portion 908 of wicking material and second portion 910 of wicking material. The first portion 908 of wicking material pulls fuel from the aft region of fuselage fuel tank 900, which corresponds to a bottom of fuselage fuel tank 900 when the aircraft is in the VTOL orientation. The second portion 910 of wicking material pulls fuel from the bottom region of fuselage fuel tank 900, which corresponds to a bottom of fuselage fuel tank 900 when the aircraft is in the horizontal flight orientation. The wicking mechanism enables the low-pressure pump to pull fuel from the bottom of the fuel tank via fuel line 912. In some embodiments, the wicking mechanism provides an additional function of filtration. For example, the wicking material provides 15-micron filtration, thereby enabling removal/filtration of impurities.

The venting mechanism comprises top venting port 914 disposed at a top region of fuselage fuel tank 900 and a fore venting port 915 disposed at a fore region of fuselage fuel tank 900. The venting mechanism regulates the pressure in fuselage fuel tank 900 when operating in the horizontal flight orientation by enabling gas to flow from a top region of fuselage fuel tank 900 through top venting port 914, and restricts the flow of fluid (e.g., gas, fuel, etc.) through fore venting port 915. Conversely, the venting mechanism regulates the pressure in fuselage fuel tank 900 when operating in the VTOL orientation by enabling gas to flow from a top region of fuselage fuel tank 900 through fore venting port 915, and restricts the flow of fluid (e.g., gas, fuel, etc.) through top venting port 914. Gas/fluid exiting fuselage fuel tank 900 via top venting port 914 and fore venting port 915 is carried to one or more pressure valves. Top venting port 914 and fore venting port 915 may share a pressure valve that regulates the pressure, or top venting port 914 and fore venting port 915 may carry the gas/fluid to different pressure valves.

Supply port 916 is configured to enable fuel to flow from fuselage fuel tank 900 to a fuel line(s), such as fuel line 720 of aircraft 700, that carries fuel to one or both of the nacelle fuel systems.

Bypass return port 918 is configured to enable fuel flowing from a fuel line carrying fuel from one or both of the nacelle fuel systems and enter fuselage fuel tank 900. In some embodiments, the aircraft comprises a bypass valve that controls whether fuel/fluid can flow through bypass return port 918. The bypass valve may be a solenoid that is controlled via a control signal generated by the aircraft control system. The bypass valve is configured to be opened or closed based on a determination of whether fuel is to be redistributed to the fuselage fuel tank from one or both of the first nacelle fuel tank and the second nacelle fuel tank.

Figure 10A:
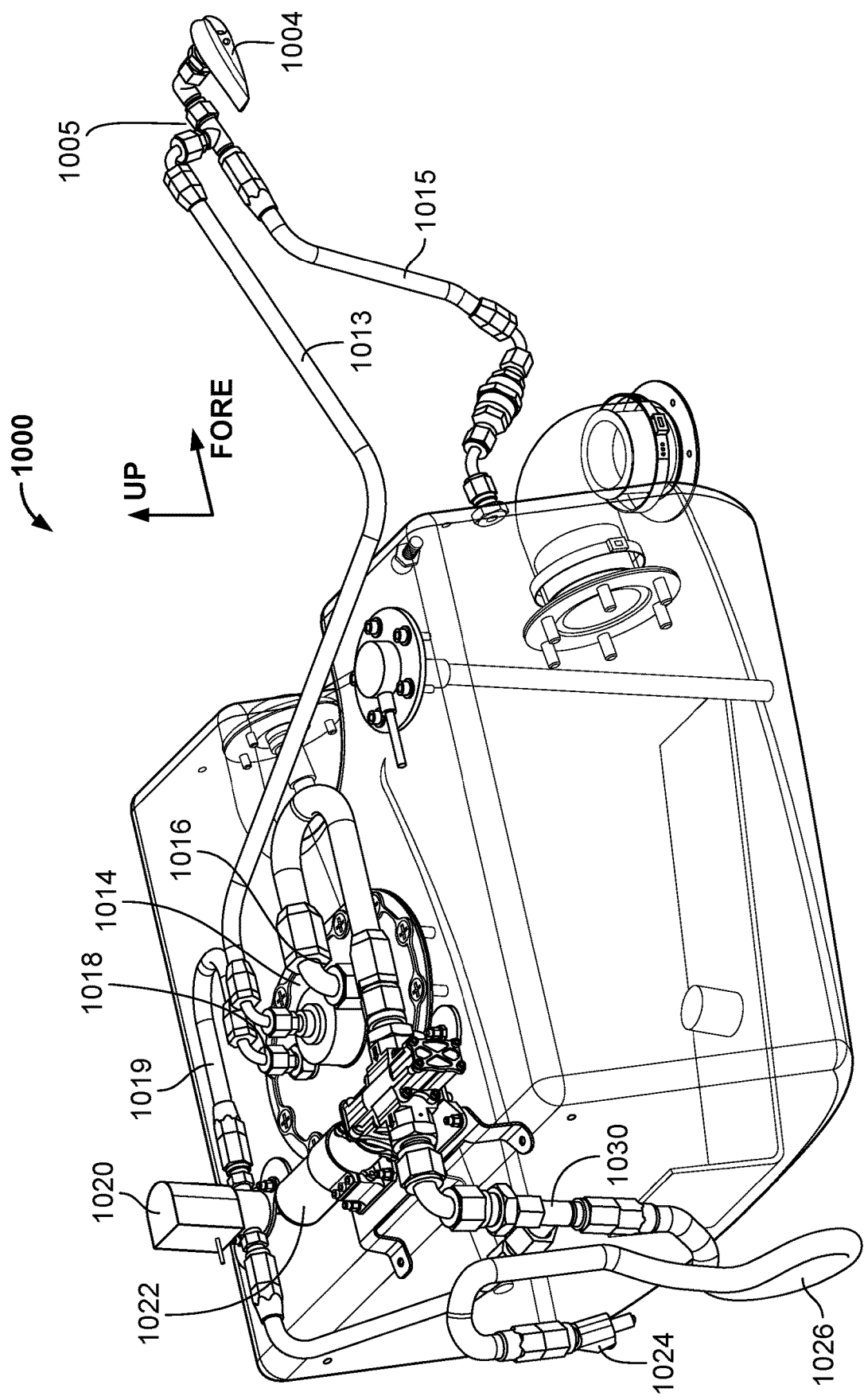
FIG. 10A is a diagram of a fuselage fuel tank for an aircraft according to various embodiments.
Figure 10B:
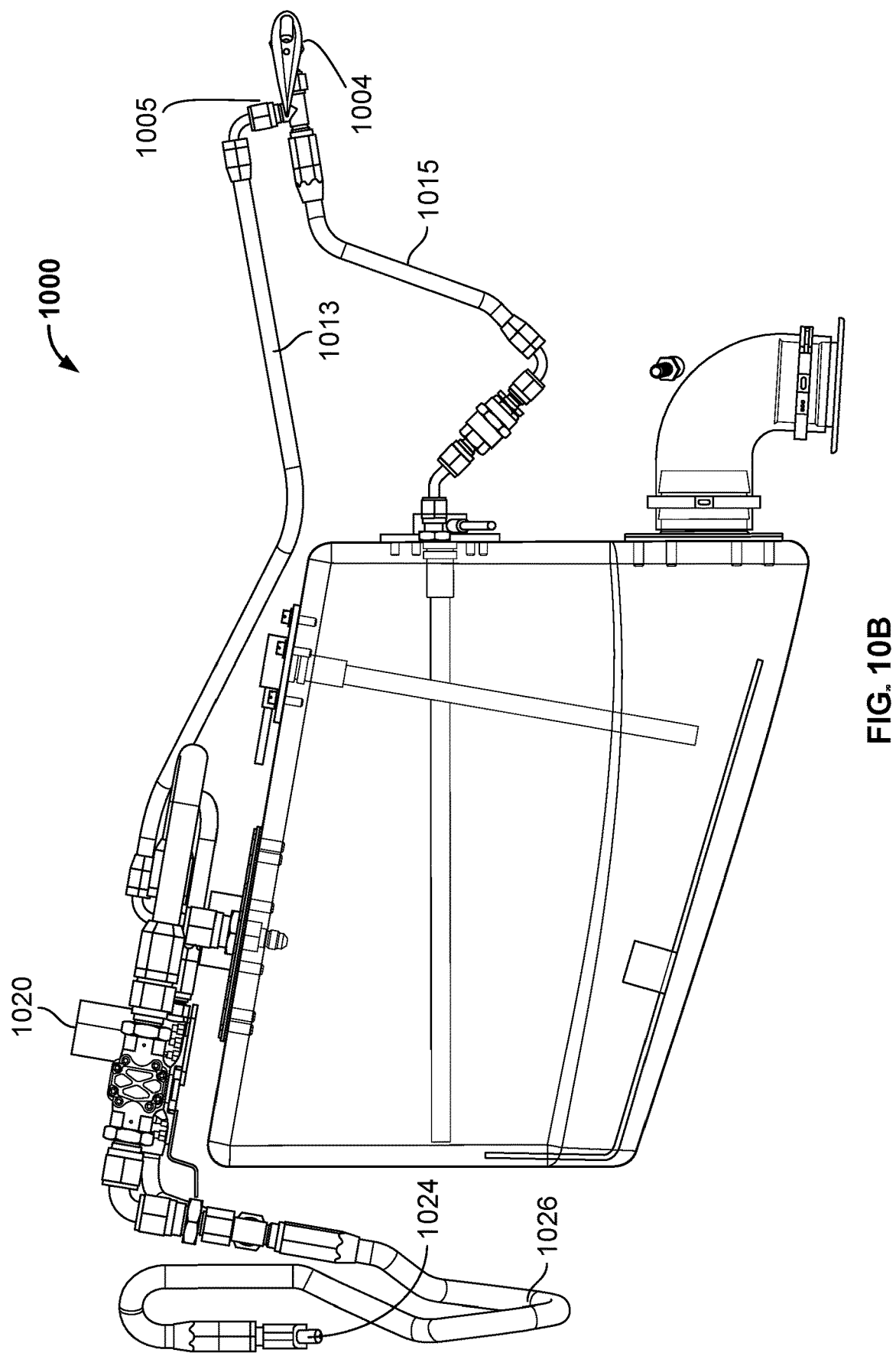
FIG. 10B is a diagram of a fuselage fuel tank for an aircraft according to various embodiments.
Figure 10C:
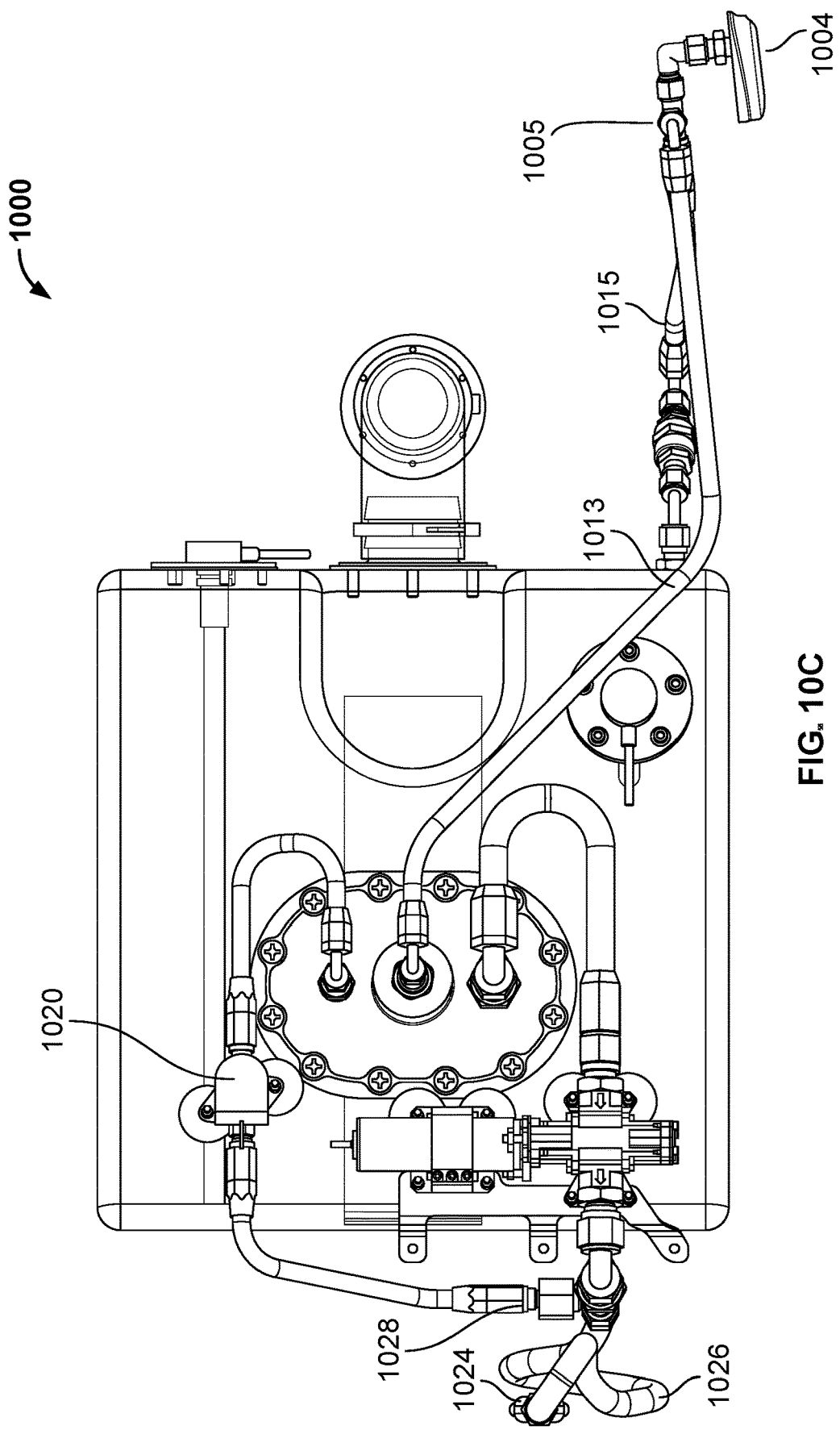
FIG. 10C is a diagram of a fuselage fuel tank for an aircraft according to various embodiments.

FIGS. 10A-10C are perspective, side, and top diagrams of a fuselage fuel tank for an aircraft according to various embodiments. In the example shown, fuselage fuel system 1000 comprises a fuselage fuel tank, such as fuselage fuel tank 900.

The aircraft venting mechanism comprises breather port 1004 via which pressure within the fuselage fuel tank is regulated, such as by permitting gas to flow from the fuselage fuel tank (e.g., during a pressure build-up) via either pressure relief pathway 1013 or pressure relief pathway 1015 as combined by tee connector 1005. Gas/fluid flowing from the fuselage fuel tank flows through a pressure relief pathway, such as pressure relief pathway 1013 (e.g., which is connected to top venting port 1014 to allow gas to flow therethrough) or pressure relief pathway 1015 (e.g., which is connected to a fore venting port to allow gas to flow therethrough). Pressure relief pathways 1013, 1015 respectively comprise a valve to permit/restrict the flow of fluid therethrough according to an orientation of the aircraft. As an example, the valve is a rollover valve thereby enabling passive control of the valve configuration. However, various other types of valves may be implemented, such as valves that support active control (e.g., controlled via a control signal provided by the aircraft control system).

Fuselage fuel system 1000 comprises low pressure pump 1022 that pumps fuel from the fuselage fuel tank via supply port 1016. Fuel pumped from the fuselage fuel tank flows through a fluid pathway to a valve that controls whether fuel is permitted to flow to the fuel line connected to the nacelle fuel tanks or flow from the nacelle fuel system(s) to the fuselage fuel tank (e.g., via bypass return pathway controlled by bypass valve 1020).

The fluid pathway (e.g., fuel line) via which fuel flows from the nacelle fuel systems to the fuselage fuel tank or from the fuselage fuel tank to the nacelle fuel systems includes fuel connector 1024 (e.g., a tee connector, a wye connector, etc.) that directs fuel to one or both of the right nacelle fuel tank or the left nacelle fuel tank. The fluid pathway may additionally be configured with a service loop 1026 that enables the fuselage to be rotated during assembly/disassembly without kinking or damaging the fluid pathway.

The aircraft control system controls bypass valve 1020 (e.g., a solenoid valve) to control (e.g., permit/restrict) the flow of fuel into the fuselage fuel tank, such as from a nacelle fuel tank (e.g., which is carried via the fluid pathway defined by fuel connector 1024, service loop 1026, joint 1030, and return fluid pathway 1028). In response to determining to allow fuel to be redistributed (e.g., returned) to the fuselage fuel tank, the control system causes bypass valve 1020 to be configured in an open configuration and fuel flows through bypass valve 1020, bypass fluid pathway 1019, and through bypass return port 1018 to the fuselage fuel tank.

Figure 11A:
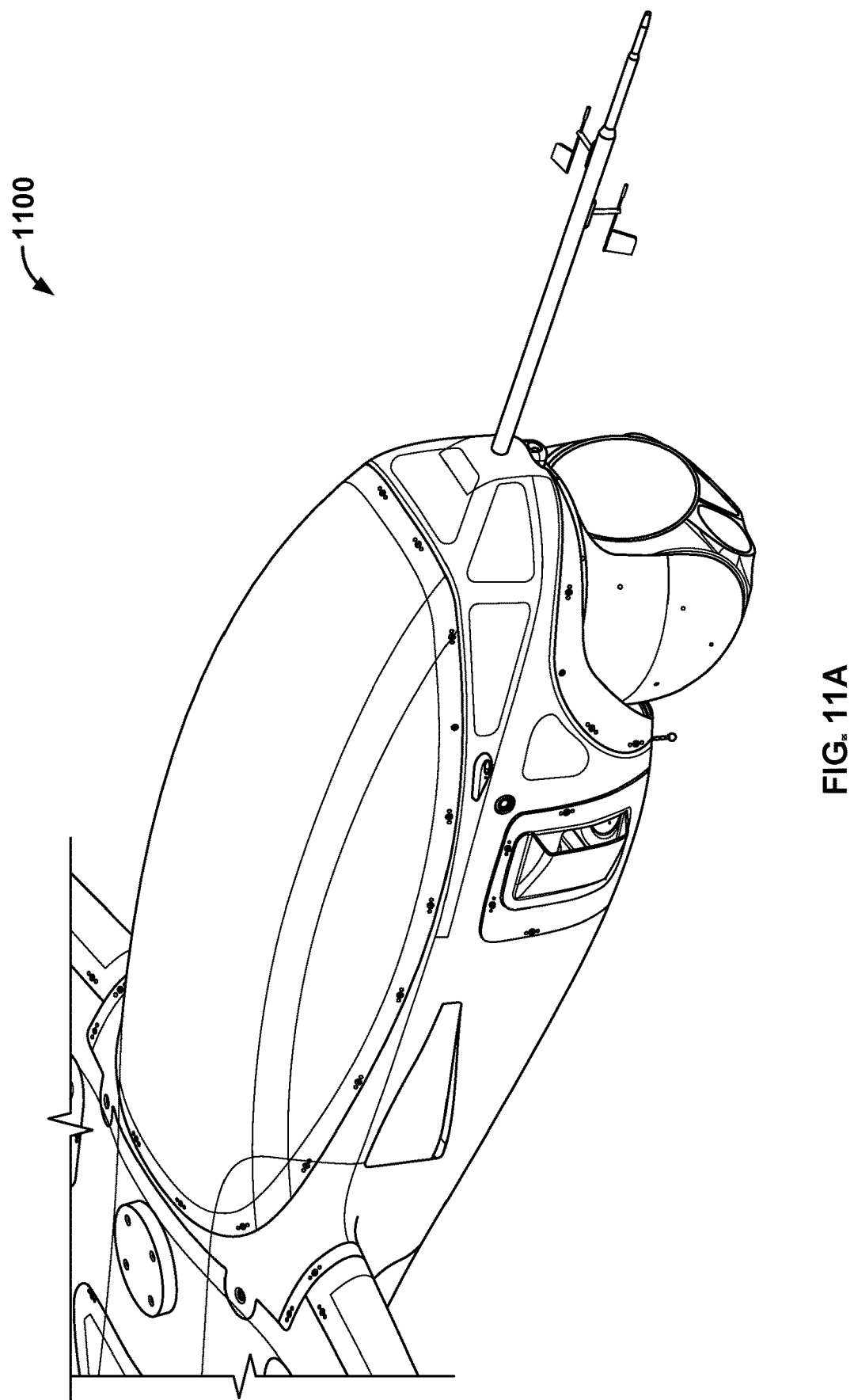
FIG. 11A is a diagram of a fuselage fuel tank disposed in an aircraft fuselage according to various embodiments.

FIG. 11A is a diagram of an aircraft fuselage according to various embodiments. In the example shown, aircraft fuselage 1100 comprises a body that covers/encapsulates the fuselage fuel system. Aircraft fuselage 1100 may additionally comprise the control system, such as a control computer, etc.

Figure 11B:
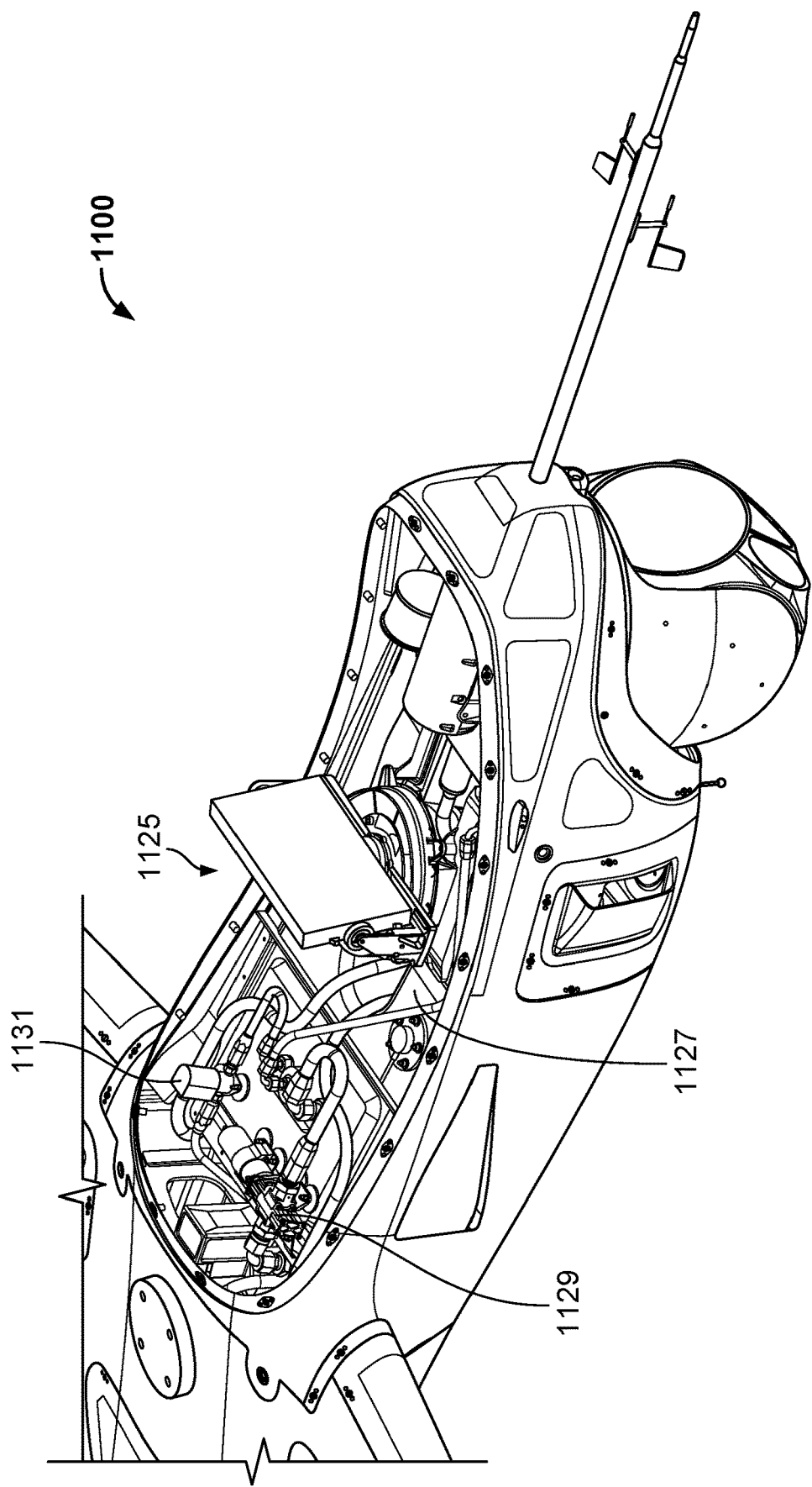
FIG. 11B is a diagram of a fuselage fuel system disposed in an aircraft fuselage according to various embodiments.
Figure 11C:
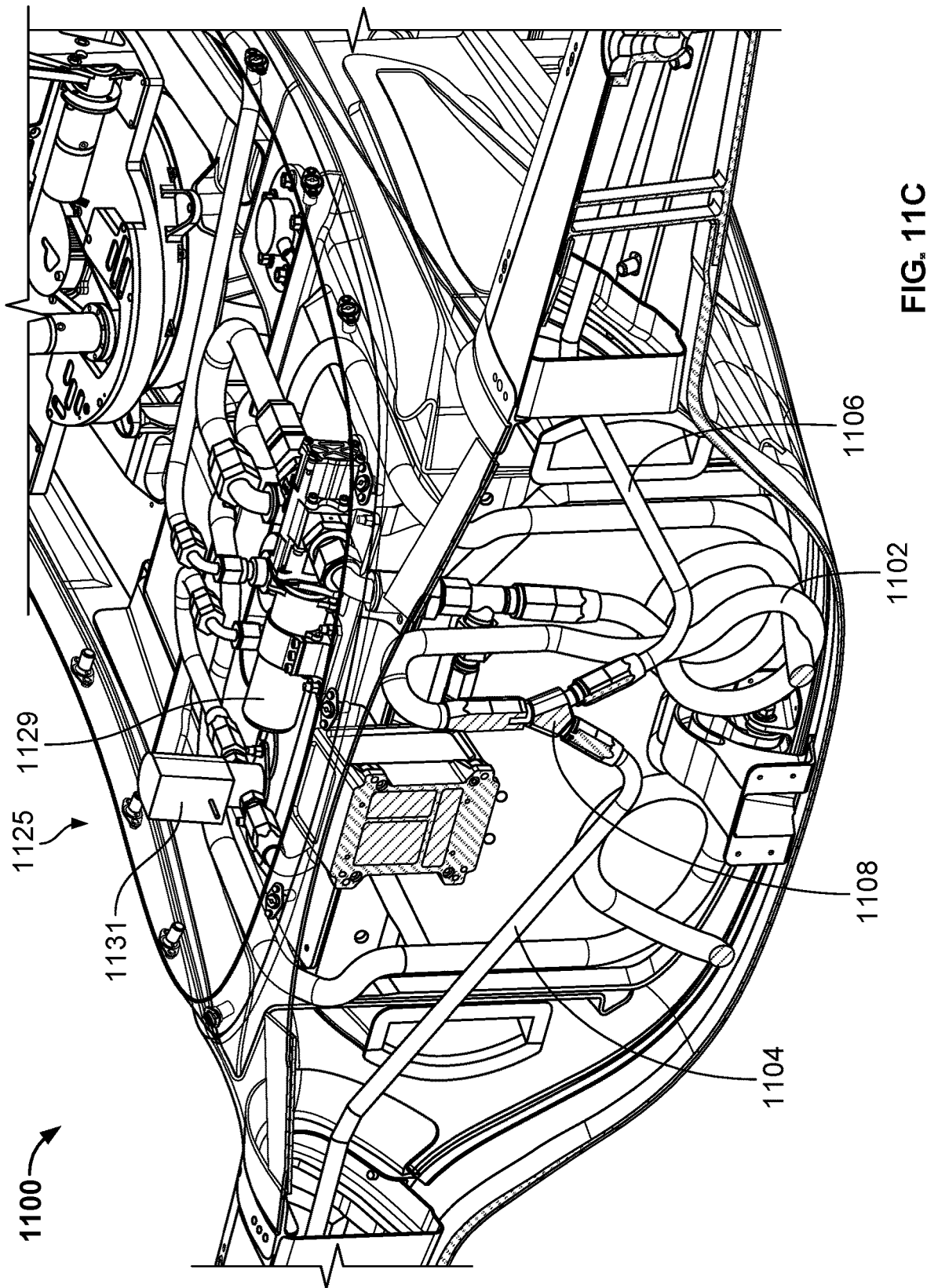
FIG. 11C is a diagram of a fuselage fuel system disposed in an aircraft fuselage according to various embodiments.

FIGS. 11B and 11C are diagrams of a fuselage fuel system disposed in an aircraft fuselage according to various embodiments. In the example shown, the top body component is removed from aircraft fuselage 1100, thereby exposing fuselage fuel system 1125. Fuselage fuel system 1125 comprises fuselage fuel tank 1127 that provides a supply of fuel, pump 1129 (e.g., a low-pressure pump) that is controlled to pump fuel from fuselage fuel tank 1127 to other areas of the aircraft, such as to the nacelle fuel systems via fuel lines 1104 and/or 1106. Pump 1129 pumps fuel from the fuselage fuel tank through the fuel pathway to fuel connector 1108, including through the fuel pathway defined by service loop 1102. Fuel connector 1108 may direct fuel being redistributed to the applicable nacelle fuel system(s). Fuselage fuel system 1125 may additionally comprise bypass valve 1131 that is controlled to permit/restrict fuel to be returned (e.g., from a nacelle fuel system) to fuselage fuel tank 1127. Fuel may be redistributed from a nacelle fuel system(s) to fuselage fuel tank 1127 based on control of bypass valve 1131 (e.g., controlling bypass valve 1131 to be in an open configuration to permit fuel to flow from fuel lines 1104, 1106 through bypass valve 1131 and to fuselage fuel tank 1127).

Figure 12:
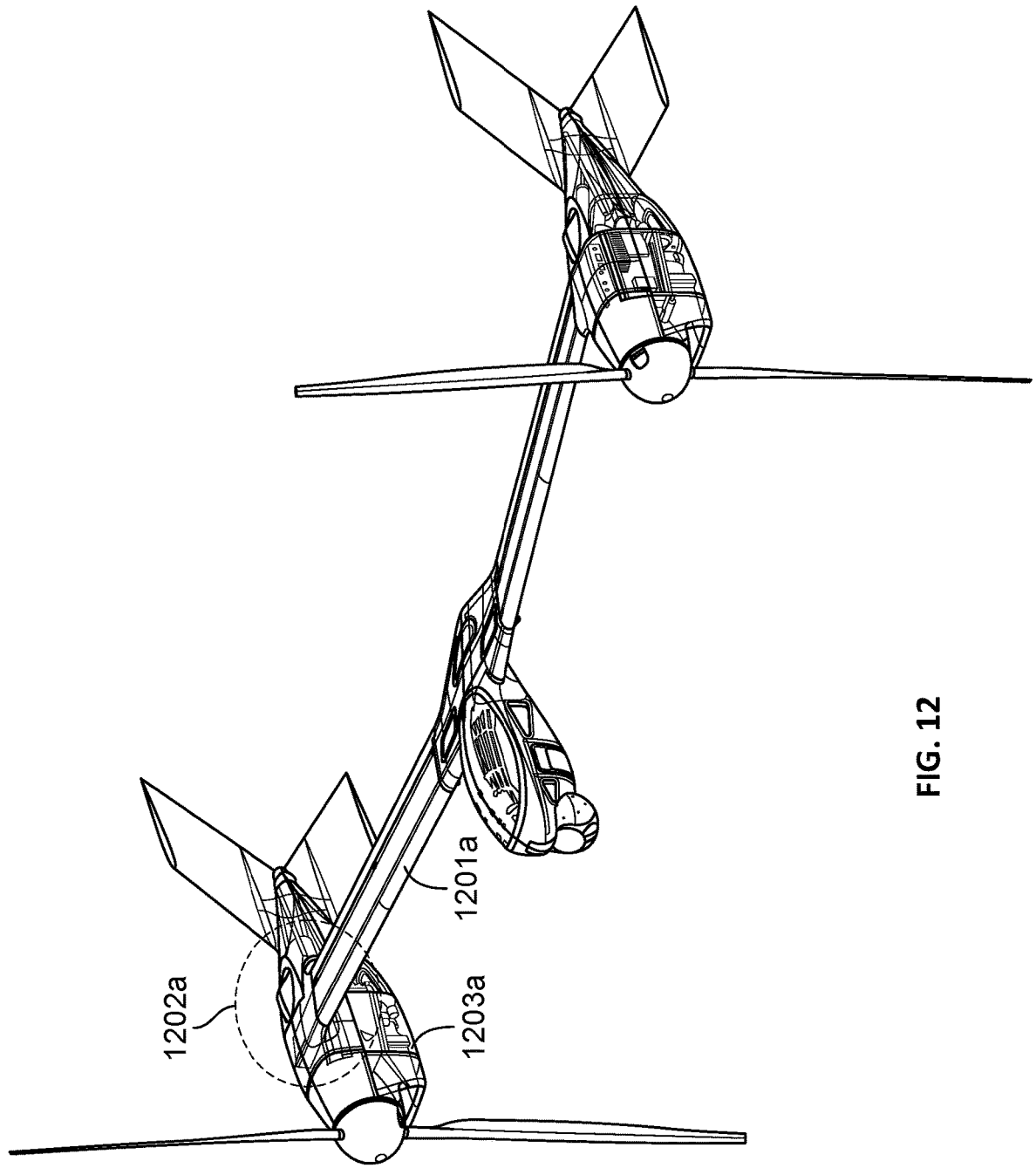
FIG. 12 is a diagram of an aircraft according to various embodiments.

FIG. 12 is a diagram of an aircraft according to various embodiments. In the example shown, aircraft 1200 includes a connection between first wing 1201a and first nacelle 103a, which includes a connection for a fuel line between the fuselage fuel system and the first nacelle fuel system. For example, aircraft 1200 comprises first wing nacelle mount 1202a via which first nacelle 1203a is mounted to first wing 1201a. First wing nacelle mount 1202a may include a connector (e.g., a dry connector) between a fuel line from a fuselage fuel system to the first nacelle fuel system.

Figure 13A:
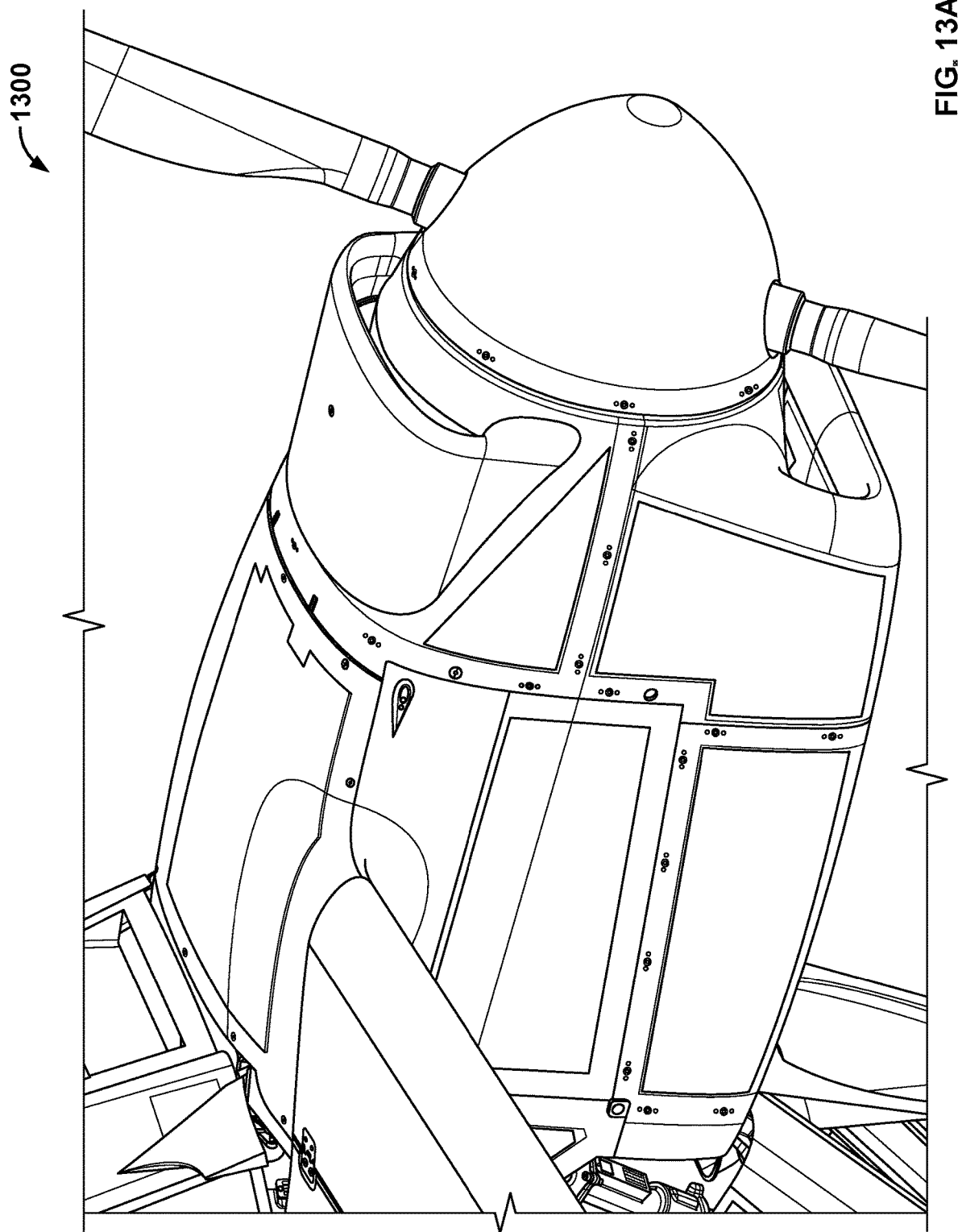
FIG. 13A is a diagram of a nacelle for an aircraft according to various embodiments.

FIG. 13A is a diagram of a nacelle for an aircraft according to various embodiments. In the example shown, nacelle 1300 comprises a body that covers/encapsulates the nacelle fuel system. Nacelle 1300 may additionally comprise the engine, landing gear, etc.

Figure 13B:
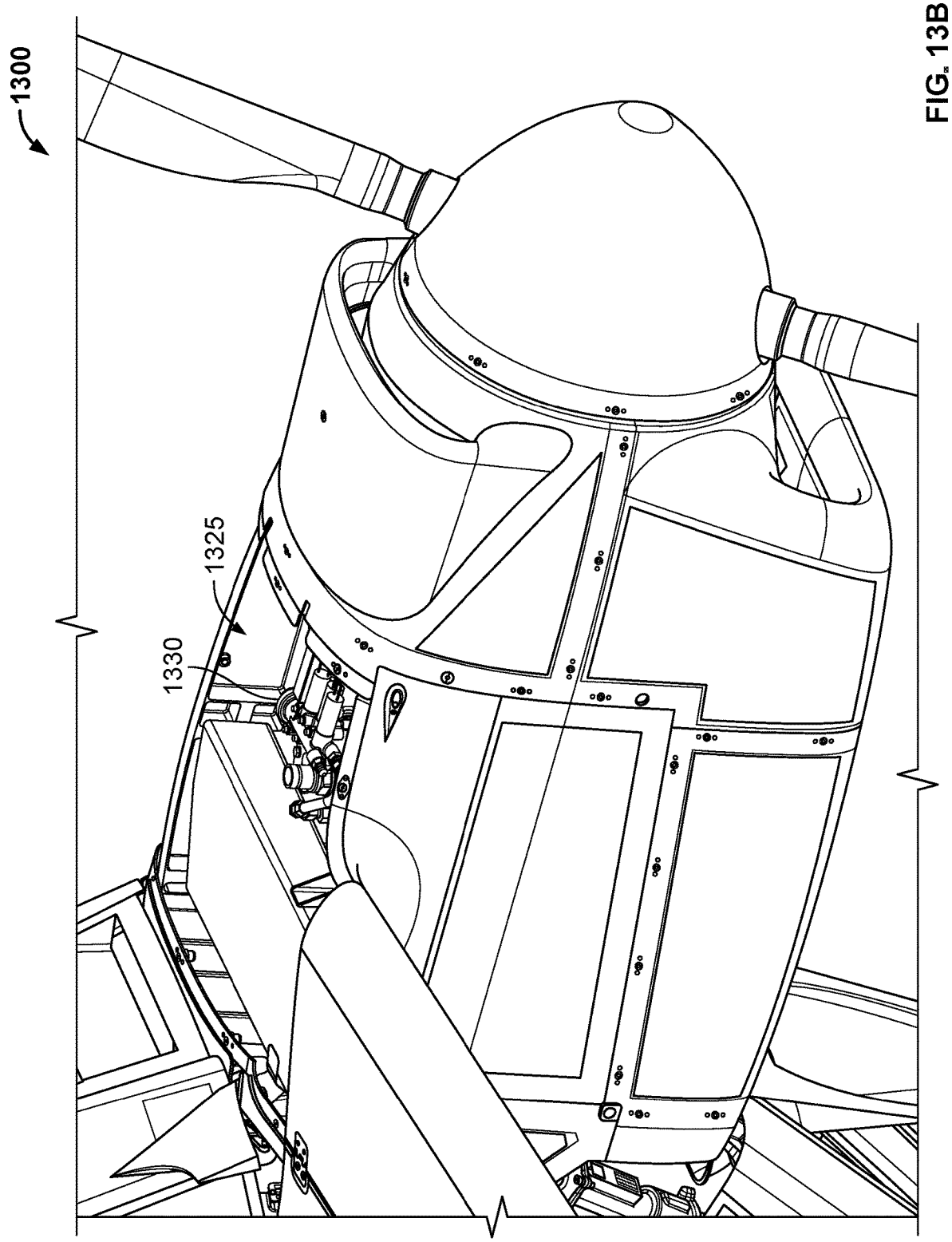
FIG. 13B is a diagram of a nacelle fuel system for an aircraft according to various embodiments.
Figure 13C:
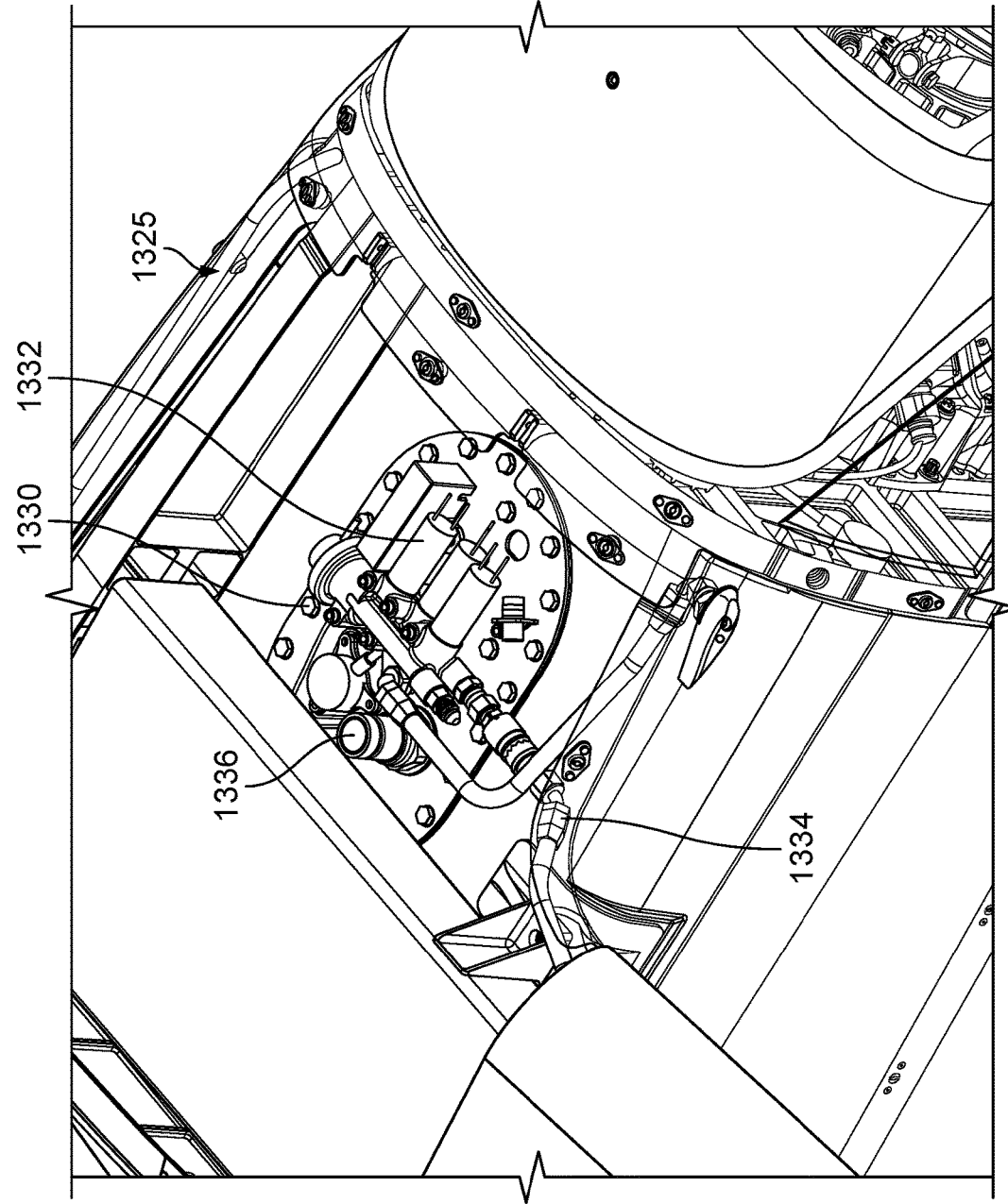
FIG. 13C is a diagram of a nacelle fuel system for an aircraft according to various embodiments.
Figure 15A:
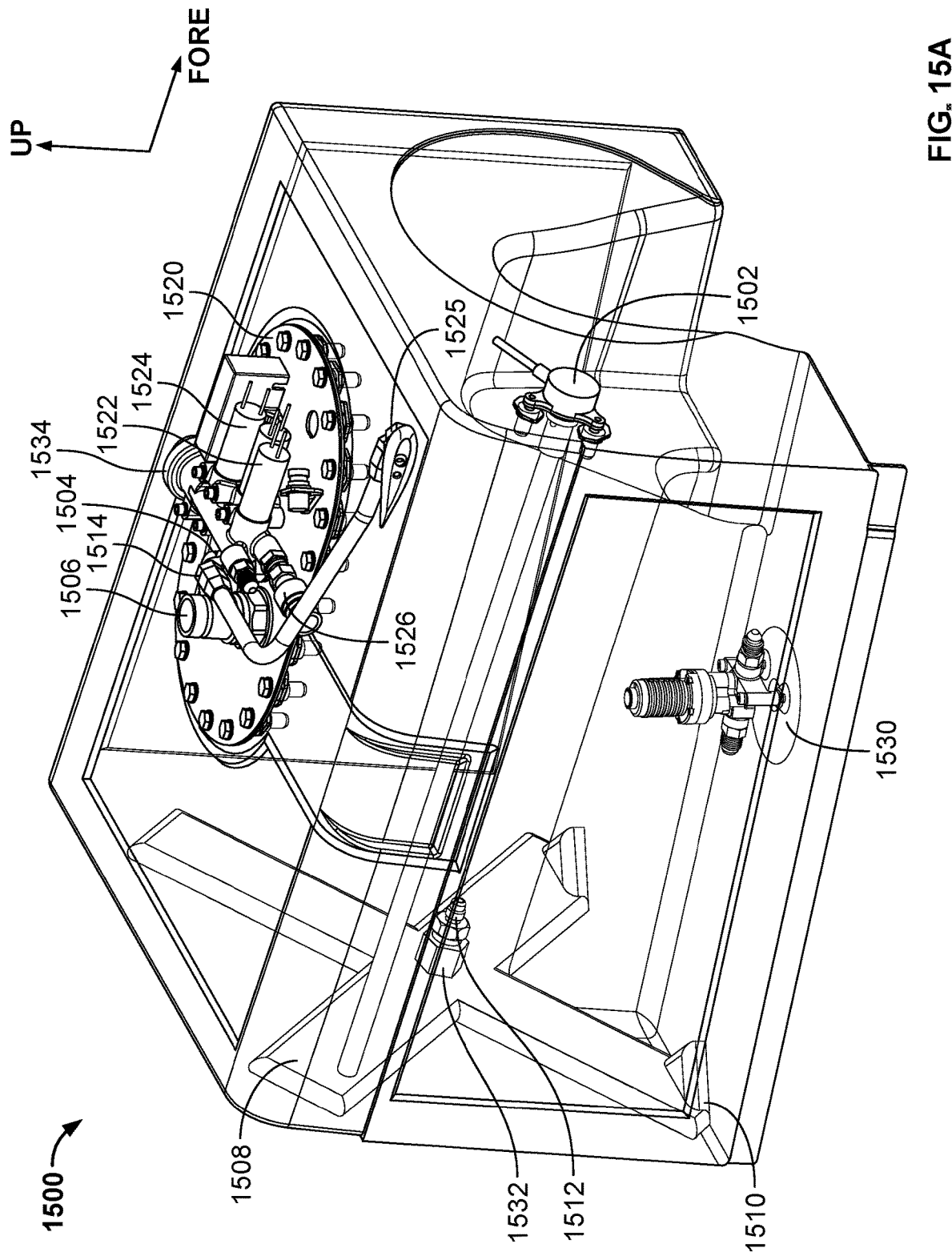
FIG. 15A is a diagram of a nacelle fuel tank disposed in an aircraft nacelle according to various embodiments.
Figure 15B:
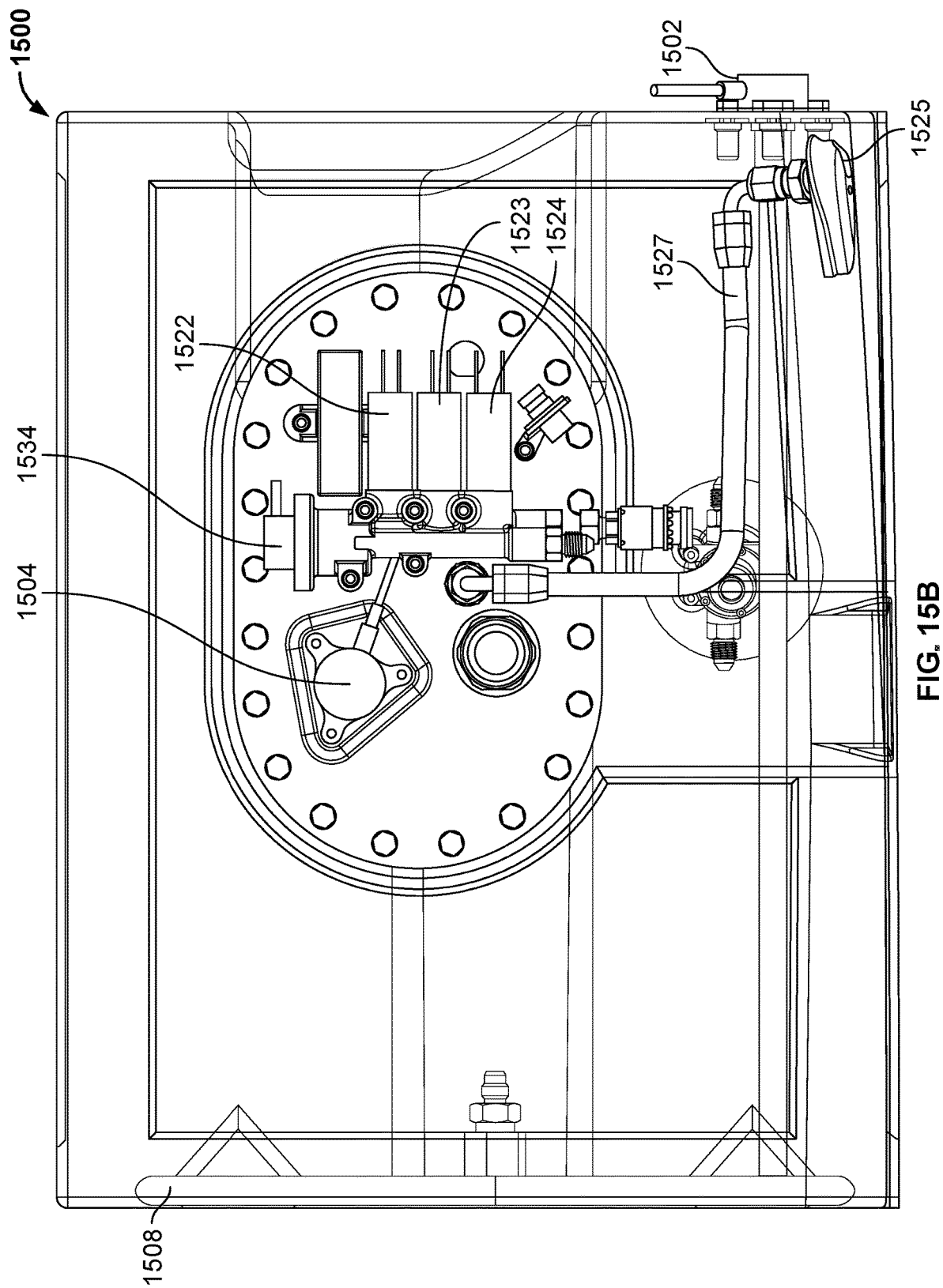
FIG. 15B is a diagram of a nacelle fuel tank disposed in an aircraft nacelle according to various embodiments.
Figure 15C:
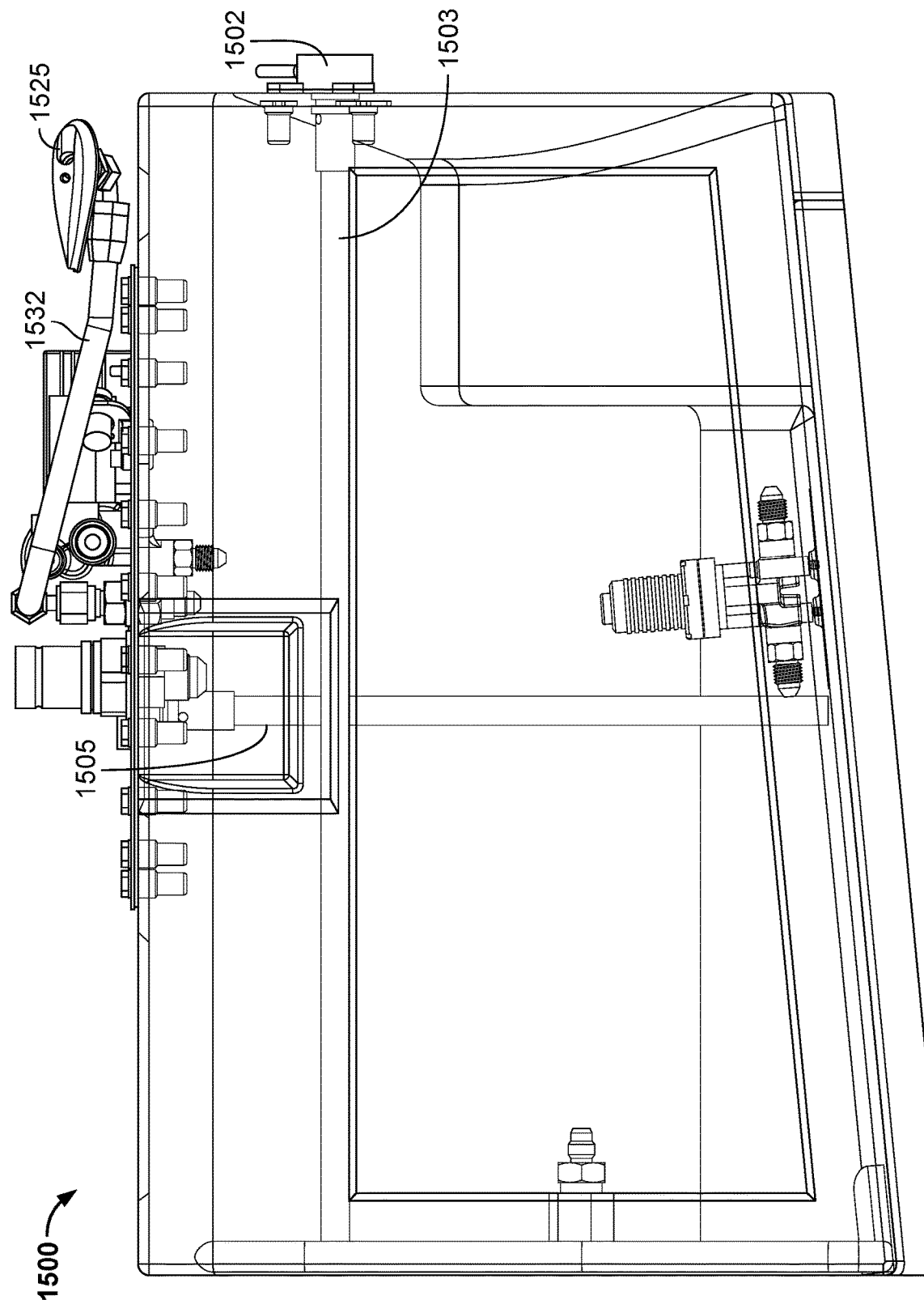
FIG. 15C is a diagram of a nacelle fuel tank disposed in an aircraft nacelle according to various embodiments.
Figure 15D:
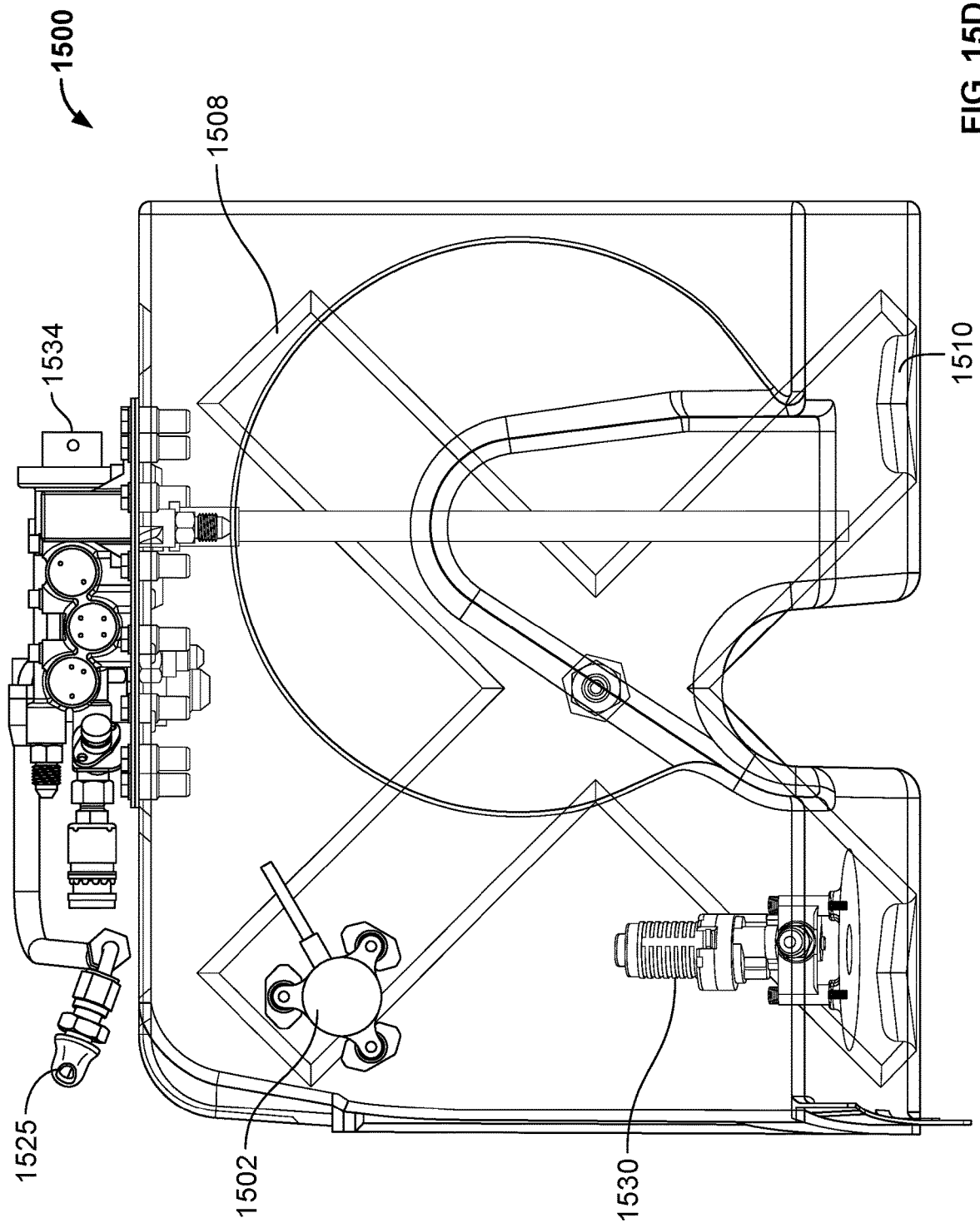
FIG. 15D is a diagram of a nacelle fuel tank disposed in an aircraft nacelle according to various embodiments.
Figure 15E:
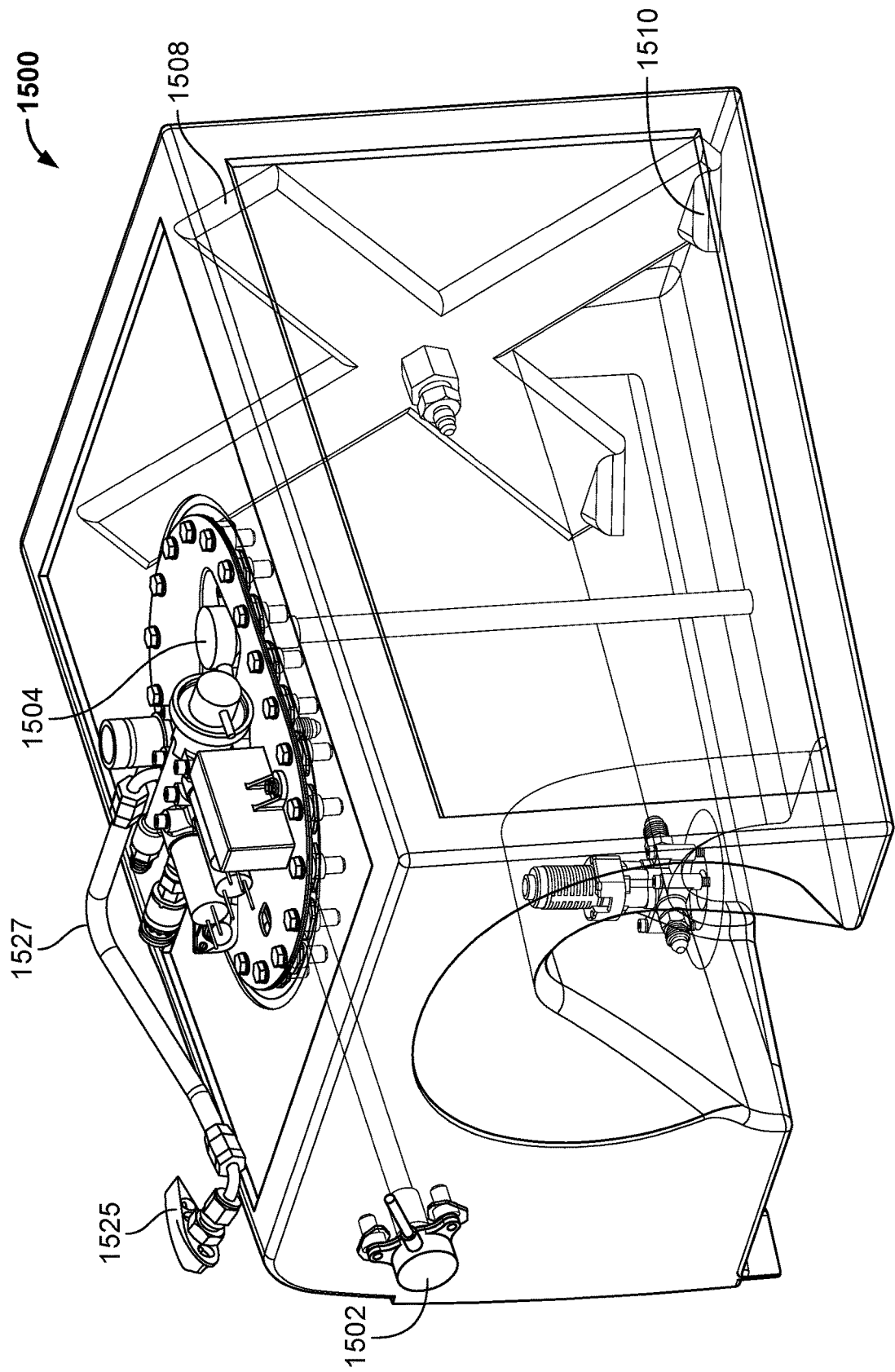
FIG. 15E is a diagram of a nacelle fuel tank disposed in an aircraft nacelle according to various embodiments.

FIGS. 13B and 13C are diagrams of a nacelle fuel system for an aircraft according to various embodiments. In the example shown, nacelle 1300 comprises nacelle fuel system 1325, which includes manifold 1330 covering/encapsulating various components of nacelle fuel system 1325 such as valves (e.g., a valve controlled using solenoid 1332), etc. Nacelle 1300 includes a dry break connect 1334 that provides a connection between the fuel line from a fuselage fuel system to nacelle fuel system 1325. Nacelle fuel system 1325 further includes fill port 1336 via which the nacelle fuel tank is filled, such as before deployment of the aircraft.

FIG. 14 is a diagram of a manifold for a nacelle fuel system of an aircraft according to various embodiments. In the example shown, manifold 1400 is configured to encapsulate various components of a nacelle fuel system, such as solenoids 1402, 1404, and 1406 that are configured to control valves of the nacelle fuel system, fuel pressure regulator 1410, etc. Manifold 1400 comprises various ports for input/output of fluids. As illustrated in FIG. 14, manifold 1400 comprises port 1412 via which fuel is provided from fuel pressure regulator 1410 to the engine, and port 1414 via which fuel flows from the nacelle fuel tank and inputs to fuel pressure regulator 1410. In some embodiments, manifold 1400 is configured to define a space 1418 to hold a sensor configured to measure the fuel level in the nacelle fuel tank. Sensor data obtained by the sensor may be communicated to the aircraft control system, which may be disposed in the aircraft fuselage. Internal pressure in the fuel tank may be controlled by enabling gas to vent via vent 1416.

FIGS. 15A-15E are diagrams that are perspective, top, side, front views of a nacelle fuel tank disposed in an aircraft nacelle according to various embodiments. In the example shown, nacelle fuel tank 1500 comprises manifold 1520, first sensor 1502, second sensor 1504, fill port 1506, a wicking system (e.g., first portion 1508 of wicking material and second portion 1510 of wicking material), fuel line 1512 configured to pull fuel from the wicking system for supplying fuel for redistribution, a venting mechanism that regulates pressure in nacelle fuel tank 1500 (e.g., to carry gas from the top region of nacelle fuel tank 1500 to pressure valve 1525 via top venting port 1514), a fuel supply mechanism comprising supply port 1526 to receive fuel from the other nacelle fuel tank or the fuselage fuel tank or to provide a fuel supply for redistribution to the other nacelle fuel tank or the fuselage fuel tank, and fuel pressure regulator 1534 with a first via which fuel is provided from fuel pressure regulator 1534 to the engine, and a second port via which fuel flows from the nacelle fuel tank and inputs to fuel pressure regulator 1534.

As illustrated, first sensor 1502 comprises fuel level reading element 1503 (e.g., a capacitive element for a capacitive sensor) that measures the fuel level in nacelle fuel tank 1500 when the aircraft is in a VTOL orientation or otherwise an extent to which fuel is filled in the fore-aft direction. Similarly, second sensor 1504 comprises fuel level reading element 1505 (e.g., a capacitive element for a capacitive sensor) that measures the fuel level when the aircraft is in a horizontal flight orientation or otherwise an extent to which fuel is filled in the up-down direction.

Fill port 1506 is used to fill nacelle fuel tank 1500, such as from an external fuel source before operation of the aircraft.

The wicking mechanism comprises first portion 1508 of wicking material and second portion 1510 of wicking material. The first portion 1508 of wicking material pulls fuel from the aft region of nacelle fuel tank 1500, which corresponds to a bottom of nacelle fuel tank 1500 when the aircraft is in the VTOL orientation. The second portion 1510 of wicking material pulls fuel from the bottom region of nacelle fuel tank 1500, which corresponds to a bottom of nacelle fuel tank 1500 when the aircraft is in the horizontal flight orientation. The wicking mechanism enables high-pressure pump 1530 to pull fuel from the bottom of nacelle fuel tank 1500 via a fuel line connecting port 1532 disposed on or around the wicking mechanism and high-pressure pump 1530.

The venting mechanism comprises top venting port 1514 disposed at a top region of nacelle fuel tank 1500. Top venting port 1514 may be used to permit/restrict fluid (e.g., gas) from a top region of nacelle fuel tank 1500 in either the VTOL or horizontal flight orientation (e.g., the top of nacelle fuel tank 1500 or the aft of nacelle fuel tank 1500). For example, top venting port 1514 is configured to selectively permit the flow of gas to a pressure relief pathway based on the orientation of the aircraft. Additionally, or alternatively, nacelle fuel tank 1500 may comprise a fore venting port (not shown) disposed at a fore region of nacelle fuel tank 1500. The venting mechanism regulates the pressure in nacelle fuel tank 1500 when operating in the horizontal flight orientation by enabling gas to flow from a top region of nacelle fuel tank 1500 through top venting port 1514, and restricts the flow of fluid (e.g., gas, fuel, etc.) from the fore region of nacelle fuel tank 1500 (e.g., through a fore venting port or the top venting port 1514 via a fluid pathway configured in the internal of nacelle fuel tank 1500 to carry fluid from the fore region to top venting port 1514, such as based on the aircraft orientation). Conversely, the venting mechanism regulates the pressure in nacelle fuel tank 1500 when operating in the VTOL orientation by enabling gas to flow from a top region of nacelle fuel tank 1500 through top venting port 1514 (e.g., via an internal fluid pathway that carries the fluid from the top region to top venting port 1514), and restricts the flow of fluid (e.g., gas, fuel, etc.) from a top of nacelle fuel tank 1500 (e.g., when viewed in a horizontal orientation) through top venting port 1514. Gas/fluid exiting nacelle fuel tank 1500 via top venting port 1514 is carried to one or more breather ports (e.g., exterior vent on the outside skin of the aircraft or mold line), such as breather port 1525. The gas/fluid may be carried to breather port 1525 via pressure relief pathway 1527. Various venting ports comprised in the venting mechanism may share a pressure valve that regulates the pressure, or top venting port 1514 and a fore venting port may carry the gas/fluid to different pressure valves.

The fuel supply mechanism comprises supply port 1526 that is configured to enable fuel to flow from nacelle fuel tank 1500 to a fuel line(s), such as fuel line 720 of aircraft 700, that carries fuel to the fuselage fuel tank and/or another nacelle fuel tank. Additionally, supply port 1526 is configured to receive fuel from the other nacelle fuel tank or the fuselage fuel tank.

In some embodiments, nacelle fuel tank 1500 comprises a set of valves that are configured to control the pathways through which fuel may flow, such as a valve to control whether excess fuel redirected by fuel pressure regulator 1534 is to be returned to the nacelle fuel tank, a valve to control whether excess fuel redirected by fuel pressure regulator 1534 is to flow to the fuselage fuel tank or other nacelle fuel tank (e.g., in connection with redistributing the fuel or balancing the aircraft), and a valve to control whether fuel flowing from the fuselage fuel tank or the other nacelle fuel tank is to be directed to fill up the nacelle fuel tank. The set of valves may be controlled by the aircraft control system, such as via control of solenoids 1522, 1523, and/or 1524.

Figure 16:
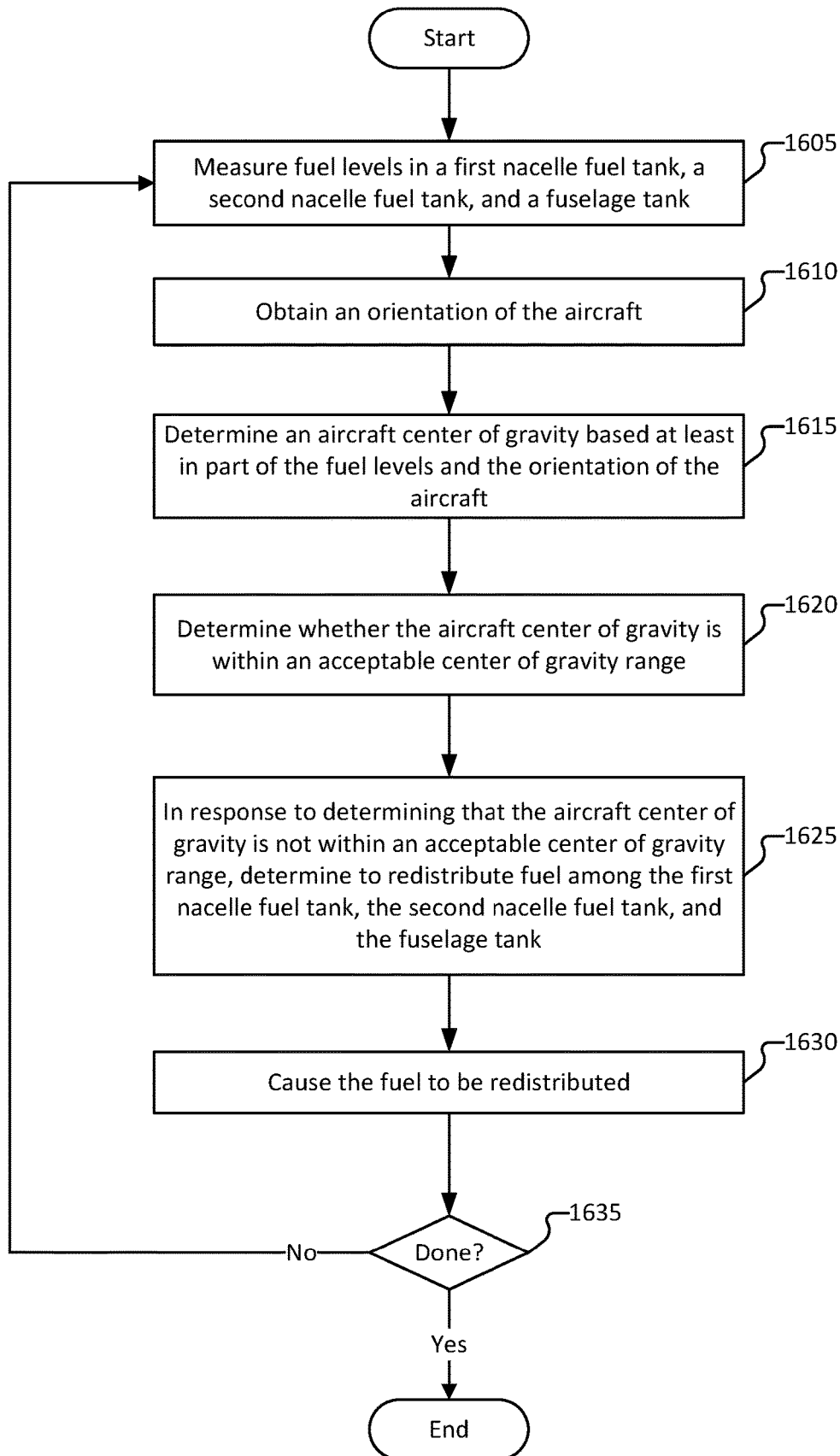
FIG. 16 is a flowchart of a method for redistributing fuel in an aircraft according to various embodiments.

FIG. 16 is a flowchart of a method for redistributing fuel in an aircraft according to various embodiments. In some embodiments, process 1600 is implemented at least in part by an aircraft that is configured to perform a vertical take-off and/or landing and horizontal flight. The aircraft may comprise a plurality of engines that respectively have a static orientation relative to the nose of the aircraft. An example of the aircraft is aircraft 100 of FIG. 1. In some embodiments, process 1600 is performed by a control computer or other control system of the aircraft.

At 1605, the system measures fuel levels in a first nacelle fuel tank, a second nacelle fuel tank, and a fuselage tank. The system measures the fuel levels based on sensor data obtained based on sensor readings of sensors in the various fuel tanks. In some embodiments, fuel tank levels are determined using a calculation based on two measurements of fuel level (e.g., two resistance sensor level readings). In some embodiments, two measurements of fuel level correspond to a vertical fuel level sensor and a horizontal fuel level sensor. In some embodiments, the system uses the sensor data to query a mapping or table of sensor readings to fuel levels to obtain fuel levels in the various fuel tanks. At 1610, the system obtains an orientation of the aircraft. In some embodiments, an inertial measurement unit provides an attitude measurement to a flight computer. At 1615, the system determines an aircraft center of gravity based at least in part on the fuel levels and the orientation of the aircraft. In some embodiments, the mapping or table is one of multiple tables and the table used depends on the attitude of the aircraft. In some embodiments, there are two tables (e.g., one for vertical flight and one for horizontal flight). In various embodiments, there are tables for other attitudes of flight for the aircraft (e.g., one for climbing at a certain angle or range of angles, one for descending at another angle or range of angles, etc.). At 1620, the system determines whether the aircraft center of gravity is within an acceptable center of gravity range. In some embodiments, the system queries a mapping of aircraft orientations (e.g., aircraft pitch) to acceptable center of gravities or acceptable center of gravity ranges to determine the acceptable center of gravity range for the current aircraft orientation. At 1625, in response to determining that the aircraft center of gravity is not within an acceptable center of gravity range, the system determines to redistribute fuel among the first nacelle fuel tank, the second nacelle fuel tank, and the fuselage tank. The system may further determine a plan for redistributing fuel, such as an extent to which fuel is to be pumped/directed to the other fuel tanks, a set of valves to be controlled to provide fluid pathways for the fuel redistribution, etc. At 1630, the system causes the fuel to be redistributed. The system may cause the fuel to be redistributed based on the control of one or more pumps or valves to provide the applicable fuel pathways via which fuel is able to flow to the desired region of the aircraft (e.g., the desired fuel tank(s)). At 1635, a determination is made as to whether process 1600 is complete. In some embodiments, process 1600 is determined to be complete in response to a determination that the aircraft has landed, that the fuel no longer is to be redistributed, the user has exited the system, an administrator indicates that process 1600 is to be paused or stopped, etc. In response to a determination that process 1600 is complete, process 1600 ends. In response to a determination that process 1600 is not complete, process 1600 returns to 1605.

Figure 17:
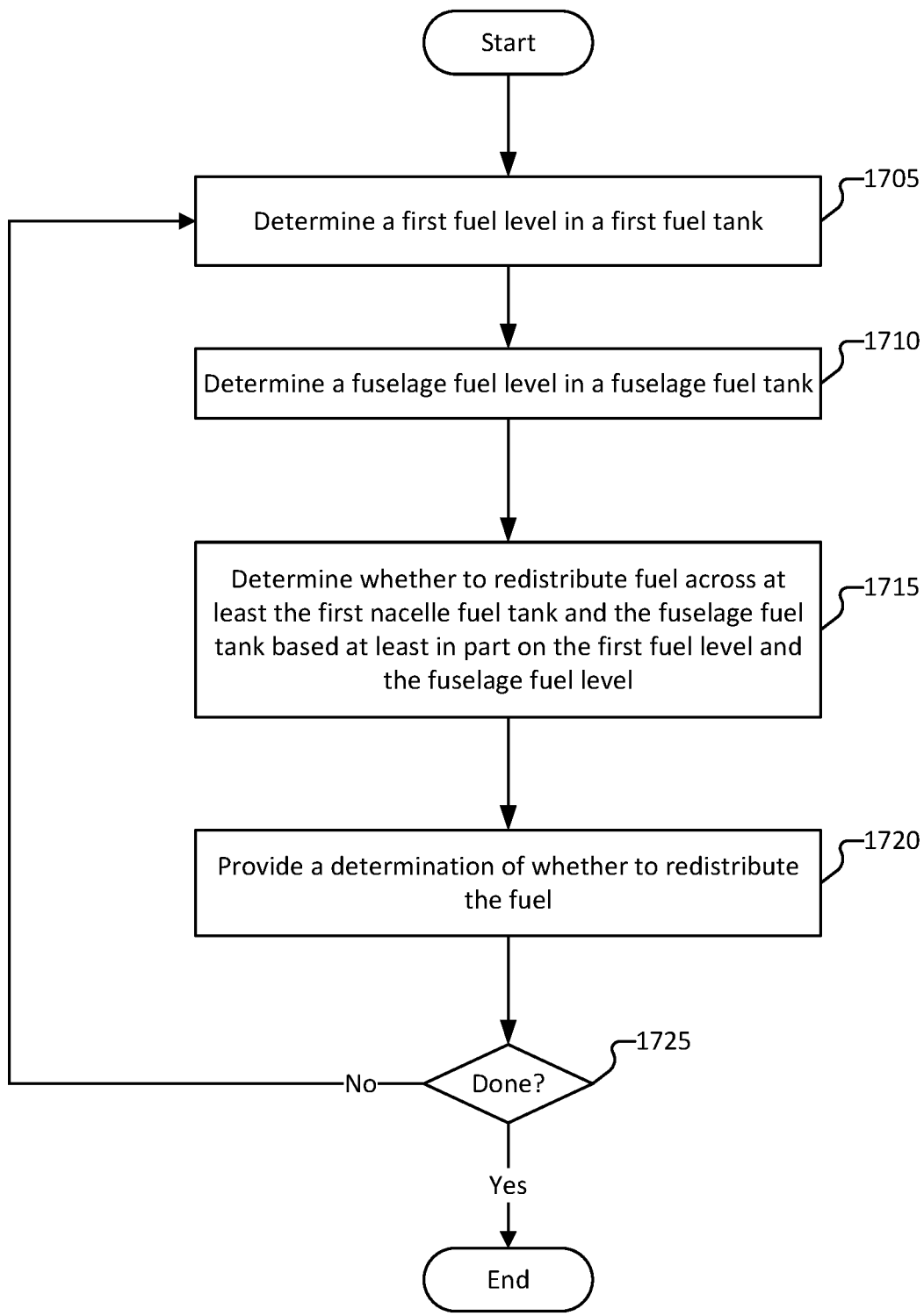
FIG. 17 is a flowchart of a method for determining whether to redistribute fuel in an aircraft according to various embodiments.

FIG. 17 is a flowchart of a method for determining whether to redistribute fuel in an aircraft according to various embodiments. In some embodiments, process 1700 is implemented at least in part by an aircraft that is configured to perform a vertical take-off and/or landing and horizontal flight. In some embodiments, process 1700 is performed by a control computer or other control system of the aircraft. In some embodiments, process 1700 is invoked by process 1600, such as at 1625.

At 1705, the system determines a first fuel level in a first fuel tank. The system may determine the first fuel level in the first fuel tank based on querying (e.g., using sensor data obtained from sensors in the first fuel tank) a mapping of sensor readings to fuel levels. At 1710, the system determines a fuselage fuel level in a fuselage fuel tank. The system may determine the first fuel level in the first fuel tank based on querying (e.g., using sensor data obtained from sensors in the first fuel tank) a mapping of sensor readings to fuel levels. In some embodiments, the mapping of sensor readings to fuel levels is different for fuselage fuel tanks and nacelle fuel tanks. The aircraft control system may implement a unique mapping of sensor readings to fuel levels for each fuel tank. In some embodiments, the aircraft control system comprises different mappings for different aircraft orientations, or the mappings of sensor readings to fuel levels may be further associated with corresponding aircraft orientations. At 1715, the system determines whether to redistribute fuel across at least the first nacelle fuel tank and the fuselage fuel tank based at least in part on the first fuel level and the fuselage fuel level. The determination of whether to redistribute fuel may be based on a determination to adjust the center of gravity of the aircraft (e.g., to balance the aircraft) or to provide fuel to the nacelle fuel tanks for supply to the engines, etc. At 1720, the system provides a determination of whether to redistribute the fuel. In some embodiments, the system provides the indication of the determination of whether fuel is to be redistributed to the system, service, or process that invoked process 1700, such as at 1625 of process 1600. At 1725, a determination is made as to whether process 1700 is complete. In some embodiments, process 1700 is determined to be complete in response to a determination that the aircraft has landed, the fuel no longer is to be redistributed, no further determinations of whether to redistribute fuel are to be performed, the user has exited the system, an administrator indicates that process 1700 is to be paused or stopped, etc. In response to a determination that process 1700 is complete, process 1700 ends. In response to a determination that process 1700 is not complete, process 1700 returns to 1705.

Figure 18:
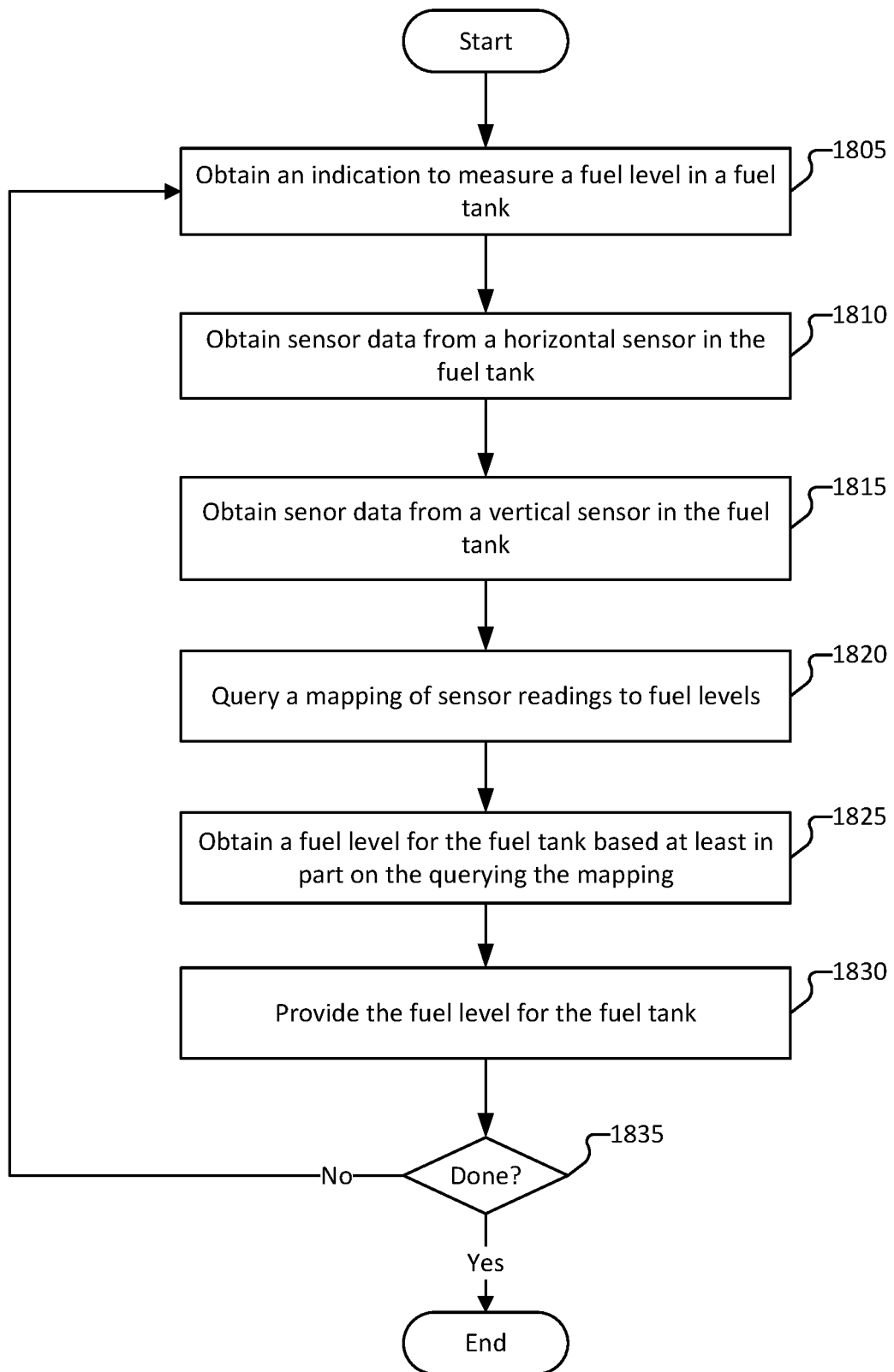
FIG. 18 is a flowchart of a method for determining a fuel level for a fuel tank in an aircraft according to various embodiments.

FIG. 18 is a flowchart of a method for determining a fuel level for a fuel tank in an aircraft according to various embodiments. In some embodiments, process 1800 is implemented at least in part by an aircraft that is configured to perform a vertical take-off and/or landing and horizontal flight. In some embodiments, process 1800 is performed by a control computer or other control system of the aircraft. In some embodiments, process 1800 is invoked by process 1600, such as at 1605.

At 1805, the system obtains an indication to measure a fuel level in a fuel tank. The system may receive an indication or request from 1605 of process 1600 to measure the fuel level(s) in one or more fuel tanks. At 1810, the system obtains sensor data from a horizontal sensor in the fuel tank. At 1815, the system obtains sensor data from a vertical sensor in the fuel tank. At 1820, the system queries a mapping of sensor readings to fuel levels. The system uses the sensor data from the horizontal sensor in the fuel tank and the sensor data from the vertical sensor in the fuel tank to query the mapping of sensor readings to fuel levels. For example, the mapping of sensor readings to fuel levels is a mapping of sensor data tuples (e.g., horizontal sensor data, vertical sensor data) to fuel levels. At 1825, the system obtains a fuel level for the fuel tank based at least in part on the querying the mapping. At 1830, the system provides the fuel level for the fuel tank. In some embodiments, the system provides the indication of the fuel level to the system, service, or process that invoked process 1800, such as to 1605 of process 1600. At 1835, a determination is made as to whether process 1800 is complete. In some embodiments, process 1800 is determined to be complete in response to a determination that the aircraft has landed, the fuel no longer is to be redistributed, no further fuel levels are to be determined, the user has exited the system, an administrator indicates that process 1800 is to be paused or stopped, etc. In response to a determination that process 1800 is complete, process 1800 ends. In response to a determination that process 1800 is not complete, process 1800 returns to 1805.

Figure 19:
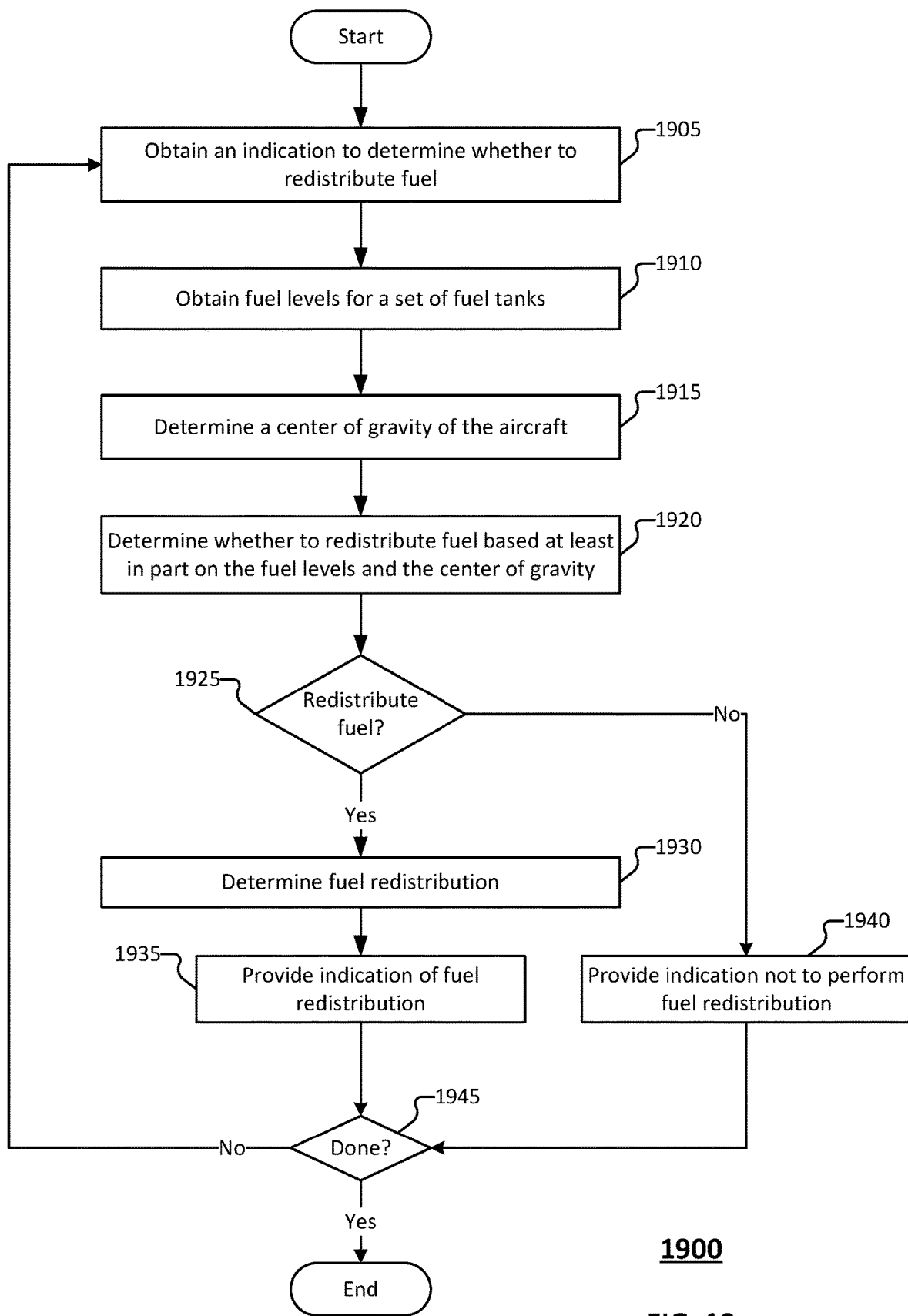
FIG. 19 is a flowchart of a method for determining a redistribution of fuel according to various embodiments.

FIG. 19 is a flowchart of a method for determining a redistribution of fuel according to various embodiments. In some embodiments, process 1900 is implemented at least in part by an aircraft that is configured to perform a vertical take-off and/or landing and horizontal flight. In some embodiments, process 1900 is performed by a control computer or other control system of the aircraft. In some embodiments, process 1900 is invoked by process 1600 (e.g., at 1625) or by process 1700 (e.g., at 1715).

At 1905, the system obtains an indication to determine whether to redistribute fuel. At 1910, the system obtains fuel levels for a set of fuel tanks. The fuel levels for the set of fuel tanks may be obtained based on iteratively performing process 1800 for each fuel tank. At 1915, the system determines a center of gravity of the aircraft. At 1920, the system determines whether to redistribute fuel based at least in part on the fuel levels and the center of gravity. At 1925, the system determines whether to redistribute fuel. In response to determining to redistribute fuel, process 1900 proceeds to 1930. Conversely, in response to determining that the fuel is not to be redistributed, process 1900 proceeds to 1940. At 1930, the system determines a fuel redistribution. The fuel redistribution may include an indication of an extent to which fuel is to be redistributed, a plan to redistribute the fuel (e.g., the set of valves to be controlled to open the applicable fluid pathways, etc.), etc. In some embodiments, the system determines the fuel redistribution based on fuel levels in the nacelle fuel tanks and the need for fuel to be supplied from such nacelle fuel tanks to the engines. Additionally or alternatively, the system determines the fuel redistribution based on a determination to balance the aircraft or otherwise modify the center of gravity of the aircraft. The system may determine a fuel redistribution that is expected to balance the aircraft or bring the aircraft center of gravity within the applicable acceptable center of gravity range for the aircraft orientation/pitch. In some embodiments, the system determines a fuel redistribution that is expected to attain an aircraft center of gravity in the middle of the acceptable gravity range. In some embodiments, the system determines a fuel redistribution that is expected to be a minimum level of redistribution to bring the aircraft center of gravity within the acceptable center of gravity range. At 1935, the system provides an indication of the fuel redistribution. In some embodiments, the system provides the indication of the fuel redistribution to the system, service, or process that invoked process 1900, such as at 1625 of process 1600 or 1715 of process 1700. At 1940, the system provides an indication not to perform fuel redistribution. In some embodiments, the system provides the indication that fuel is not to be redistributed to the system, service, or process that invoked process 1900, such as to 1625 of process 1600 or 1715 of process 1700. At 1945, a determination is made as to whether process 1900 is complete. In some embodiments, process 1900 is determined to be complete in response to a determination that the aircraft has landed, the fuel no longer is to be redistributed, no further fuel redistributions are to be determined, the user has exited the system, an administrator indicates that process 1900 is to be paused or stopped, etc. In response to a determination that process 1900 is complete, process 1900 ends. In response to a determination that process 1900 is not complete, process 1900 returns to 1905.

Figure 20:
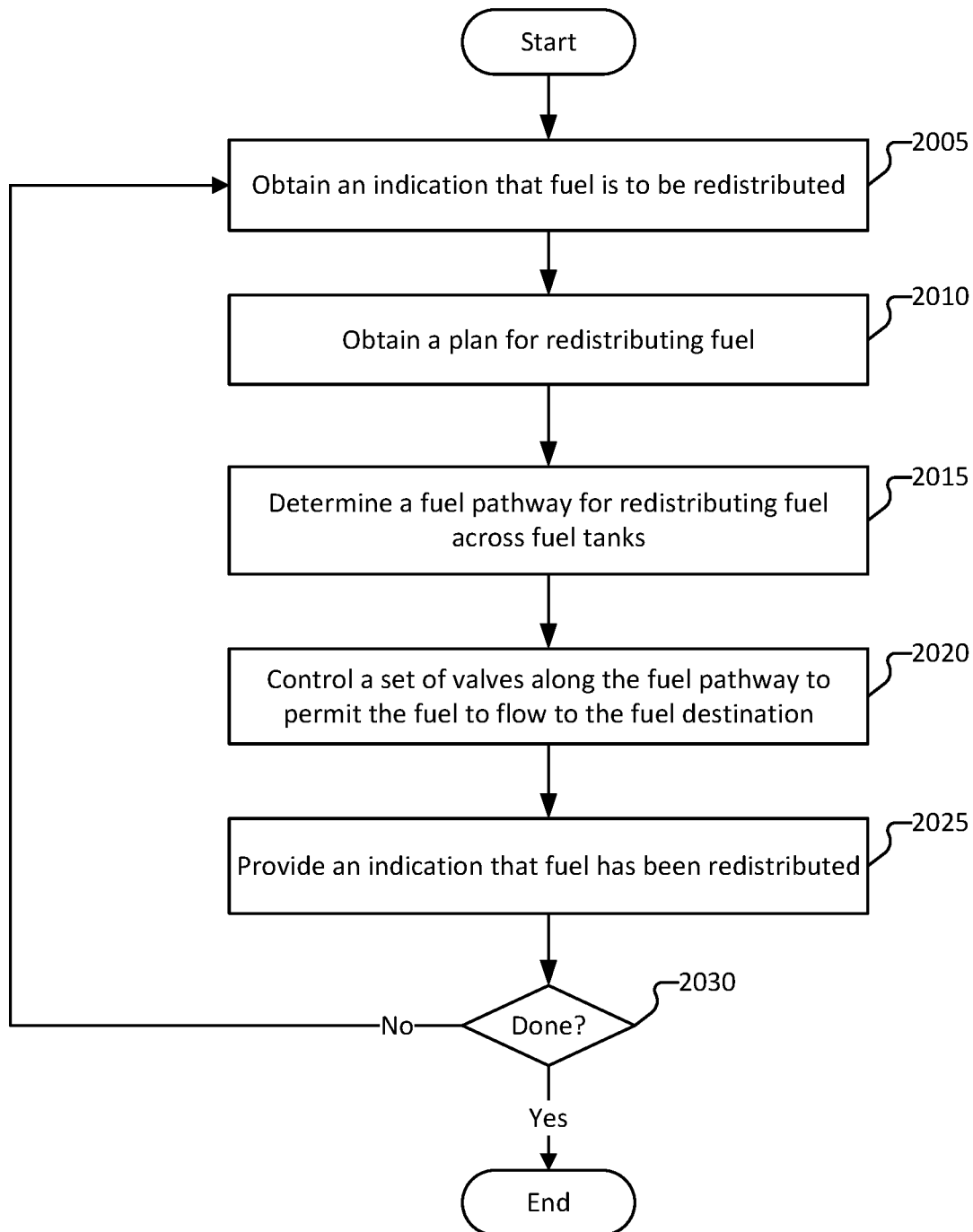
FIG. 20 is a flowchart of a method for controlling a fuel system to redistribute fuel according to various embodiments.

FIG. 20 is a flowchart of a method for controlling a fuel system to redistribute fuel according to various embodiments. In some embodiments, process 2000 is implemented at least in part by an aircraft that is configured to perform a vertical take-off and/or landing and horizontal flight. In some embodiments, process 2000 is performed by a control computer or other control system of the aircraft. In some embodiments, process 2000 is invoked by process 1600 (e.g., at 1625), process 1700 (e.g., at 1715), and/or process 1900 (e.g., at 1930).

At 2005, the system obtains an indication that fuel is to be redistributed. At 2010, the system obtains a plan for redistributing fuel. The plan for redistributing fuel includes determining an extent to which fuel is to be redistributed to the various fuel tanks (e.g., an amount of fuel to be directed to each of the various fuel tanks), etc. At 2015, the system determines a fuel pathway for redistributing fuel across fuel tanks. The system determines the fuel pathway(s) based at least in part on the plan for redistributing fuel, such as based on which tanks are to be a fuel source and which tanks are to be fuel destinations. At 2020, the system controls a set of valves along the fuel pathway to permit the fuel to flow to the fuel destination. The system may send a control signal to the applicable valves to be appropriately configured to permit/restrict the flow of fuel based on how the fuel is to be redistributed across the fuel tanks. For example, the system controls the valve configurations by sending a control signal to a set of solenoids that are respectively configured to control the valve configuration (e.g., to configure the valve in an open or closed orientation). At 2025, the system provides an indication that fuel has been redistributed. In some embodiments, the system provides the indication of the fuel redistribution to the system, service, or process that invoked process 2000, such as to 1625 of process 1600, 1715 of process 1700, and/or process 1900 (e.g., at 1930). At 2030, a determination is made as to whether process 2000 is complete. In some embodiments, process 2000 is determined to be complete in response to a determination that the aircraft has landed, the fuel no longer is to be redistributed, the redistribution of fuel is complete, the user has exited the system, an administrator indicates that process 2000 is to be paused or stopped, etc. In response to a determination that process 2000 is complete, process 2000 ends. In response to a determination that process 2000 is not complete, process 2000 returns to 2005.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft, comprising:
a first nacelle fuel tank configured to hold a first fuel supply for a first engine and to selectively provide fuel to the first engine during both (a) a vertical take-off and landing, and (b) horizontal flight;
a fuselage fuel tank;
a control system configured to redistribute fuel between the first nacelle fuel tank and the fuselage fuel tank;
a low-pressure fuel pump configured to pump fuel from the fuselage fuel tank to one or more of the first nacelle fuel tank and a second nacelle fuel tank; and
a bypass valve between the fuselage fuel tank and one or more of the first nacelle fuel tank and the second nacelle fuel tank,
wherein the bypass valve is configured to be opened or closed based on a determination of whether fuel is to be redistributed to the fuselage fuel tank from one or both of the first nacelle fuel tank and the second nacelle fuel tank.

2. The aircraft of claim 1, wherein the control system is further configured to determine a center of gravity of the aircraft and redistribute fuel between the first nacelle fuel tank and the fuselage fuel tank based at least in part on the center of gravity of the aircraft.

3. The aircraft of claim 1, further comprising:
the second nacelle fuel tank configured to hold a second fuel supply for a second engine; wherein:
the control system is further configured to redistribute fuel among the first nacelle fuel tank, the second nacelle fuel tank, and the fuselage fuel tank; and
the first engine and the second engine are used for both (i) vertical take-off and landing, and (ii) horizontal flight.

4. The aircraft of claim 3, wherein the control system determines a fuel redistribution based at least in part on sensor data from one or more of a first set of fuel sensors comprised in the first nacelle fuel tank, a second set of fuel sensors comprised in the second nacelle fuel tank, and a third set of fuel sensors comprised in the fuselage fuel tank.

5. The aircraft of claim 1, wherein at least one of the first nacelle fuel tank and the fuselage fuel tank comprises a wicking material configured to provide a source of fuel to be pumped from the first nacelle fuel tank or the fuselage fuel tank for supply to the first engine or redistribution of fuel.

6. The aircraft of claim 5, wherein the wicking material is configured to provide a supply of fuel to a supply line across a range of aircraft pitches.

7. The aircraft of claim 5, wherein:
the wicking material comprises a first portion and a second portion;
the first portion is disposed on a first side of the first nacelle fuel tank that corresponds to a first low-point of the first nacelle fuel tank when the aircraft is oriented in a vertical take-off and landing orientation; and
the second portion is disposed on a second side of the first nacelle fuel tank that corresponds to a second low-point of the first nacelle fuel tank when the aircraft is oriented in a horizontal flight orientation.

8. The aircraft of claim 7, wherein the wicking material is configured to pull fuel from a bottom of the first nacelle fuel tank and provide the fuel to a supply line that carries the fuel to the first engine, the fuselage fuel tank, or a second nacelle fuel tank.

9. The aircraft of claim 5, wherein the wicking material is configured to provide filtration and low-point pickup of fuel.

10. The aircraft of claim 9, wherein the wicking material provides 15-micron filtration.

11. The aircraft of claim 1, further comprising:
a high-pressure fuel pump configured to pump fuel in the first nacelle fuel tank to the first engine.

12. The aircraft of claim 11, further comprising:
a pressure regulator disposed in a fuel path between the high-pressure fuel pump and the first engine,
wherein the pressure regulator is configured to maintain a constant pressure of fuel being pumped to the first engine.

13. The aircraft of claim 12, wherein the pressure regulator is configured to divert excess fuel from being pumped from the first nacelle fuel tank to the first engine.

14. The aircraft of claim 13, further comprising one or more valves configured to control, at least in part, diversion of the excess fuel.

15. The aircraft of claim 14, wherein the one or more valves are solenoid valves.

16. The aircraft of claim 14, wherein the one or more valves include a first nacelle fuel tank valve configured to control whether at least part of diverted fuel is returned to the first nacelle fuel tank.

17. The aircraft of claim 14, wherein the one or more valves include a redistribution valve configured to control whether at least part of the diverted fuel is redistributed to the fuselage fuel tank or the second nacelle fuel tank.

18. The aircraft of claim 1, further comprising:
the second nacelle fuel tank configured to hold a second fuel supply for a second engine; wherein:
the first nacelle fuel tank comprises a first set of fuel sensors;
the second nacelle fuel tank comprises a second set of fuel sensors; and
the fuselage fuel tank comprises a third set of fuel sensors.

19. The aircraft of claim 18, wherein each of the first set of fuel sensors, the second set of fuel sensors, and the third set of fuel sensors are configured to measure a fuel level when (a) the aircraft is oriented for a vertical take-off or landing, and/or (b) the aircraft is oriented for horizontal flight.

20. The aircraft of claim 18, wherein one or more of the first set of fuel sensors, the second set of fuel sensors, and the third set of fuel sensors comprise a capacitive sensor.

21. The aircraft of claim 18, wherein each of the first set of fuel sensors, the second set of fuel sensors, and the third set of fuel sensors comprise a plurality of fuel sensors respectively configured at different levels.

22. The aircraft of claim 21, wherein each of the first set of fuel sensors, the second set of fuel sensors, and the third set of fuel sensors comprise a horizontal fuel sensor configured in a horizontal position and a vertical fuel sensor configured in a vertical position.

* * * * *